(12) United States Patent
Yoshinari et al.

(10) Patent No.: US 12,498,512 B2
(45) Date of Patent: Dec. 16, 2025

(54) LIGHT ABSORPTION ANISOTROPIC FILM, VIEWING ANGLE CONTROL SYSTEM, AND IMAGE DISPLAY DEVICE

(71) Applicant: FUJIFILM Corporation, Tokyo (JP)

(72) Inventors: Shinichi Yoshinari, Kanagawa (JP); Shinya Watanabe, Kanagawa (JP); Naoya Shibata, Kanagawa (JP); Wataru Hoshino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 251 days.

(21) Appl. No.: 18/331,816

(22) Filed: Jun. 8, 2023

(65) Prior Publication Data

US 2023/0417971 A1    Dec. 28, 2023

Related U.S. Application Data

(63) Continuation of application No. PCT/JP2021/046988, filed on Dec. 20, 2021.

(30) Foreign Application Priority Data

Dec. 21, 2020   (JP) ................. 2020-211521

(51) Int. Cl.
  *G02B 5/30*         (2006.01)
  *G02F 1/1335*       (2006.01)
  (Continued)

(52) U.S. Cl.
  CPC .......... *G02B 5/3083* (2013.01); *G02B 5/3016* (2013.01); *G02F 1/133528* (2013.01); *G02F 1/13363* (2013.01); *H10K 59/8792* (2023.02)

(58) Field of Classification Search
  CPC .................................................... G02B 5/3016
  See application file for complete search history.

(56) References Cited

U.S. PATENT DOCUMENTS

| 2009/0153783 A1 | 6/2009 | Umemoto |
| 2013/0107195 A1 | 5/2013 | Morishima et al. |

(Continued)

FOREIGN PATENT DOCUMENTS

| JP | 2009-145776 A | 7/2009 |
| JP | 2011-215337 A | 10/2011 |

(Continued)

OTHER PUBLICATIONS

International Search Report issued in PCT/JP2021/046988 on Mar. 8, 2022.

(Continued)

*Primary Examiner* — Edmond C Lau
(74) *Attorney, Agent, or Firm* — Edwards Neils LLC; Jean C. Edwards, Esq.

(57) ABSTRACT

A light absorption anisotropic film that displays a bright, clear image in a desired direction and makes the image invisible from other than the desired direction using an image display device, a viewing angle control system formed of the light absorption anisotropic film, and an image display device formed of the light absorption anisotropic film. The light absorption anisotropic film includes a light absorption anisotropic layer that contains a liquid crystal compound and an organic dichroic substance, where an angle between an alignment direction of a light absorption axis of the organic dichroic substance on one surface and on the other surface of the light absorption anisotropic layer and a normal line of the light absorption anisotropic layer is defined as θA and θB, a difference between the angle θA and the angle θB is 15° or less, and the angle θA is 5° or greater and less than 45°.

20 Claims, 4 Drawing Sheets

(51) Int. Cl.
    *G02F 1/13363*     (2006.01)
    *H10K 59/80*     (2023.01)

(56) References Cited

U.S. PATENT DOCUMENTS

| | | |
|---|---|---|
| 2015/0378068 A1 | 12/2015 | Hatanaka |
| 2017/0235191 A1* | 8/2017 | Jang .................... G02F 1/13439 349/64 |
| 2018/0067355 A1* | 3/2018 | Kim .................... G02F 1/13725 |
| 2019/0250457 A1 | 8/2019 | Nishimura et al. |

FOREIGN PATENT DOCUMENTS

| | | |
|---|---|---|
| JP | 4902516 B2 | 3/2012 |
| JP | 2016-027387 A | 2/2016 |
| JP | 2019-120949 A | 7/2019 |
| WO | 2018/079854 A1 | 5/2018 |

OTHER PUBLICATIONS

Written Opinion issued in PCT/JP2021/046988 on Mar. 8, 2022.
International Preliminary Report on Patentability completed by WIPO on Jun. 13, 2023 in connection with International Patent Application No. PCT/JP2021/046988.
Office Action, issued by the Japanese Patent Office on May 27, 2025, in connection with Japanese Patent Application No. 2022-571437.

\* cited by examiner

LIGHT ABSORPTION ANISOTROPIC FILM, VIEWING ANGLE CONTROL SYSTEM, AND IMAGE DISPLAY DEVICE

CROSS-REFERENCE TO RELATED APPLICATIONS

This application is a Continuation of PCT International Application No. PCT/JP2021/046988 filed on Dec. 20, 2021, which was published under PCT Article 21(2) in Japanese, and which claims priority under 35 U.S.C. § 119(a) to Japanese Patent Application No. 2020-211521 filed on Dec. 21, 2020. The above applications are hereby expressly incorporated by reference, in its entirety, into the present application.

BACKGROUND OF THE INVENTION

1. Field of the Invention

The present invention relates to a light absorption, anisotropic film for controlling a viewing angle, a viewing angle control system formed of the light absorption anisotropic film, and an image display device formed of the viewing angle control system.

2. Description of the Related Art

In a case where an in-vehicle display such as a car navigation system is used, there is a problem in that light emitted upward from a display screen is reflected on a windshield or the like and interferes with driving.

For the purpose of solving such a problem, for example, JP4902516B suggests a method of using a first polarizer that has an absorption axis in a plane and a second polarizer (light absorption anisotropic layer) in which an absorption axis of an organic dichroic substance is aligned at 0° to 45° with respect to a normal direction in combination. Here, a polarizer on a viewing side in a liquid crystal display device can be used as the first polarizer.

According to this method, an image can be observed by an observer in a desired direction by transmitting only light from the image in a specific direction and shielding transmission of light at an angle other than the specific direction, and projection of the image in a direction other than the desired direction, for example, in a direction in which window glass is present can be prevented.

SUMMARY OF THE INVENTION

However, the above-described viewing angle control method has a problem that the screen cannot be sufficiently shielded because the visibility cannot be sufficiently obtained due to an insufficient light transmittance in a case where the image is observed in a direction in which the image is desired to be seen, whereas the light transmittance in a case where the image is observed in a direction other than the above-described direction, that is, in a direction in which the screen is desired to be invisible cannot be sufficiently decreased.

For example, in in-vehicle applications, the screen is difficult to see in a direction in which information is desired to be obtained by accurately and rapidly visually recognizing the screen, for example, in a direction of a driver or a person in a passenger seat, and the image is slightly viewed in a direction in which reflected glare on window glass is desired to be eliminated and thus the effect of preventing reflected glare is insufficient. The above-described problem is a serious problem that interferes with safe driving as an in-vehicle display system.

Therefore, an object of the present invention is to provide a light absorption anisotropic film that is capable of providing a sufficiently bright and easy-to-see image in a desired direction, shielding light from the image in a direction other than the desired direction, and sufficiently limiting reflected glare on window glass in in-vehicle applications using an image display device, a viewing angle control system formed of the light absorption anisotropic film, and an image display device formed of the viewing angle control system.

The present inventors found that the above-described object can be achieved by employing the following configurations.

(1) A light absorption anisotropic film comprising: a light absorption anisotropic layer, in which the light absorption anisotropic layer contains a liquid crystal compound and an organic dichroic substance, and in a case where an angle between an alignment direction of a light absorption axis of the organic dichroic substance on one surface of the light absorption anisotropic layer and a normal line of the light absorption anisotropic layer is defined as θA and an angle between an alignment direction of a light absorption axis of the dichroic substance on the other surface of the light absorption anisotropic layer and the normal line of the light absorption anisotropic layer is defined as θB, a difference between the angle θA and the angle θB is 15° or less, and the angle θA is 5° or greater and less than 45°.

(2) The light absorption anisotropic film according to (1), in which the difference between the angle θA and the angle θB is 5° or less.

(3) The light absorption anisotropic film according to (1) or (2), in which the difference between the angle θA and the angle θB is 2° or less.

(4) The light absorption anisotropic film according to any one of (1) to (3), in which a ratio of a mass of the organic dichroic substance to a total mass of a solid content in the light absorption anisotropic layer is 5% by mass or greater.

(5) The light absorption anisotropic film according to any one of (1) to (3), in which a ratio of a mass of the organic dichroic substance to a total mass of a solid content in the light absorption anisotropic layer is 15% by mass or greater.

(6) The light absorption anisotropic film according to any one of (1) to (5), in which the organic dichroic substance consists of a mixture of three or more kinds of organic dichroic substances having different absorption peak wavelengths.

(7) The light absorption anisotropic film according to any one of (1) to (6), in which the liquid crystal compound includes a polymer liquid crystal compound.

(8) The light absorption anisotropic film according to any one of (1) to (7), in which the liquid crystal compound is a polymer of a polymerizable liquid crystal compound.

(9) The light absorption anisotropic film according to (8), in which the polymerizable liquid crystal compound includes a rod-like liquid crystal compound.

(10) The light absorption anisotropic film according to (8) or (9), in which the polymerizable liquid crystal compound includes a liquid crystal compound exhibiting a smectic phase.

(11) The light absorption anisotropic film according to any one of (1) to (10), further comprising: a liquid crystal layer for alignment adjacent to the light absorption anisotropic layer, in which the liquid crystal layer for alignment is a layer formed by fixing a hybrid-aligned polymerizable liquid crystal compound in which an alignment direction in a thickness direction continuously changes from one surface side to the other surface side.

(12) The light absorption anisotropic film according to (11), in which the liquid crystal compound of the light absorption anisotropic layer is a polymer of a polymerizable liquid crystal compound, and the polymerizable liquid crystal compound used in the light absorption anisotropic layer and the polymerizable liquid crystal compound used in the liquid crystal layer for alignment are same each other.

(13) The light absorption anisotropic film according to (11) or (12), in which the liquid crystal layer for alignment has a thickness of 0.1 to 2.0 μm.

(14) The light absorption anisotropic film according to any one of (11) to (13), further comprising: an alignment layer consisting of polyvinyl alcohol or polyimide adjacent to the liquid crystal layer for alignment on a side opposite to the light absorption anisotropic layer.

(15) A viewing angle control system comprising: a polarizer; and the light absorption anisotropic film according to any one of (1) to (14).

(16) An image display device comprising: the viewing angle control system according to (15) which is disposed on at least one main surface of a display panel.

According to the present invention, it is possible to provide a bright and easy-to-see image to a driver or the like while reflected glare of the image on window glass or the like is sufficiently suppressed in a case where the present invention is used in an in-vehicle display or the like.

DESCRIPTION OF THE PREFERRED EMBODIMENTS

Hereinafter, the present invention will be described in detail.

The description of configuration requirements described below may be made based on typical embodiments of the present invention, but the present invention is not limited to such embodiments.

Further, in the present specification, the numerical ranges shown using "to" indicate ranges including the numerical values described before and after "to" as the lower limits and the upper limits.

Further, in the present specification, the term parallel or orthogonal does not indicate parallel or orthogonal in a strict sense, but indicates a range of ±5° from parallel or orthogonal.

In the present specification, "(meth)acrylate" is used to indicate "any one or both acrylate and methacrylate".

Further, in the present specification, the concepts of the liquid crystal composition and the liquid crystal compound also include those that no longer exhibit liquid crystallinity due to curing or the like.

<Image Display Device>

In addition to a liquid crystal display device, an organic electroluminescence display device or another display device can be used as the image display device according to the embodiment of the present invention. Here, a liquid crystal display device will be described as an example thereof.

Figure 1:
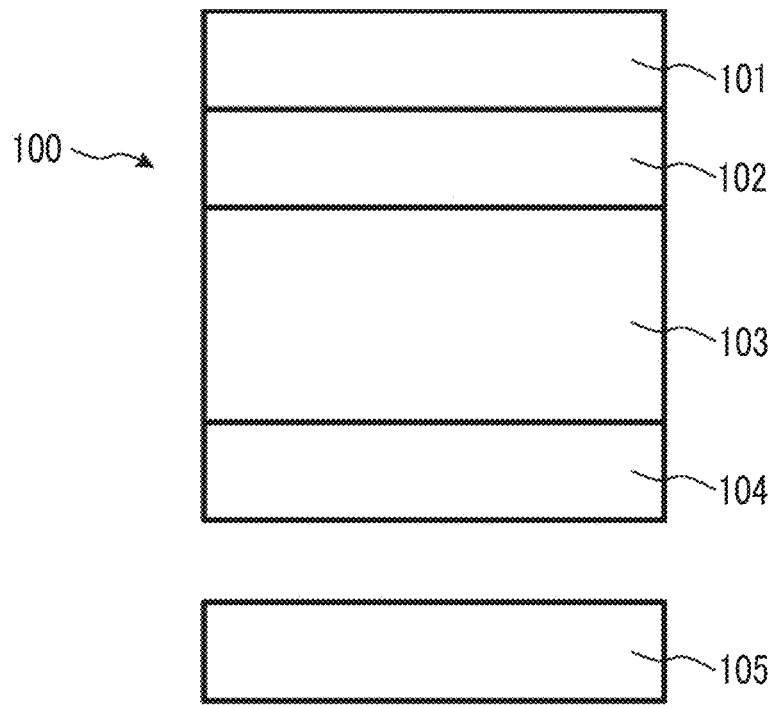
FIG. 1 is a cross-sectional view schematically illustrating an example of an embodiment of a liquid crystal display device of the present invention.

As illustrated in FIG. 1, a liquid crystal display device 100 according to the embodiment of the present invention is a liquid crystal display device including at least a light absorption anisotropic film 101, a viewing-side polarizer 102, a liquid crystal cell 103, a backlight-side polarizer 104, and a backlight 105 in this order from the viewing side.

The light absorption anisotropic film 101 is a light absorption anisotropic film according to the embodiment of the present invention and includes a light absorption anisotropic layer.

As the light absorption anisotropic film 101, any layer with various configurations can be used as long as the layer includes a light absorption anisotropic layer described below.

Figure 2:
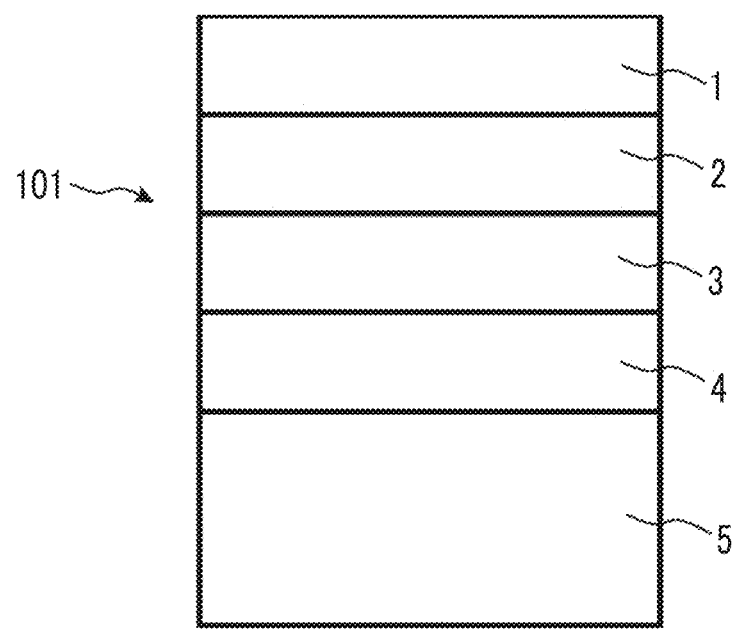
FIG. 2 is a cross-sectional view schematically illustrating an example of an embodiment of a light absorption anisotropic film of the present invention.

The configuration thereof is not limited, and the light absorption anisotropic film 101 according to the embodiment of the present invention includes, as an example, a barrier layer 1, a light absorption anisotropic layer 2, a liquid crystal layer 3 for alignment, an alignment layer 4, and a TAC film 5 in this order, as conceptually illustrated in FIG. 2.

The TAC film 5 is a support that supports the light absorption anisotropic layer 101. Further, the TAC film is an abbreviation for a triacetylcellulose film.

In the present invention, a direction of the absorption axis of the polarizer may be referred to as a longitudinal direction or a lateral direction, and a direction of a side of the liquid crystal display device close to the vertical direction is referred to as a longitudinal direction and a direction of a side of the liquid crystal display device close to the horizontal direction is referred to as a lateral direction typically in a state where a liquid crystal display device is used.

[Light Absorption Anisotropic Layer]

In order to control the light transmission direction of the light absorption anisotropic layer, an aspect in which an organic dichroic substance having absorption in a visible region is aligned in a desired direction is preferable, and an aspect in which an organic dichroic substance is aligned by using the alignment of a liquid crystal compound is more preferable.

Examples of the aspect of the light absorption anisotropic layer include a light absorption anisotropic layer in which at least one kind of organic dichroic substance is aligned in a state of being inclined with respect to the normal direction of the film. Hereinafter, a method of determining the alignment direction of the organic dichroic substance will be described in detail.

As is well known, the normal line is a direction orthogonal to a main surface of a sheet-like material (such as a film, a layer, a membrane, or a plate-like material) and is, for example, a lamination direction of each layer in the light absorption anisotropic film illustrated in FIG. 2. Further, as is well known, the main surface is a maximum surface of a sheet-like material, and is typically both surfaces in the thickness direction.

In the light absorption anisotropic film according to the embodiment of the present invention, in a case where an angle between an alignment direction of a light absorption axis of the organic dichroic substance on one surface of the light absorption anisotropic layer and a normal line of the light absorption anisotropic layer is defined as θA and an angle between an alignment direction of a light absorption axis of the dichroic substance on the other surface of the light absorption anisotropic layer and a normal line of the light absorption anisotropic layer is defined as θB, the organic dichroic substance is aligned such that a difference between the angle θA and the angle θB is 15° or less and the angle θA is 5° or greater and less than 45°.

Figure 5:
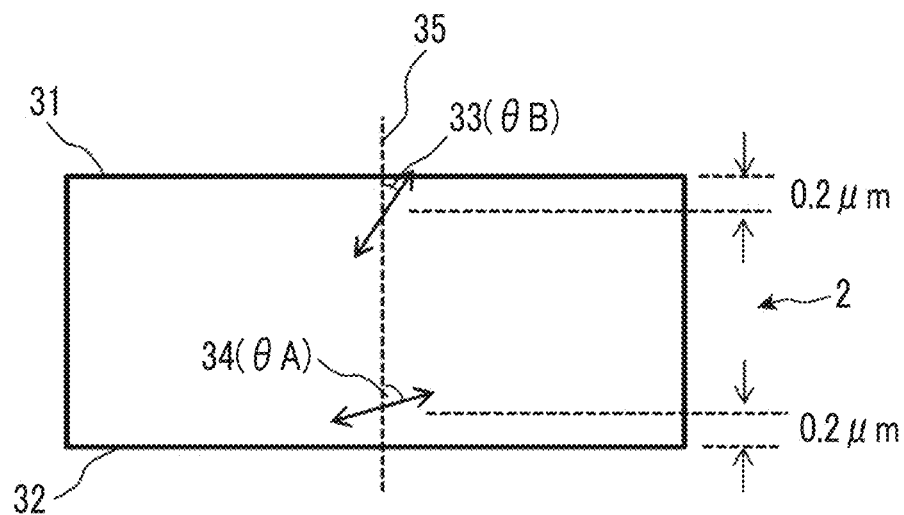
FIG. 5 is a view illustrating a cross-section of the light absorption anisotropic layer inside the light absorption anisotropic film of the present invention and a relationship between a direction θA of a light absorption axis of a dichroic substance in the vicinity of a support-side interface and a direction θB of a light absorption axis of a dichroic substance in the vicinity of an air layer-side interface.

As a preferred example, in a case where the light absorption anisotropic film has the support (TAC film 5) as illustrated in FIG. 2, an angle 34 between the alignment direction of the light absorption axis of the organic dichroic substance at a support-side interface 32 of the light absorption anisotropic layer 2 and a normal line 35 of the light absorption anisotropic layer 2 is defined as the angle θA as conceptually illustrated in FIG. 5. Further, an angle 33 between the alignment direction of the light absorption axis of the dichroic substance at an air layer-side interface 31 of the light absorption anisotropic layer 2 and the normal line 35 of the light absorption anisotropic layer 2 is defined as the angle θB. In the angle θA and the angle θB in the light absorption anisotropic layer 2 of the light absorption anisotropic film according to the embodiment of the present invention, the difference between the angle θA and the angle θB is 15° or less, and the angle θA is 5° or greater and less than 45°. Here, the interface of the light absorption anisotropic layer on a side opposite to the support is not limited to the air layer and may have various functional layers, for example, a protective layer such as the barrier layer 1 as illustrated in FIG. 2.

That is, in the light absorption anisotropic layer 2 of the light absorption anisotropic film according to the embodiment of the present invention, a difference in the alignment direction of the dichroic substance in the thickness direction between both surfaces is small.

In the light absorption anisotropic layer 2 of the light absorption anisotropic film according to the embodiment of the present invention, the alignment directions (azimuthal angles) of the dichroic substances in the plane direction of the light absorption anisotropic layer on both surfaces are the same as each other.

Typically, the light absorption anisotropic layer 2 is formed on the alignment film such that the liquid crystal compounds are arranged (uniaxially aligned) in one direction. In addition, the alignment directions of the liquid crystal compounds in the plane direction follow the liquid crystal compounds on the alignment film side in the thickness direction. Therefore, the alignment directions of the liquid crystal compounds in the plane direction are the same as each other in the entire region of the light absorption anisotropic layer 2 in the thickness direction.

As described below, the light absorption anisotropic layer 2 of the light absorption anisotropic film according to the embodiment of the present invention is formed by a technique for preparing a guest-host liquid crystal cell using a liquid crystal compound as a host. Accordingly, the alignment of the organic dichroic substance follows the alignment of the liquid crystal compound.

Therefore, the alignment directions of the dichroic substances in the plane direction are also the same as each other in the entire region in the thickness direction, and the alignment directions (azimuthal angles) of the dichroic substances are the same as each other (substantially the same as each other) on both surfaces.

Here, the alignment direction of the light absorption axis of the organic dichroic substance is the alignment direction of the organic dichroic substance in which linearly polarized light having a vibration direction of an electric field in the alignment direction is most strongly absorbed.

As a specific method of measuring the alignment direction of the light absorption axis of the organic dichroic substance, first, the transmittance central axis of the light absorption anisotropic layer is detected by measuring the Mueller matrix at a wavelength of 550 nm using AxoScan OPMF-1 (manufactured by Opto Science, Inc.).

More specifically, first, an azimuthal angle at which the transmittance central axis is inclined is initially searched for using AxoScan OPMF-1. Next, the transmittance of the light absorption anisotropic layer is derived by measuring the Mueller matrix at a wavelength of 550 nm while the polar angle which is an angle with respect to the normal direction of the light absorption anisotropic layer is changed for every 1° from −70° to 70° in a plane having the normal direction of the light absorption anisotropic layer along the detected azimuthal angle. Further, the surface having the normal direction of the light absorption anisotropic layer along the detected azimuthal angle is a plane that has the transmittance central axis and is orthogonal to the main surface of the light absorption anisotropic layer.

As a result, the direction in which the transmittance is the highest is defined as the transmittance central axis. The transmittance central axis denotes a direction in which the light absorption axis (the major axis direction of a molecule) of the dichroic substance contained in the light absorption anisotropic layer is inclined.

Figure 6:
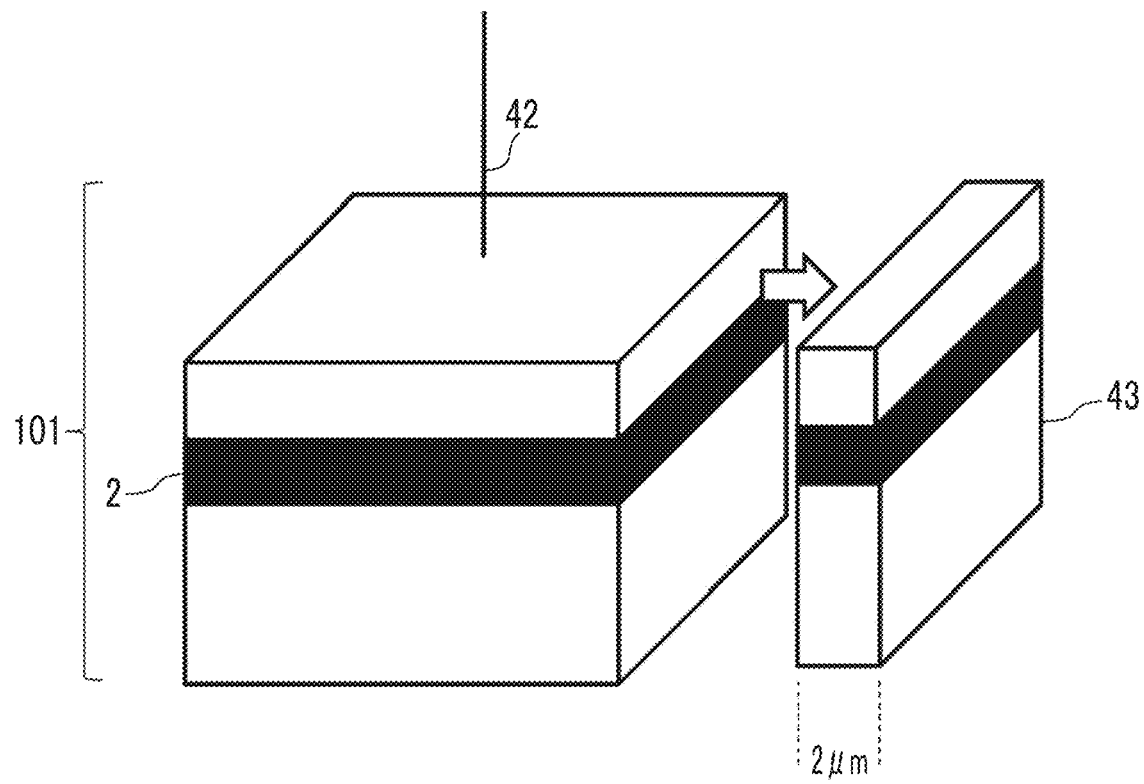
FIG. 6 is a view for describing preparation of a section for confirming a light absorption axis direction of the light absorption anisotropic layer in examples.

Next, as conceptually illustrated in FIG. 6, the light absorption anisotropic layer 2 is thinly sliced in parallel with the normal line (see the normal line 35 in FIG. 5) of the layer by thinly slicing the light absorption anisotropic film 101 in parallel with a normal line 42 using a microtome or the like such that the sliced film has the detected transmittance central axis of the light absorption anisotropic layer, thereby preparing a section 43 serving as a sample.

Next, the sliced section 43 is placed on a rotary sample table of a polarization microscope so that the layer cross section faces upward. Thereafter, as conceptually illustrated in FIG. 7, a change in brightness at each position of the sliced section 43 is observed while the azimuthal angle of the section 43 rotates.

The alignment direction of the light absorption axis of the organic dichroic substance at each site of the light absorption anisotropic layer is estimated by using the fact that in a case where the light absorption axis of the organic dichroic substance and the vibration direction of the electric field of polarized light to be incident are parallel to each other, the polarized light is most strongly absorbed and the place is darkened. In this case, an analyzer of the polarization microscope is not used.

Further, in the present invention, these optical measurements are carried out using light having a wavelength of 550 nm as described above, unless otherwise specified.

However, observation of the direction of the light absorption axis on both surfaces of the light absorption anisotropic layer, for example, at a position of each interface between the support side and the air side is practically difficult to carry out due to large variations.

Therefore, as the angle θA which is the angle 34 between the alignment direction of the light absorption axis of the organic dichroic substance on the support side and the normal line 35 of the light absorption anisotropic layer 2, the angle 34 at a position entering in a direction of the air layer-side interface 31 by 0.2 μm from the support-side interface 32 of the original light absorption anisotropic layer 2 is defined as the angle θA as illustrated in FIG. 5.

Similarly, as the angle θB at the air layer-side interface, the angle 33 between the alignment direction of the light absorption axis of the organic dichroic substance and the normal line 35 of the light absorption anisotropic layer at a position entering in a direction of the support-side interface 32 by 0.2 μm from the air layer-side interface 31 of the original light absorption anisotropic layer 2 is defined as the angle θB as illustrated in FIG. 5.

In the present invention, in a case where the difference between the angle θA and the angle θB is set to 15° or less, the light transmittance of an image in a direction of an observer is increased so that the visibility of the image is enhanced, and similarly, the transmittance in a direction other than the direction of the observer is decreased, and thus reflected glare on window glass or the like is suppressed.

The difference between the angle θA and the angle θB is determined in relation to whether the effectiveness of an image display device for suppressing reflected glare is maximized in a case where a direction in which an image in an image display device for in-vehicle applications is desired to be visually recognized is determined based on the disposition in a vehicle including the image display device.

In a case where the difference between the angle θA and the angle θB is greater than 15°, inconveniences such as degradation of the visibility in a viewing direction to be set in the image display device, insufficient light shielding properties in a direction other than the viewing direction to be set, an increase in reflected glare on window glass in in-vehicle applications, and the like occur.

The difference between the angle θA and the angle θB is preferably 10° or less, more preferably 5° or less, still more preferably 2° or less, and most preferably 0°.

The angle θA and the angle θB are determined in relation to whether the effectiveness of an image display device for suppressing reflected glare is maximized in a case where a direction in which an image in in-vehicle applications is desired to be visually recognized is determined based on the disposition in a vehicle including the image display device. Specifically, the effectiveness is highest in a case where the angle θA is 5° or greater and less than 45°. Further, any of the angle θA or the angle θB may have a larger value.

The angle θA is determined by the need for determining a direction in which the viewing angle is desired to be controlled in the viewing angle control system formed of the light absorption anisotropic film according to the embodiment of the present invention.

In the present invention, in a case where the angle θA is less than 5°, inconveniences such as a low degree of freedom in designing deposition in a vehicle including the image display device occur.

Further, even in a case where the angle θA is set to 45° or greater, the screen is difficult to see at such a shallow angle, the brightness of the emitted light by the image display device is high, and the light shielding properties in the front direction in which the optical path length of an optical path across the optically anisotropic layer is shortened are also insufficient. That is, in a case where the angle θA is 45° or greater, which is not preferable from the viewpoint of the viewing angle control direction of the viewing angle control system, inconveniences such as degradation of the visibility in a viewing direction to be set, insufficient light shielding properties in a direction other than the viewing direction to be set, an increase in reflected glare on window glass in in-vehicle applications, and the like occur.

The angle θA is preferably in a range of 5° to 30° and more preferably in a range of 5° to 15°.

As the technique of aligning the organic dichroic substance in a desired direction, a technique of preparing a polarizer formed of an organic dichroic substance or a technique of preparing a guest-host liquid crystal cell can be referred to.

That is, in the light absorption anisotropic film according to the embodiment of the present invention, the light absorption anisotropic layer contains a liquid crystal compound and an organic dichroic substance.

Figure 3:
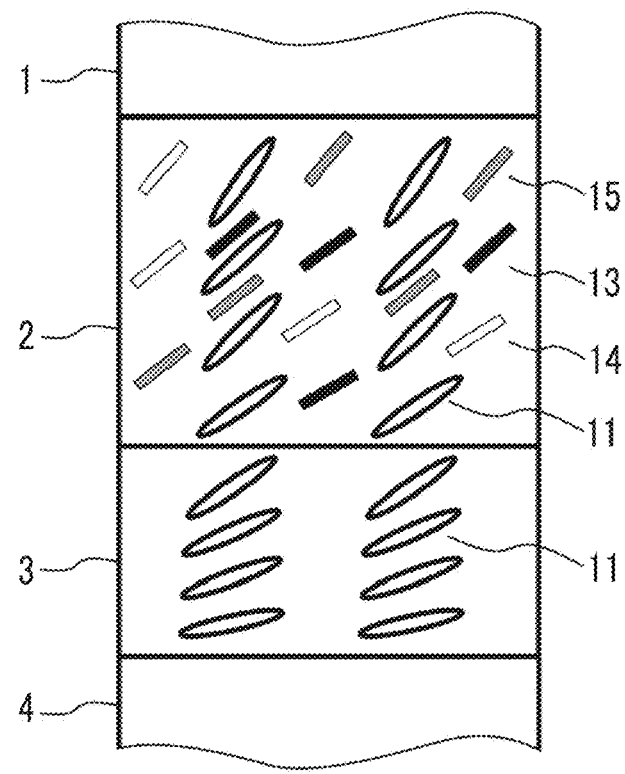
FIG. 3 is a cross-sectional view conceptually illustrating an alignment direction of a liquid crystal compound and a dichroic substance in the light absorption anisotropic film of the present invention.

As an example of the light absorption anisotropic layer 2 conceptually illustrated in FIG. 3, in a case where liquid crystal compounds 11 are aligned to satisfy the angle θA and the angle θB described above, dichroic substances D-1 indicated by the reference numeral 13, dichroic substances D-2 indicated by the reference numeral 14, and dichroic substances D-3 indicated by the reference numeral 15 are aligned as guests along the liquid crystal compounds using the liquid crystal compounds 11 as hosts. Further, the dichroic substances D-1, the dichroic substances D-2, and the dichroic substances D-3 are, for example, organic dichroic substances having different absorption peak wavelengths.

In the alignment of such dichroic substances, for example, techniques used in the method of preparing a dichroic polarizer described in JP1999-305036A (JP-H11-305036A) or JP2002-90526A and the method of preparing a guest-host type liquid crystal display device described in JP2002-99388A or JP2016-27387A can be used for preparation of the light absorption anisotropic layer used in the light absorption anisotropic film according to the embodiment of the present invention.

For example, molecules of the organic dichroic substance can be desirably aligned as described above in association with the alignment of host liquid crystals using the technique of the guest-host type liquid crystal cell.

Specifically, the light absorption anisotropic layer used in the present invention can be prepared by mixing an organic dichroic substance serving as a guest and a rod-like liquid crystal compound serving as a host liquid crystal, aligning the host liquid crystal, aligning molecules of the organic dichroic substance along the alignment of the liquid crystal compound, and fixing the alignment state.

It is preferable that the alignment of the organic dichroic substance is fixed by forming a chemical bond in order to prevent fluctuation of the light absorption characteristics of the light absorption anisotropic layer used in the present invention depending on the usage environment. For example, the alignment can be fixed by promoting the polymerization of the host liquid crystal, the organic dichroic substance, and the polymerizable component to be added as desired.

Further, the guest-host type liquid crystal cell having a liquid crystal layer that contains at least an organic dichroic substance and a host liquid crystal on a pair of substrates may be used as the light absorption anisotropic layer used in the present invention.

The alignment of the host liquid crystal (the alignment of the organic dichroic substance molecules in association of the alignment of the host liquid crystal) is made such that the alignment state thereof is maintained as long as the alignment can be controlled by the alignment film formed on the inner surface of the substrate and an external stimulus such as an electric field is not applied, and the light absorption characteristics of the light absorption anisotropic layer used in the present invention can be set to be constant.

Further, a polymer film that can be used as the light absorption anisotropic layer of the light absorption anisotropic film according to the embodiment of the present invention can be prepared by allowing the organic dichroic substance to permeate into the polymer film and aligning the organic dichroic substance along the alignment of the polymer molecules in the polymer film.

Specifically, the polymer film can be prepared by coating a surface of the polymer film with a solution of an organic dichroic substance and allowing the solution to permeate into the film. The alignment of the organic dichroic substance can be adjusted by the alignment of a polymer chain in the polymer film, the properties thereof (chemical and physical properties of the polymer chain, a functional group of the polymer chain, and the like), the coating method, and the like. The details of this method are described in JP2002-090526A.

Even in a case where this polymer film is used as the light absorption anisotropic layer, the alignment direction of the light absorption axis of the organic dichroic substance may be measured in the same manner as described above.

In the light absorption anisotropic layer used in the present invention, the transmittance at an angle inclined by 30° from the transmittance central axis (hereinafter, at 550 nm) is preferably 60% or less, more preferably 50% or less, and still more preferably 45% or less.

In this manner, the contrast of the illuminance between the direction of the transmittance central axis and the direction deviated from the transmittance central axis can be increased, and thus the viewing angle can be sufficiently narrowed.

In the light absorption anisotropic layer used in the present invention, the transmittance of the transmittance central axis is preferably 65% or greater, more preferably 75% or greater, and still more preferably 85% or greater. In this manner, the illuminance at the center of the viewing angle of the image display device can be increased to enhance the visibility.

Further, from the viewpoint of making the tint in the front direction neutral, the alignment degree of the light absorption anisotropic layer at a wavelength of 420 nm is preferably 0.93 or greater.

The tint of the light absorption anisotropic film containing a dichroic substance is typically controlled by adjusting the addition amount of the dichroic substance contained in the film. However, it was found that the tint both in the front direction and an oblique direction cannot be made neutral only by adjusting the addition amount of the dichroic substance. The reason why the tint thereof both in the front direction and an oblique direction cannot be made neutral is found to be that the alignment degree at 420 nm is low, and the tint thereof both in the front direction and an oblique direction can be made neutral by increasing the alignment degree at 420 nm.

In addition, the light absorption anisotropic layer used in the present invention may be obtained by laminating a plurality of light absorption anisotropic layers with different transmittance central axes or laminating retardation layers such that the transmittance at an angle inclined by 30° from the transmittance central axis and the transmittance of the transmittance central axis are satisfied.

The width of a region where the transmittance is high can be adjusted by laminating a plurality of light absorption anisotropic layers with different transmittance central axes. Further, in a case where retardation layers are laminated, the transmission and light shielding performance can be controlled by controlling the retardation value and the optical axis direction. As the retardation layer, a positive A-plate, a negative A-plate, a positive C-plate, a negative C-plate, a B-plate, an O-plate, or the like can be used. From the viewpoint of reducing the thickness of the viewing angle control system, it is preferable that the thickness of the retardation layer is small as long as the optical characteristics, the mechanical properties, and the manufacturing suitability are not impaired, and specifically, the thickness thereof is preferably in a range of 1 to 150 µm, more preferably in a range of 1 to 70 µm, and still more preferably in a range of 1 to 30 µm.

As described above, the light absorption anisotropic layer contains a liquid crystal compound and an organic dichroic substance.

The liquid crystal compound includes preferably a polymer liquid crystal compound and particularly preferably a polymer liquid crystal compound of a rod-like liquid crystal compound as described below. In a case where the liquid crystal compound includes a polymer liquid crystal compound, the difference between the angle θA and the angle θB described above can be reduced, and the effects of the present invention can be more suitably obtained.

Further, it is preferable that the liquid crystal compound is a polymer of a polymerizable liquid crystal compound, particularly preferable that the polymerizable liquid crystal compound includes a rod-like liquid crystal compound, and preferable that the polymerizable liquid crystal compound exhibits a smectic phase. It is preferable that the liquid crystal compound is a polymer of a polymerizable liquid crystal compound from the viewpoint that the physical strength of the light absorption anisotropic layer can be increased.

Further, the polymerizable liquid crystal compound indicates a liquid crystal compound containing a polymerizable group.

[Liquid Crystal Compound]

The liquid crystal compound can be typically classified into a rod-like type compound and a disk-like type compound depending on the shape thereof.

The liquid crystal composition of the present invention may be of any of the rod-like type compound (rod-like liquid crystal compound) or the disk-like type compound (disk-like liquid crystal compound), but the rod-like liquid crystal compound is preferable from the viewpoint that the alignment direction of the dichroic substance is easily controlled.

In a case where the alignment direction of the dichroic substance is controlled by the rod-like liquid crystal compound, since the dichroic substance tends to be oriented in a direction parallel to the alignment direction of the rod-like liquid crystal compound, the alignment direction of the dichroic substance can also be controlled by controlling the alignment direction of the rod-like liquid crystal compound.

On the contrary, in a case where the alignment direction of the dichroic substance is intended to be controlled by the disk-like liquid crystal compound, the molecular major axis direction of the dichroic substance is parallel to the disk plane of the disk-like liquid crystal compound, but the alignment direction of the dichroic substance is difficult to control in the disk plane. Therefore, the alignment direction of the dichroic substance is difficult to control in a desired direction, and alignment defects of the dichroic substance are also likely to occur.

As the rod-like liquid crystal compound, a liquid crystal compound of a low-molecular-weight compound (low-molecular-weight liquid crystal compound) may be used, or a polymer liquid crystal compound in which a rod-like liquid crystal compound is introduced to the main chain or a side chain of the polymer compound may also be used. Further, a low-molecular-weight liquid crystal compound and a polymer liquid crystal compound may be used in combination.

Further, a liquid crystal compound that does not exhibit dichroism in a visible region is preferable as the rod-like liquid crystal compound.

As such a rod-like liquid crystal compound, both a low-molecular-weight liquid crystal compound and a polymer liquid crystal compound can be used. Here, "low-molecular-weight liquid crystal compound" indicates a liquid crystal compound having no repeating units in the chemical structure. Here, the term "polymer liquid crystal compound" denotes a liquid crystal compound having a repeating unit in the chemical structure.

Examples of the low-molecular-weight liquid crystal compound include liquid crystal compounds described in JP2013-228706A.

Examples of the polymer liquid crystal compound include thermotropic liquid crystal polymers described in JP2011-237513A. Further, the polymer liquid crystal compound may contain a crosslinkable group (such as an acryloyl group or a methacryloyl group) at a terminal.

The rod-like liquid crystal compound may be used alone or in combination of two or more kinds thereof.

The rod-like liquid crystal compound contains preferably a polymer liquid crystal compound and more preferably both a polymer liquid crystal compound and a low-molecular-weight liquid crystal compound from the viewpoint that the difference between the angle θA and the angle θB described above can be reduced and the effects of the present invention are more excellent.

It is preferable that the rod-like liquid crystal compound contains a liquid crystal compound represented by Formula (LC) or a polymer thereof.

Both the liquid crystal compound represented by Formula (LC) or the polymer thereof are compounds exhibiting liquid crystallinity. The liquid crystallinity may be a nematic phase or a smectic phase, or may indicate both a nematic phase and a smectic phase. It is preferable that the liquid crystal compound contains a liquid crystal compound exhibiting a smectic phase. It is preferable that the smectic liquid crystal phase exhibited by the liquid crystal compound is any of these smectic liquid crystal phases from the viewpoint that a light absorption anisotropic layer with a higher alignment degree order can be prepared.

The smectic phase may be a high-order smectic phase. The high-order smectic phase here denotes a smectic B phase, a smectic D phase, a smectic E phase, a smectic F phase, a smectic G phase, a smectic H phase, a smectic I phase, a smectic J phase, a smectic K phase, or a smectic L phase. Among these, a smectic B phase, a smectic F phase, or a smectic I phase is preferable.

It is preferable that the smectic liquid crystal phase exhibited by the liquid crystal compound is any of these high-order smectic liquid crystal phases from the viewpoint that a light absorption anisotropic layer with a higher alignment degree order can be prepared. Further, the light absorption anisotropic layer prepared from such a high-order smectic liquid crystal phase with a high alignment degree order is a layer in which a Bragg peak derived from a high-order structure such as a hexatic phase or a crystal phase in X-ray diffraction measurement is obtained. The Bragg peak is a peak derived from a plane periodic structure of molecular alignment, and according to the liquid crystal composition of the present invention, a light absorption anisotropic layer having a periodic interval of 3.0 to 5.0 Å can be obtained.

$$Q1\text{-}S1\text{-}MG\text{-}S2\text{-}Q2 \quad (LC)$$

In Formula (LC), Q1 and Q2 each independently represent a hydrogen atom, a halogen atom, a linear, branched, or cyclic alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group ($-B(OH)_2$), a phosphate group ($-OPO(OH)_2$), a sulfate group ($-OSO_3H$), or a crosslinkable group represented by any of Formulae (P-1) to (P-30), and it is preferable that at least one of Q1 or Q2 represents a crosslinkable group represented by any of the following formulae.

(P-1)

(P-2)

(P-3)

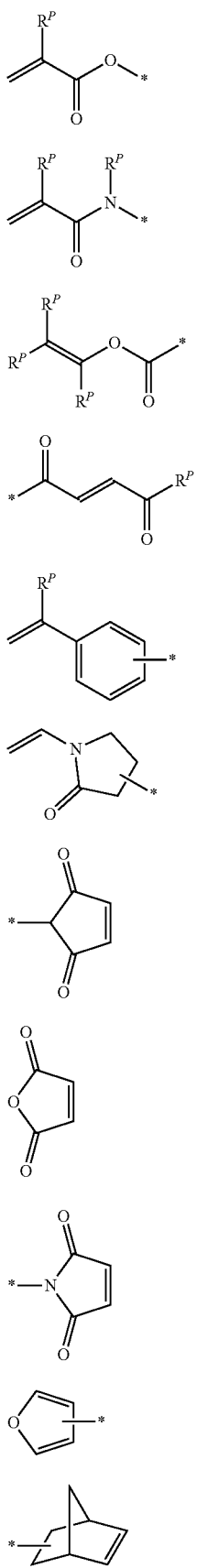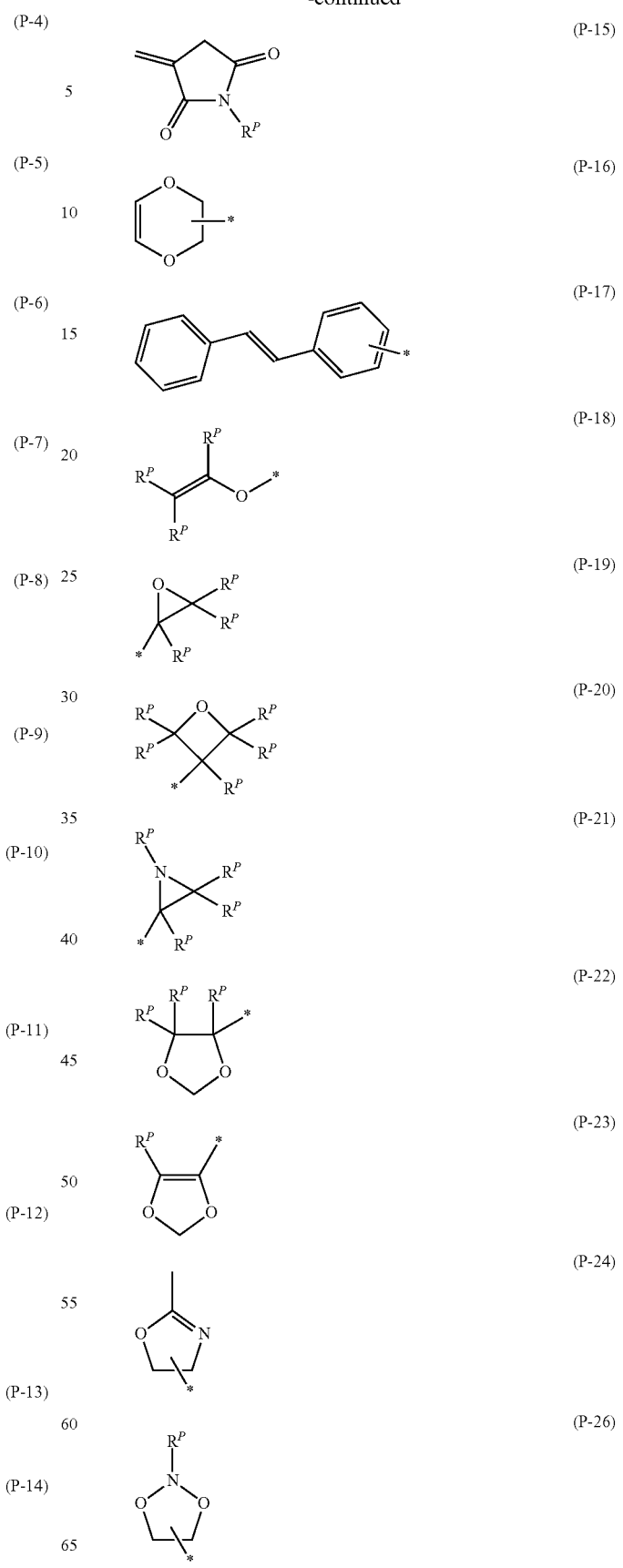

-continued

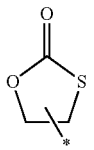
(P-25)

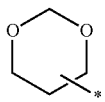
(P-27)

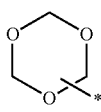
(P-28)

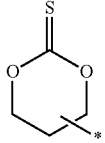
(P-29)

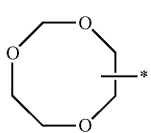
(P-30)

In Formulae (P-1) to (P-30), RP represents a hydrogen atom, a halogen atom, a linear, branched, or cyclic alkylene group having 1 to 10 carbon atoms, a halogenated alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group ($-B(OH)_2$), a phosphate group ($-OPO(OH)_2$), or a sulfate group ($-OSO_3H$), and a plurality of RP's may be the same as or different from each other.

Preferred embodiments of the crosslinkable group include a radically polymerizable group and a cationically polymerizable group. As the radically polymerizable group, a vinyl group represented by Formula (P-1), a butadiene group represented by Formula (P-2), a (meth)acryl group represented by Formula (P-4), a (meth)acrylamide group represented by Formula (P-5), a vinyl acetate group represented by Formula (P-6), a fumaric acid ester group represented by Formula (P-7), a styryl group represented by Formula (P-8), a vinylpyrrolidone group represented by Formula (P-9), a maleic acid anhydride represented by Formula (P-11), or a maleimide group represented by Formula (P-12) is preferable. As the cationically polymerizable group, a vinyl ether group represented by Formula (P-18), an epoxy group represented by Formula (P-19), or an oxetanyl group represented by Formula (P-20) is preferable.

In Formula (LC), S1 and S2 each independently represent a divalent spacer group, and preferred embodiments of S1 and S2 include the same structures as those for SPW in Formula (W1), and thus the description thereof will not be repeated.

In Formula (LC), MG represents a mesogen group described below. The mesogen group represented by MG is a group showing a main skeleton of a liquid crystal compound that contributes to liquid crystal formation. A liquid crystal compound exhibits liquid crystallinity which is in an intermediate state (mesophase) between a crystal state and an isotropic liquid state. The mesogen group is not particularly limited, and for example, particularly description on pages 7 to 16 of "Flussige Kristalle in Tabellen II" (VEB Deutsche Verlag fur Grundstoff Industrie, Leipzig, 1984) and particularly the description in Chapter 3 of "Liquid Crystal Handbook" (Maruzen, 2000) edited by Liquid Crystal Handbook Editing Committee can be referred to.

The mesogen group represented by MG has preferably 2 to 10 cyclic structures and more preferably 3 to 7 cyclic structures.

Specific examples of the cyclic structure include an aromatic hydrocarbon group, a heterocyclic group, and an alicyclic group.

From the viewpoints of exhibiting the liquid crystallinity, adjusting the liquid crystal phase transition temperature, and the availability of raw materials and synthetic suitability and from the viewpoint that the effects of the present invention are more excellent, as the mesogen group represented by MG, a group represented by Formula (MG-A) or Formula (MG-B) is preferable, and a group represented by Formula (MG-B) is more preferable.

(MG-A)

(MG-B)

In Formula (MG-A), A1 represents a divalent group selected from the group consisting of an aromatic hydrocarbon group, a heterocyclic group, and an alicyclic group. These groups may be substituted with a substituent such as the substituent W.

It is preferable that the divalent group represented by A1 is a 4- to 15-membered ring. Further, the divalent group represented by A1 may be a monocycle or a fused ring.

Further, * represents a bonding position with respect to S1 or S2.

Examples of the divalent aromatic hydrocarbon group represented by A1 include a phenylene group, a naphthylene group, a fluorene-diyl group, an anthracene-diyl group, and a tetracene-diyl group. From the viewpoints of design diversity of a mesogenic skeleton and the availability of raw materials, a phenylene group or a naphthylene group is preferable.

The divalent heterocyclic group represented by A1 may be any of aromatic or non-aromatic, but a divalent aromatic heterocyclic group is preferable as the divalent heterocyclic group from the viewpoint of further improving the alignment degree.

The atoms other than carbon constituting the divalent aromatic heterocyclic group include a nitrogen atom, a sulfur atom, and an oxygen atom. In a case where the aromatic heterocyclic group has a plurality of atoms constituting a ring other than carbon, these may be the same as or different from each other.

Specific examples of the divalent aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, a thienooxazole-diyl group, and the following structures (II-1) to (II-4).

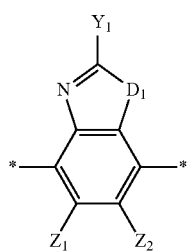

(II-1)

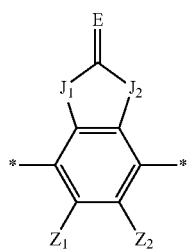

(II-2)

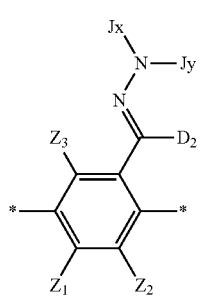

(II-3)

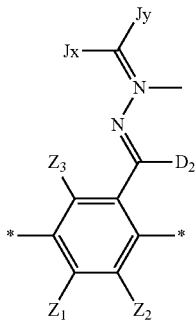

(II-4)

In Formulae (II-1) to (II-4), $D_1$ represents —S—, —O—, or $NR^{11}$—, $R^{11}$ represents a hydrogen atom or an alkyl group having 1 to 6 carbon atoms, $Y_1$ represents an aromatic hydrocarbon group having 6 to 12 carbon atoms or an aromatic heterocyclic group having 3 to 12 carbon atoms, $Z_1$, $Z_2$, and $Z_3$ each independently represent a hydrogen atom, an aliphatic hydrocarbon group having 1 to 20 carbon atoms, an alicyclic hydrocarbon group having 3 to 20 carbon atoms, a monovalent aromatic hydrocarbon group having 6 to 20 carbon atoms, a halogen atom, a cyano group, a nitro group, —$NR^{12}R^{13}$, or —$SR^{12}$, $Z_1$ and $Z_2$ may be bonded to each other to form an aromatic ring or an aromatic heterocyclic ring, $R^{12}$ and $R^{13}$ each independently represent a hydrogen atom or an alkyl group having 1 to 6 carbon atoms, $J_1$ and $J_2$ each independently represent a group selected from the group consisting of —O—, —$NR^{21}$— ($R^{21}$ represents a hydrogen atom or substituent), —S—, and C(O)—, E represents a hydrogen atom or a non-metal atom of a Group 14 to a Group 16 to which a substituent may be bonded, Jx represents an organic group having 2 to 30 carbon atoms, which has at least one aromatic ring selected from the group consisting of an aromatic hydrocarbon ring and an aromatic heterocyclic ring, Jy represents a hydrogen atom, an alkyl group having 1 to 6 carbon atoms which may have a substituent, or an organic group having 2 to 30 carbon atoms which has at least one aromatic ring selected from the group consisting of an aromatic hydrocarbon ring and an aromatic heterocyclic ring, the aromatic ring of Jx and Jy may have a substituent, Jx and Jy may be bonded to each other to form a ring, and $D_2$ represents a hydrogen atom or an alkyl group having 1 to 6 carbon atoms which may have a substituent.

In Formula (II-2), in a case where $Y_1$ represents an aromatic hydrocarbon group having 6 to 12 carbon atoms, the aromatic hydrocarbon group may be monocyclic or polycyclic. In a case where $Y_1$ represents an aromatic heterocyclic group having 3 to 12 carbon atoms, the aromatic heterocyclic group may be monocyclic or polycyclic.

In Formula (II-2), in a case where $J_1$ and $J_2$ represent —$NR^{21}$—, the substituent as $R^{21}$ can refer to, for example, the description in paragraphs [0035] to [0045] of JP2008-107767A, and the content thereof is incorporated in the present specification.

In Formula (II-2), in a case where E represents a non-metal atom of a Group 14 to a Group 16 to which a substituent may be bonded, =O, =S, =NR', or =C(R')R' is preferable. R' represents a substituent, and as the substituent, for example, the description in paragraphs [0035] to [0045] of JP2008-107767A can be referred to, and —$NZ^{A1}Z^{A2}$ ($Z^{A1}$ and $Z^{A2}$ each independently represent a hydrogen atom, an alkyl group, or an aryl group) is preferable.

Specific examples of the divalent alicyclic group represented by A1 include a cyclopentylene group and a cyclohexylene group, and the carbon atoms thereof may be substituted with —O—, —Si(CH$_3$)$_2$—, —N(Z)— (Z represents a hydrogen atom, an alkyl group having 1 to 4 carbon atoms, a cycloalkyl group, an aryl group, a cyano group, or a halogen atom), —C(O)—, —S—, —C(S)—, —S(O)—, —SO$_2$—, or a group obtained by combining two or more of these groups.

In Formula (MG-A), a1 represents an integer of 2 to 10. The plurality of A1's may be the same as or different from each other.

In Formula (MG-B), A2 and A3 each independently represent a divalent group selected from the group consisting of an aromatic hydrocarbon group, a heterocyclic group, and an alicyclic group. Specific examples and preferred embodiments of A2 and A3 are the same as those for A1 in Formula (MG-A), and thus description thereof will not be repeated.

In Formula (MG-B), a2 represents an integer of 1 to 10, a plurality of A2's may be the same as or different from each other, and a plurality of LA1's may be the same as or different from each other. From the viewpoint that the effects of the present invention are more excellent, it is more preferable that a2 represents 2 or greater.

In Formula (MG-B), LA1 represents a single bond or a divalent linking group. Here, LA1 represents a divalent linking group in a case where a2 represents 1, and at least one of the plurality of LA1's represents a divalent linking group in a case where a2 represents 2 or greater.

In Formula (MG-B), examples of the divalent linking group represented by LA1 are the same as those for LW, and thus the description thereof will not be repeated.

Specific examples of MG include the following structures, the hydrogen atoms on the aromatic hydrocarbon group, the heterocyclic group, and the alicyclic group in the following structures may be substituted with the substituent W described above.

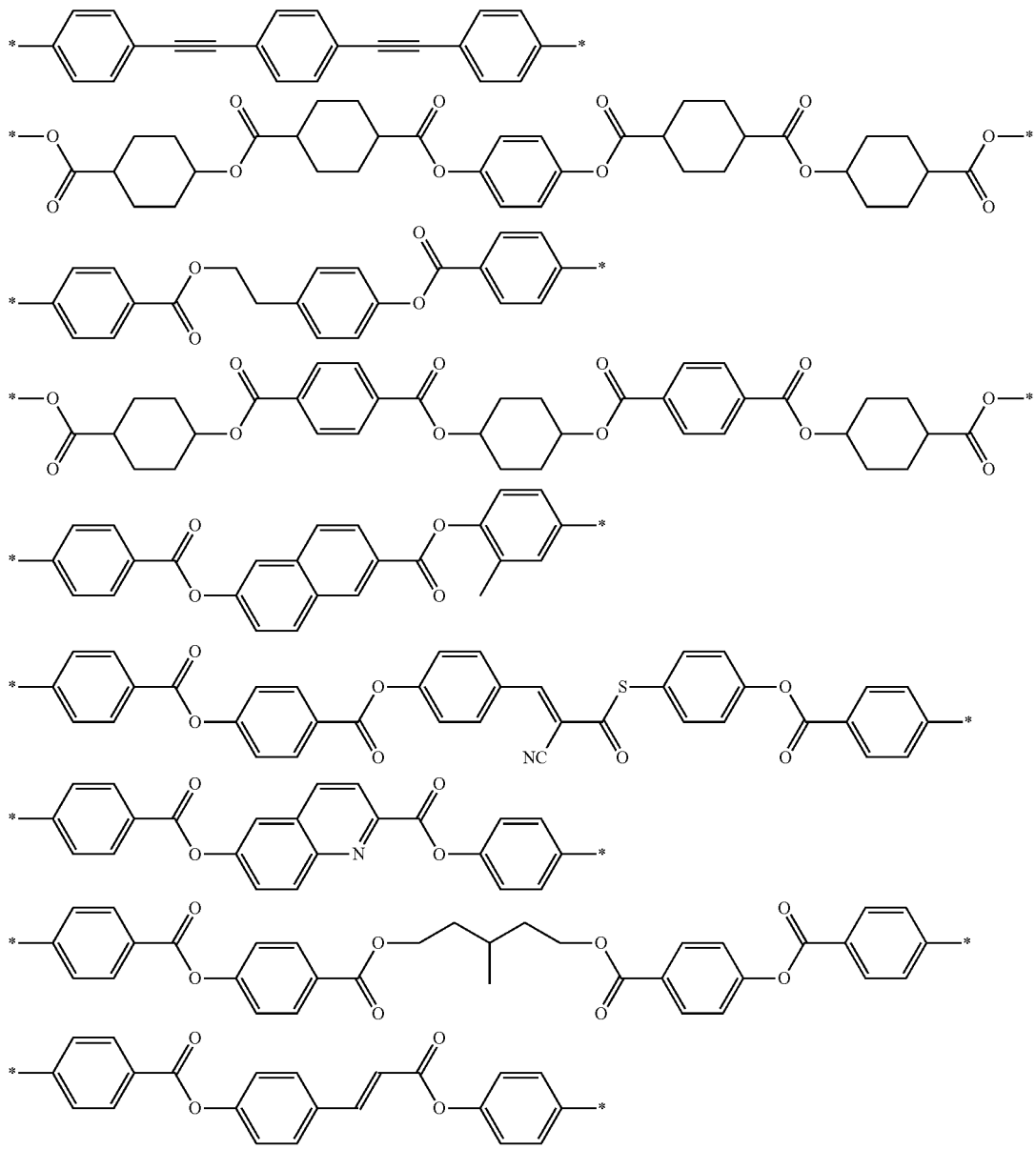

-continued
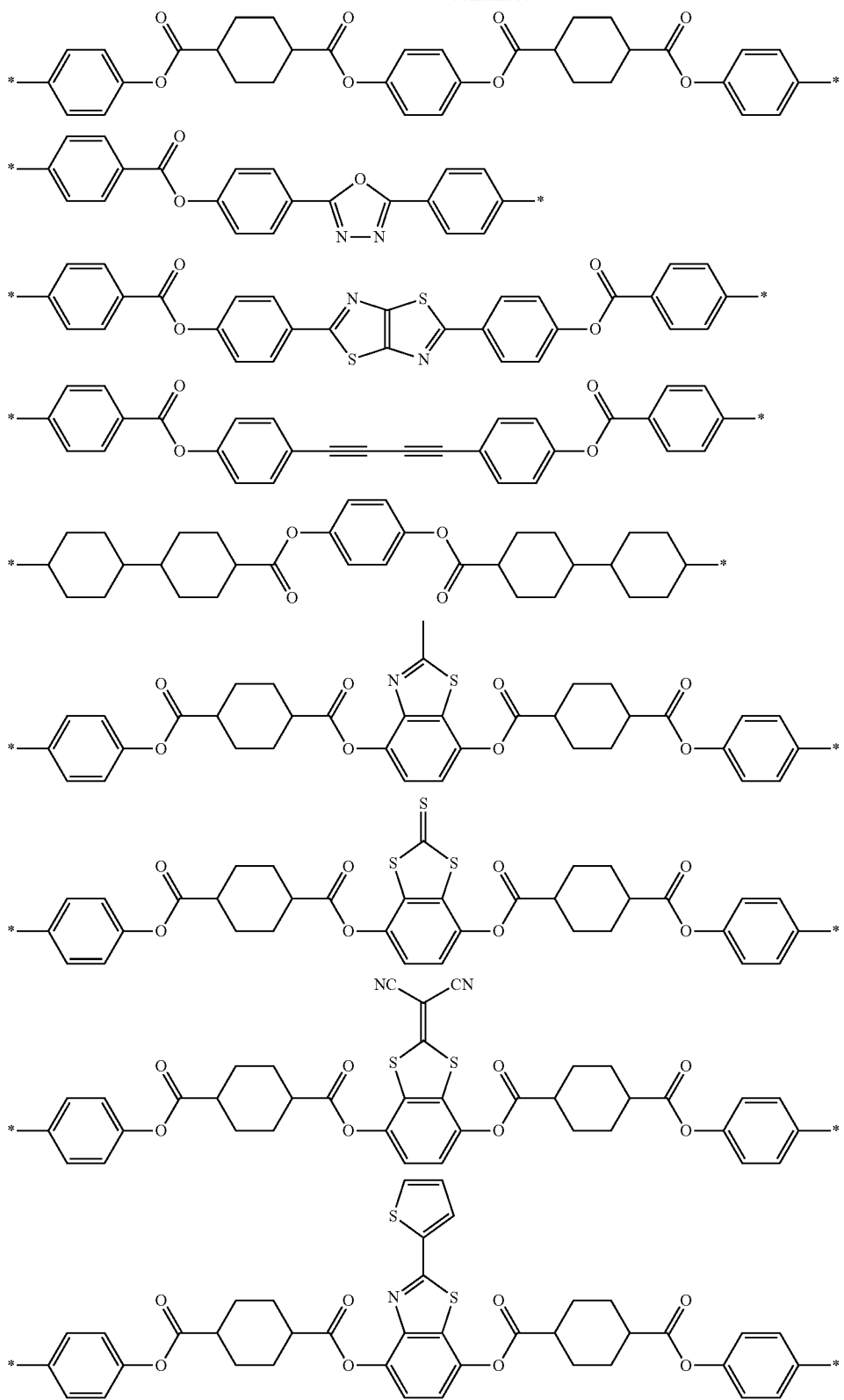

-continued
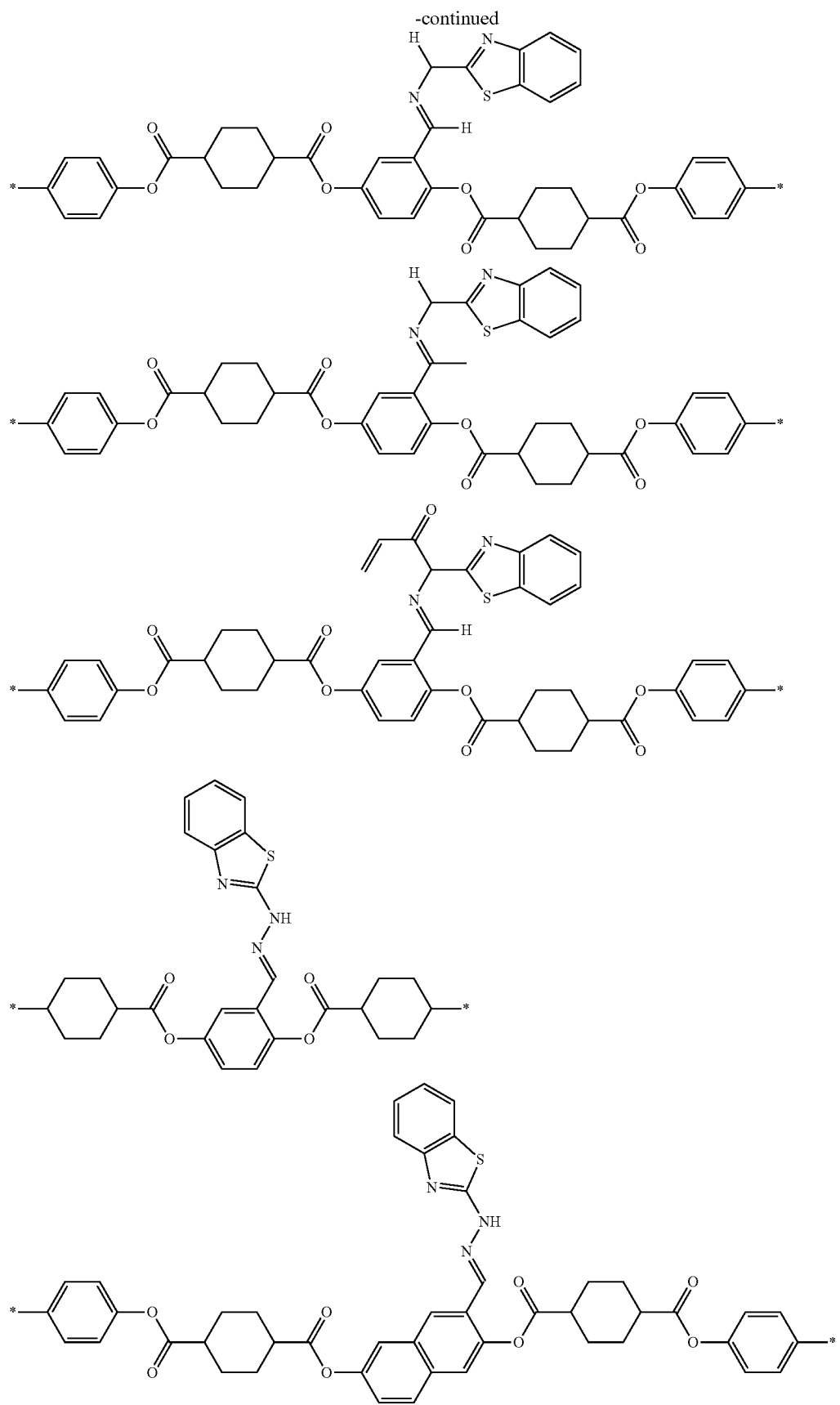

-continued
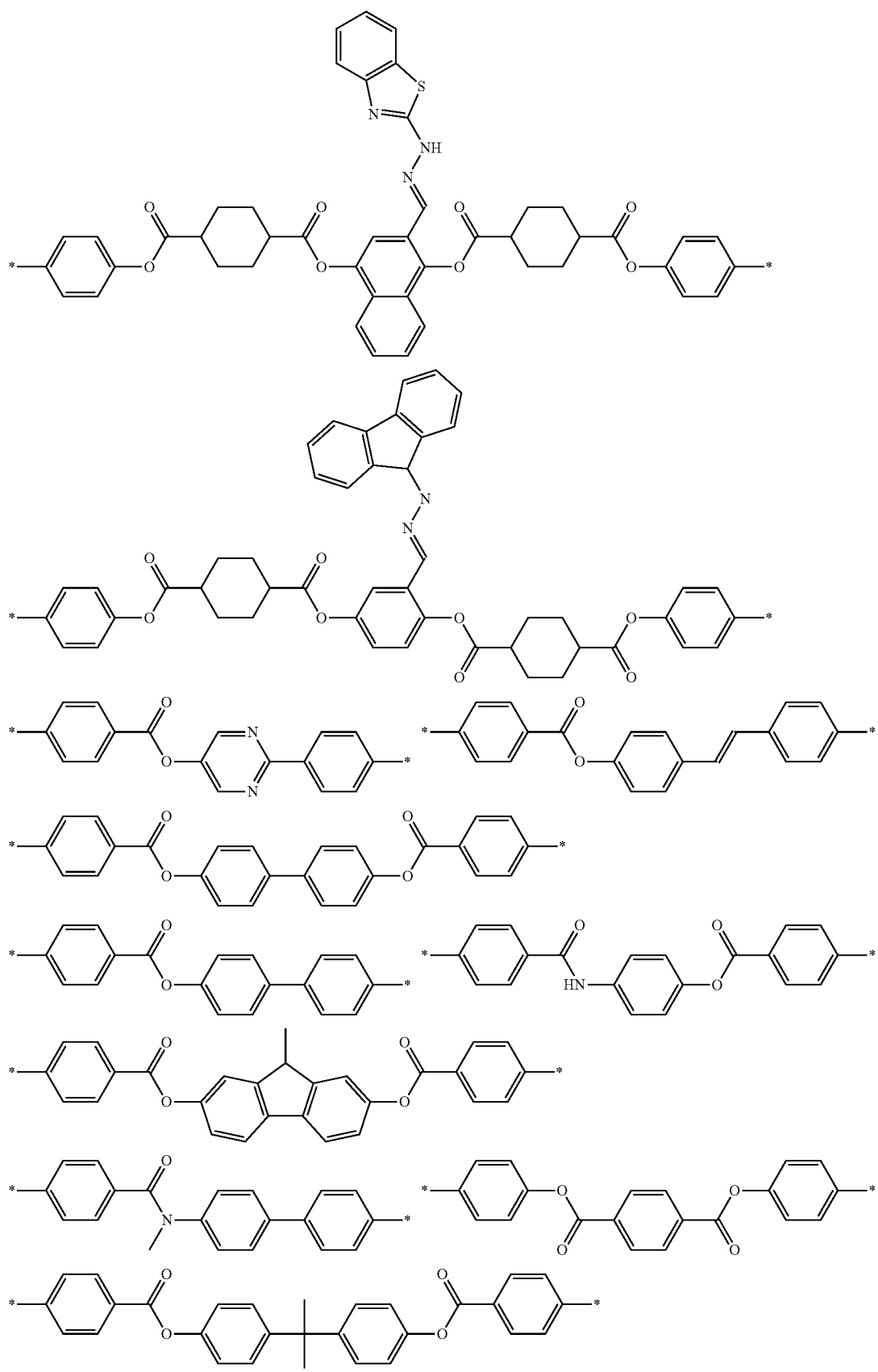

-continued
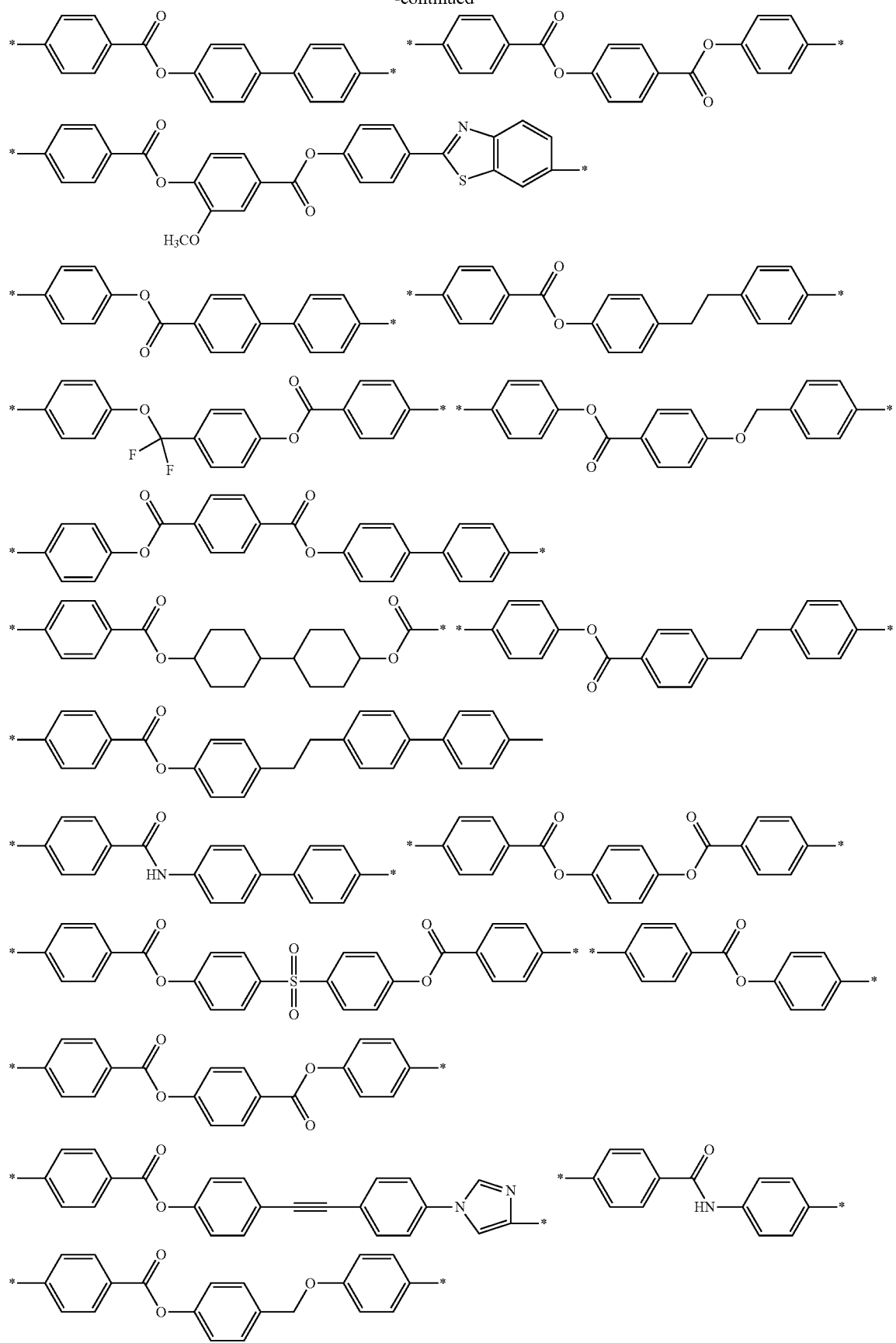

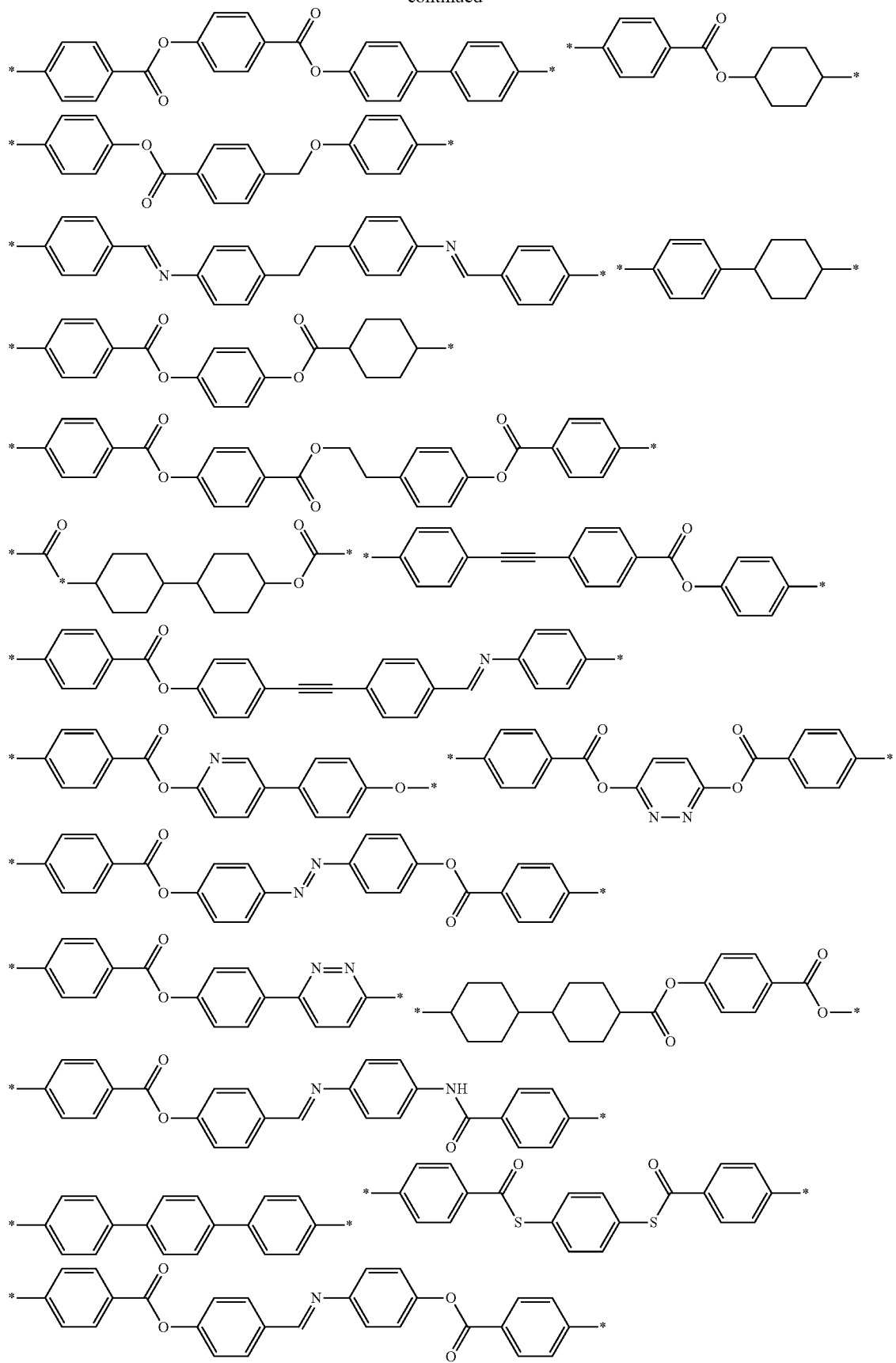

-continued

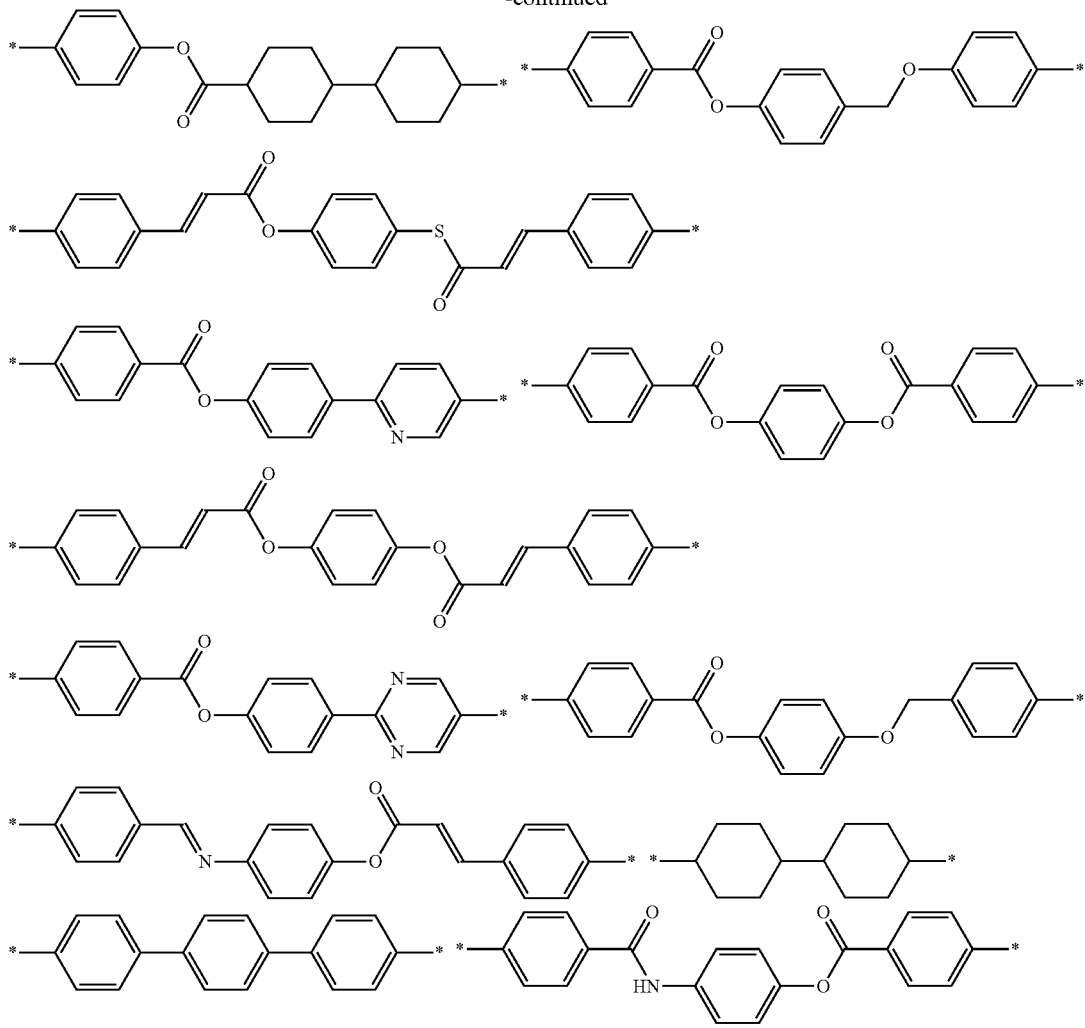

<Low-Molecular-Weight Liquid Crystal Compound>

In a case where the liquid crystal compound represented by Formula (LC) is a low-molecular-weight liquid crystal compound, examples of preferred embodiments of the cyclic structure of the mesogen group MG include a cyclohexylene group, a cyclopentylene group, a phenylene group, a naphthylene group, a fluorene-diyl group, a pyridine-diyl group, a pyridazine-diyl group, a thiophene-diyl group, an oxazole-diyl group, a thiazole-diyl group, and a thienothiophene-diyl group, and the number of cyclic structures is preferably in a range of 2 to 10 and more preferably in a range of 3 to 7.

Examples of preferred embodiments of the substituent W having a mesogen structure include a halogen atom, a halogenated alkyl group, a cyano group, a hydroxy group, a nitro group, a carboxy group, an alkoxy group having 1 to 10 carbon atoms, an alkylcarbonyl group having 1 to 10 carbon atoms, an alkyloxycarbonyl group having 1 to 10 carbon atoms, an alkylcarbonyloxy group having 1 to 10 carbon atoms, an amino group, an alkylamino group having 1 to 10 carbon atoms, an alkylaminocarbonyl group, and a group in which LW in Formula (W1) represents a single bond. SPW represents a divalent spacer group, and Q represents a crosslinkable group represented by any of Formulae (P-1) to (P-30), and preferred examples of the crosslinkable group include a vinyl group, a butadiene group, a (meth)acryloyl group, a (meth)acrylamide group, a vinyl acetate group, a fumaric acid ester group, a styryl group, a vinylpyrrolidone group, a maleic acid anhydride, a maleimide group, a vinyl ether group, an epoxy group, and an oxetanyl group.

The preferred embodiments of the divalent spacer groups S1 and S2 are the same as those for the SPW, and thus the description thereof will not be repeated.

In a case where a low-molecular-weight liquid crystal compound exhibiting a smectic phase is used, the number of carbon atoms of the spacer group (the number of atoms in a case where the carbon atoms are substituted "SP-C") is preferably 6 or more and more preferably 8 or more.

In a case where the liquid crystal compound represented by Formula (LC) is a low-molecular-weight liquid crystal compound, a plurality of low-molecular-weight liquid crystal compounds may be used in combination, preferably 2 to 6 kinds of low-molecular-weight liquid crystal compounds are used in combination, and more preferably 2 to 4 kinds of low-molecular-weight liquid crystal compounds are used in combination. By using low-molecular-weight liquid crystal compounds in combination, the solubility can be improved and the phase transition temperature of the liquid crystal composition can be adjusted.

Specific examples of the low-molecular-weight liquid crystal compound include compounds represented by Formulae (LC-1) to (LC-77), but the low-molecular-weight liquid crystal compound is not limited thereto.

(LC-1) 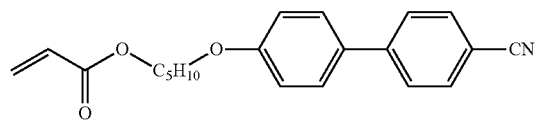
(LC-2) 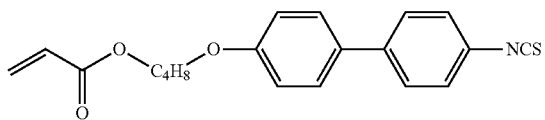
(LC-3) 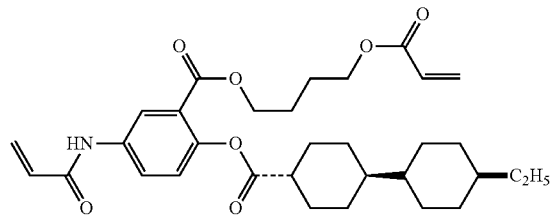
(LC-4) 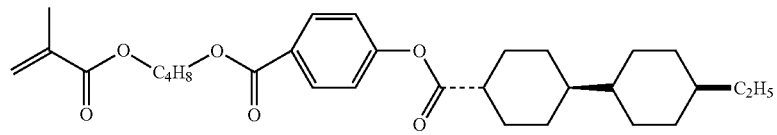
(LC-5) 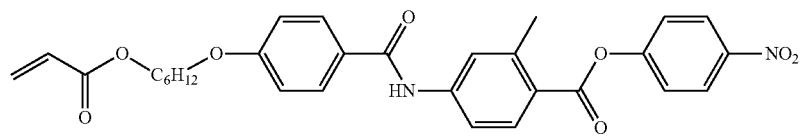
(LC-6) 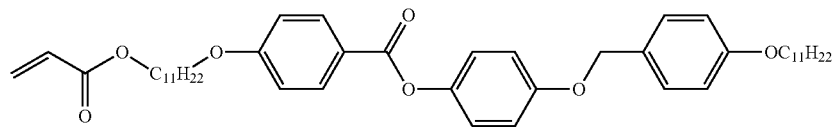
(LC-7) 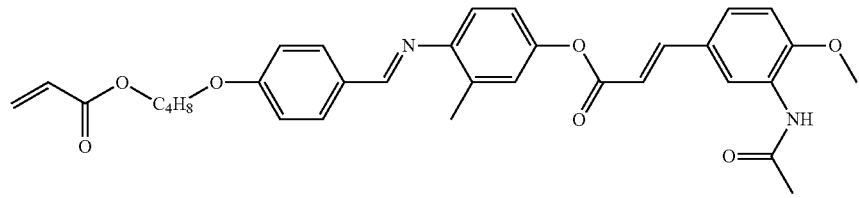
(LC-8) 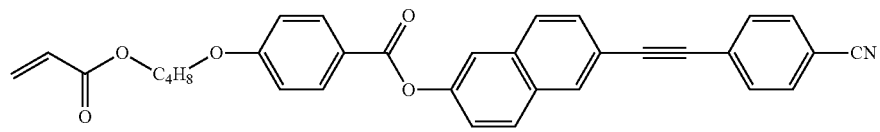
(LC-9) 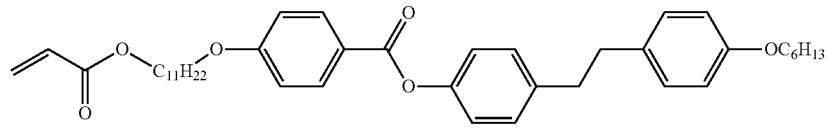
(LC-10) 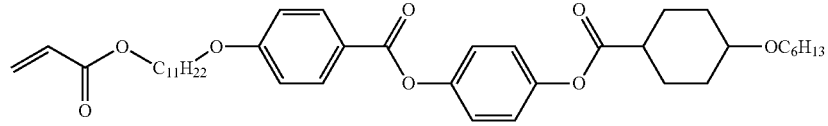
(LC-11) 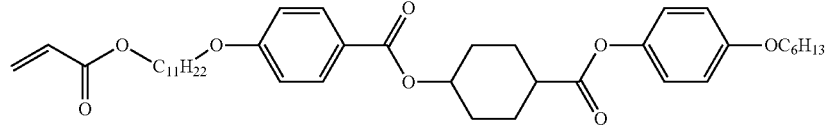

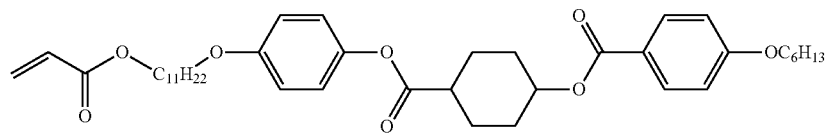
(LC-13)
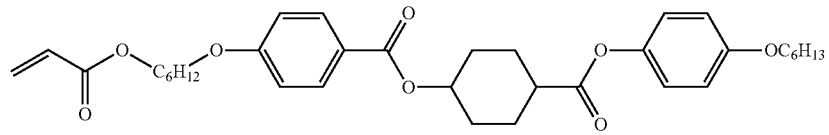
(LC-14)
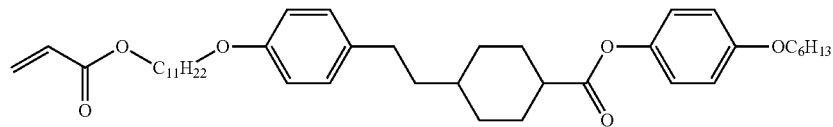
(LC-15)
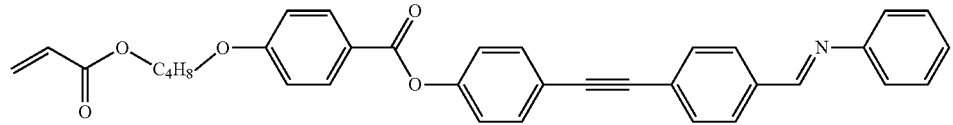
(LC-16)
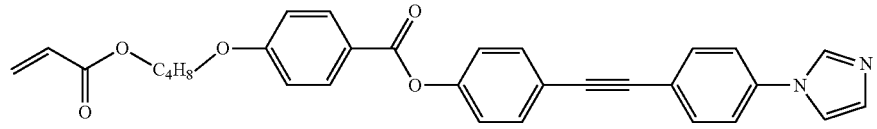
(LC-17)
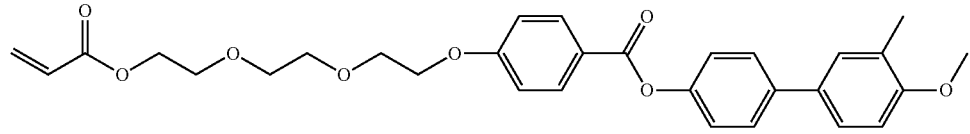
(LC-18)
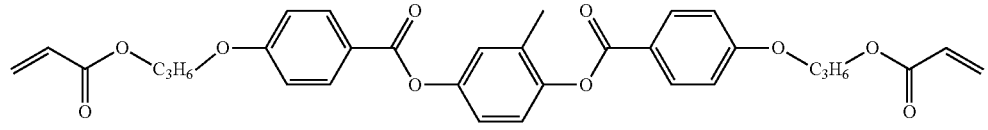
(LC-19)
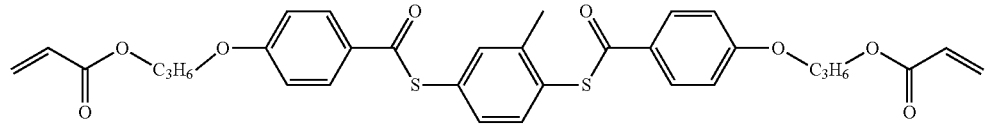
(LC-20)
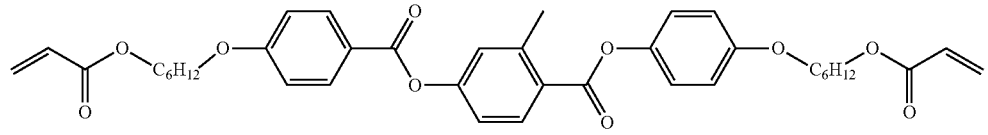
(LC-21)
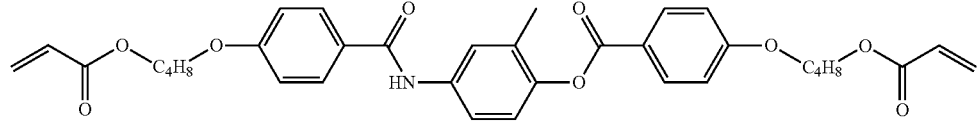
(LC-22)
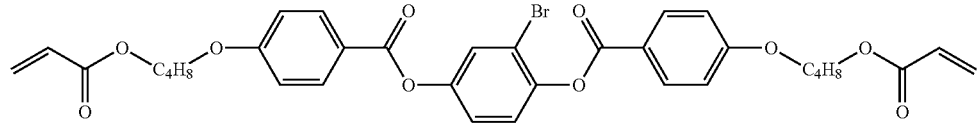
(LC-23)

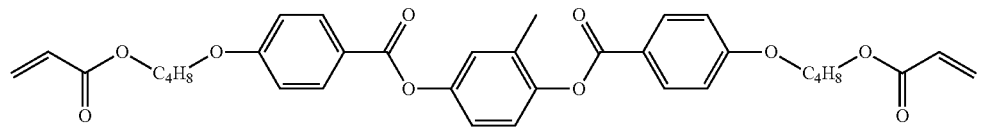
(LC-24)
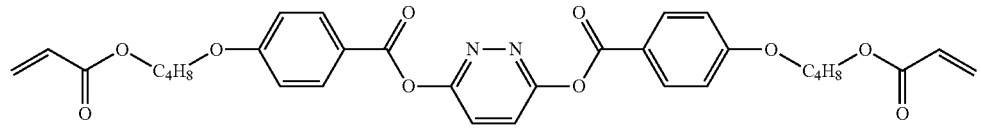
(LC-25)
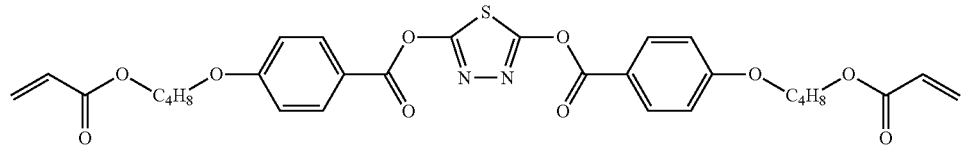
(LC-26)
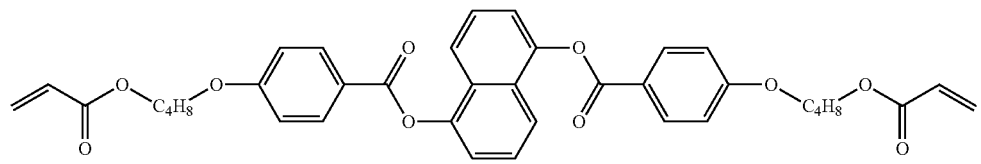
(LC-27)
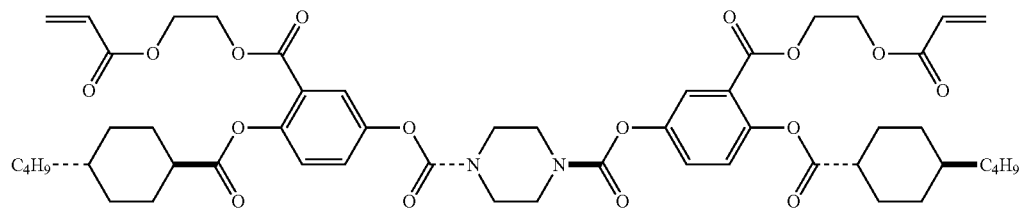
(LC-28)
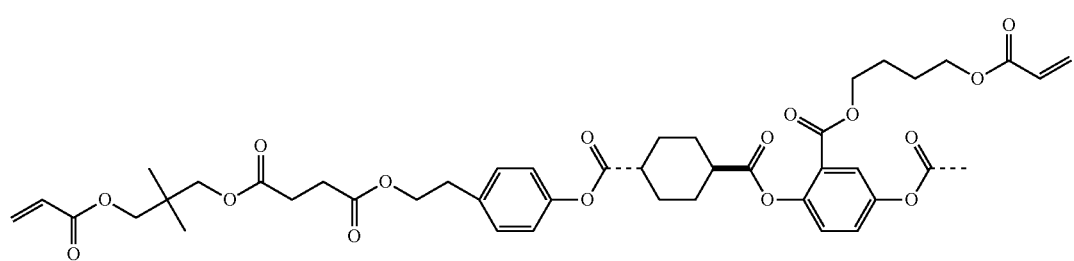
(LC-29)
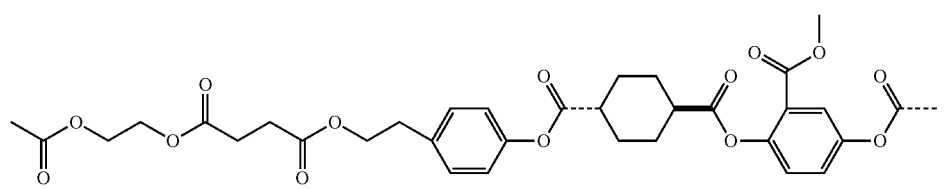
(LC-30)
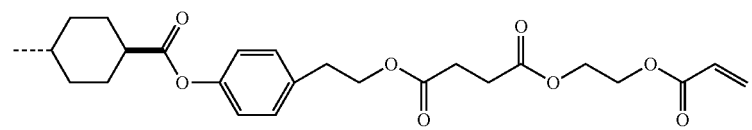

-continued
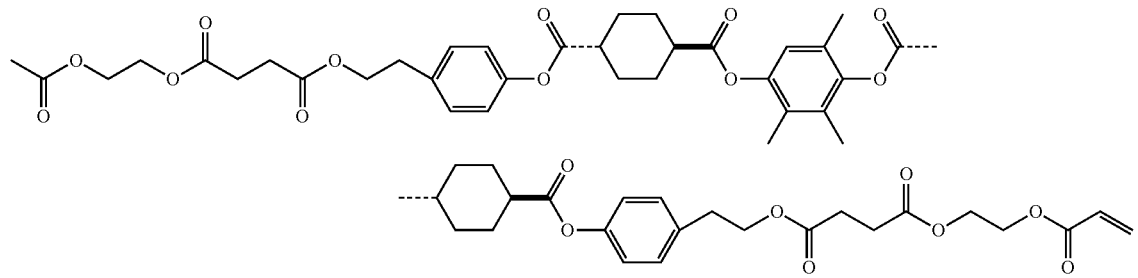
(LC-31)
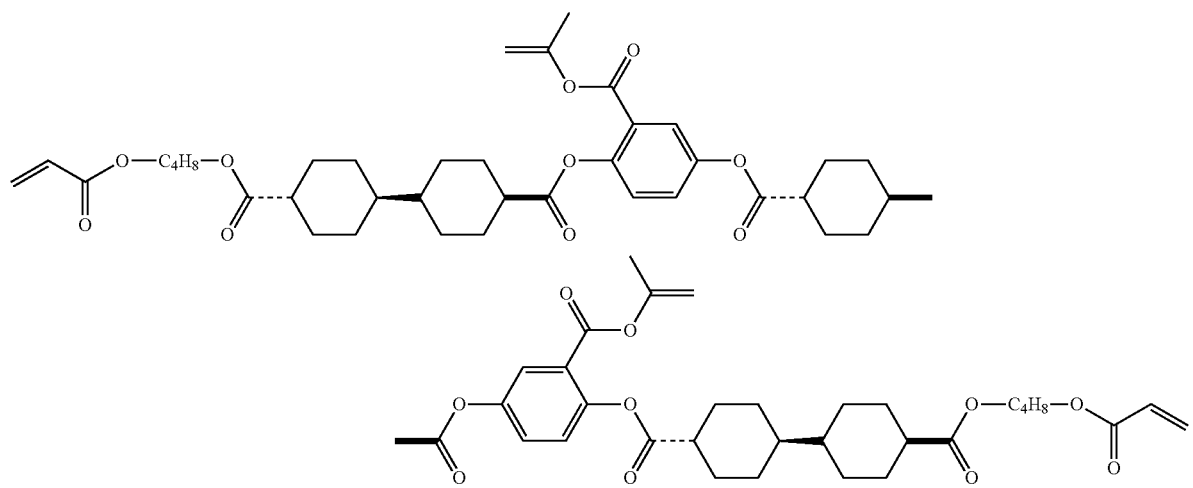
(LC-32)
(LC-33)
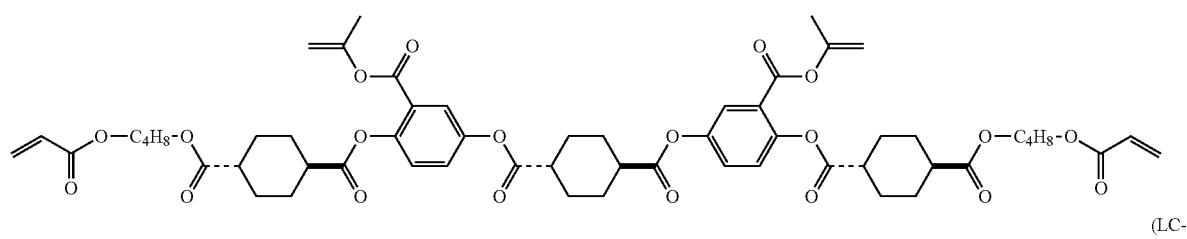
(LC-34)
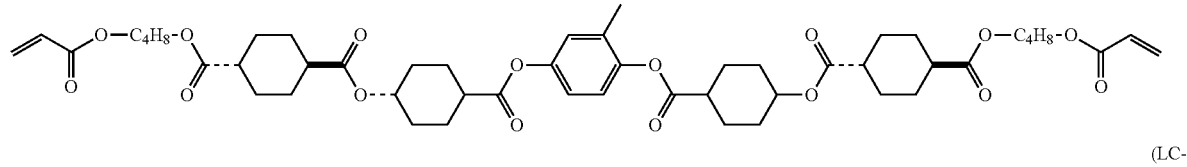
(LC-35)
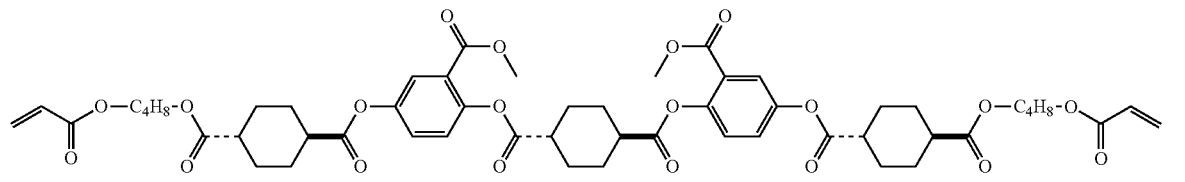
(LC-36)
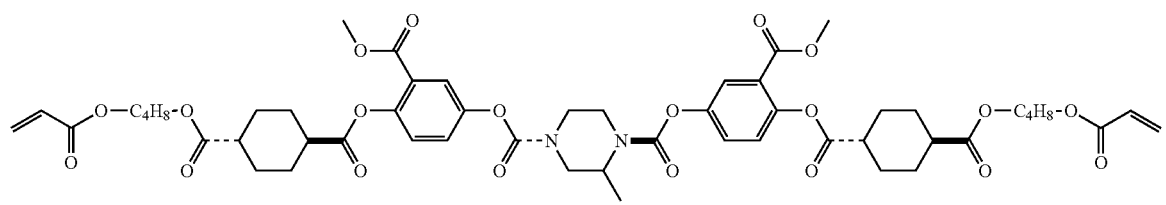

-continued
(LC-37)
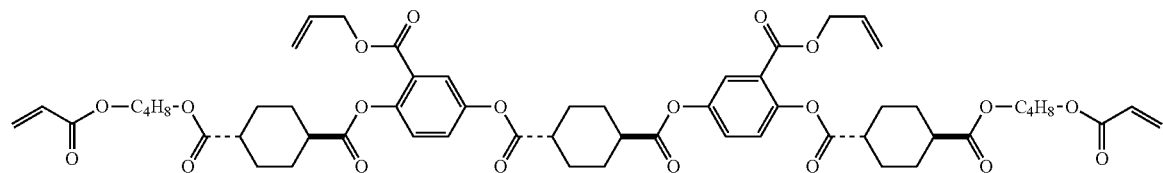
(LC-38)
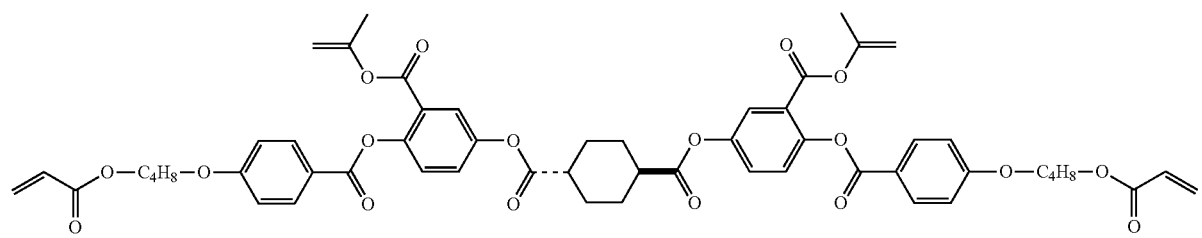
(LC-39)
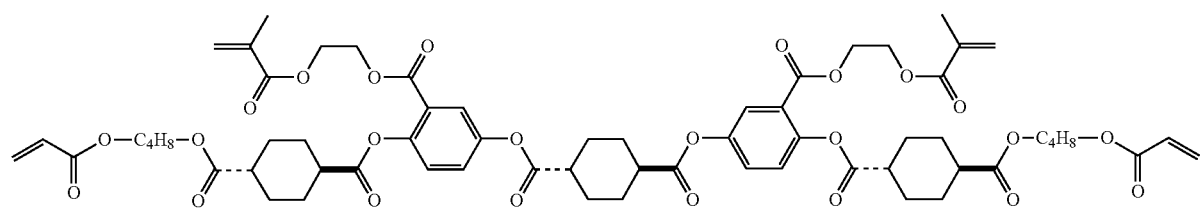
(LC-40)
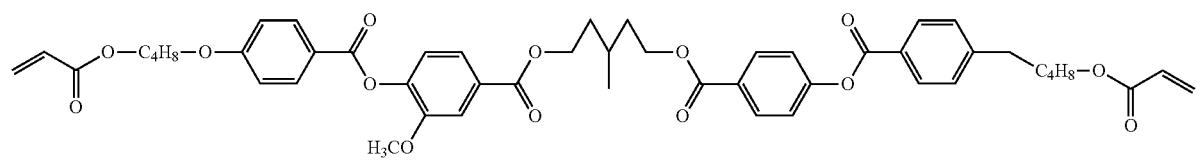
(LC-41)
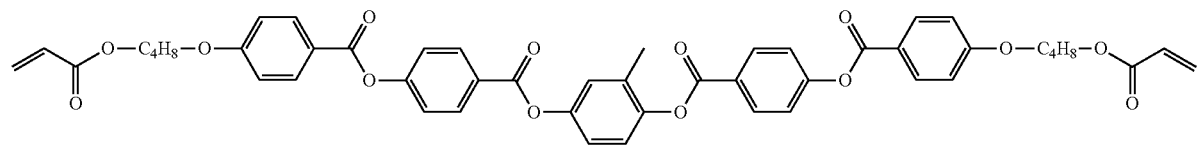
(LC-42)
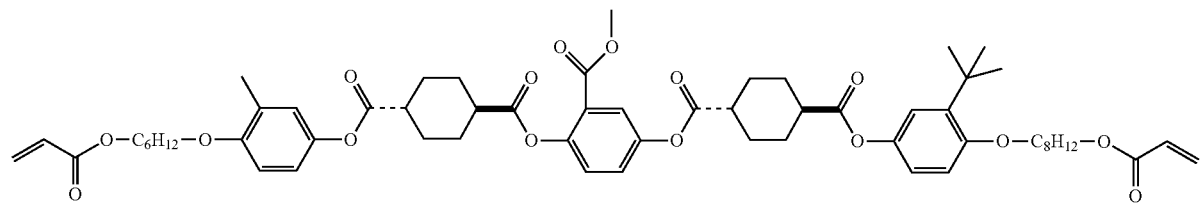

-continued
(LC-43)
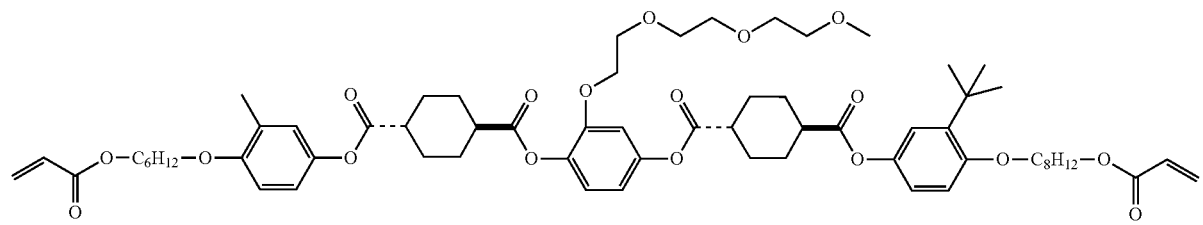
(LC-44)
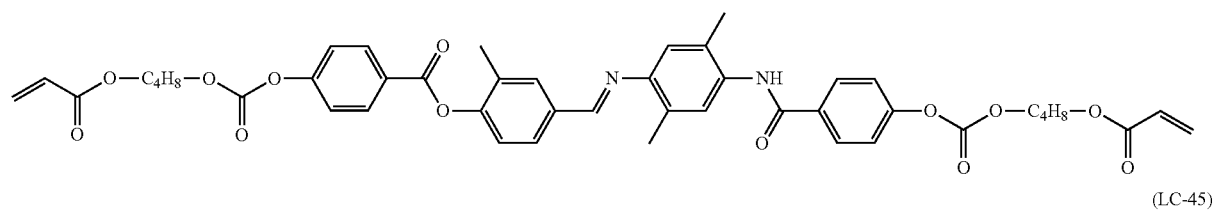
(LC-45)
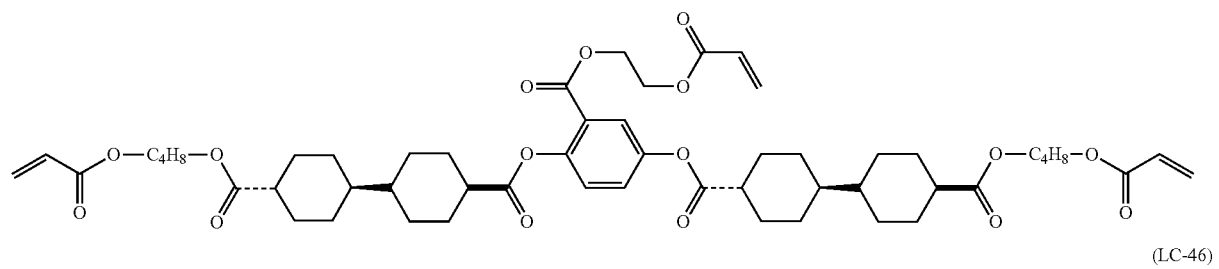
(LC-46)
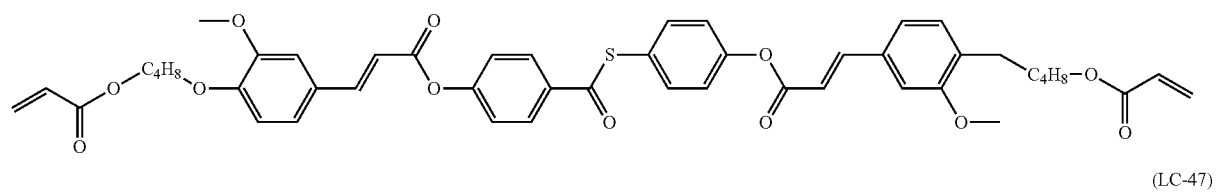
(LC-47)
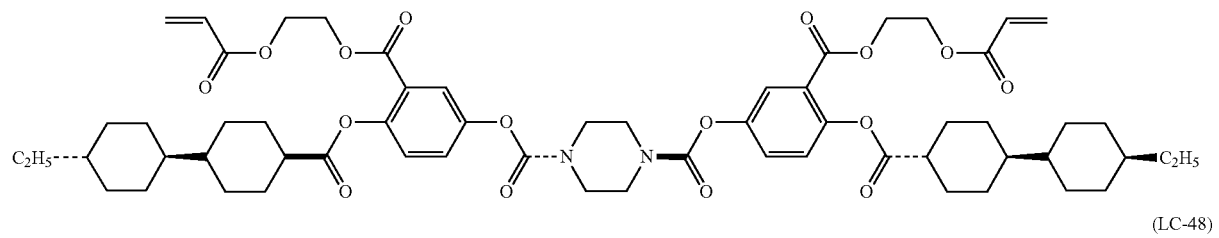
(LC-48)
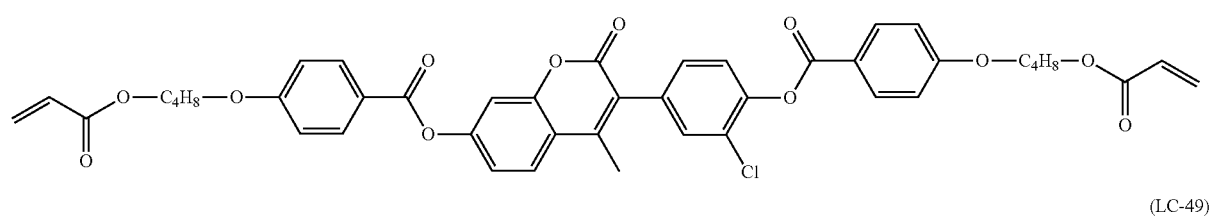
(LC-49)
(LC-50)
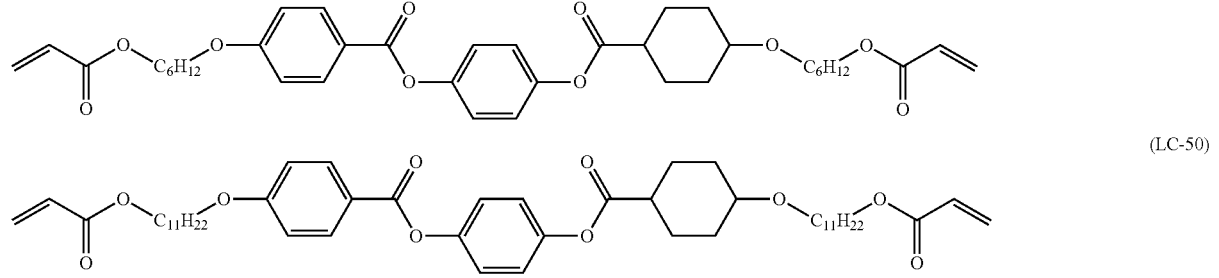

-continued
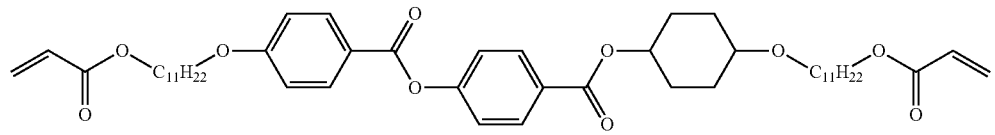
(LC-51)
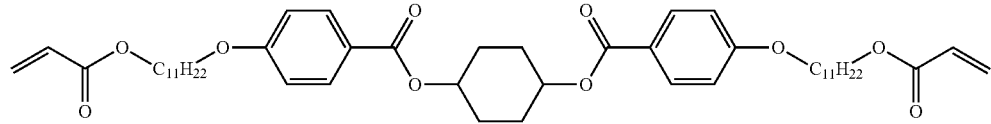
(LC-52)
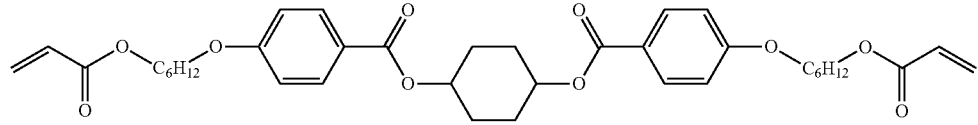
(LC-53)
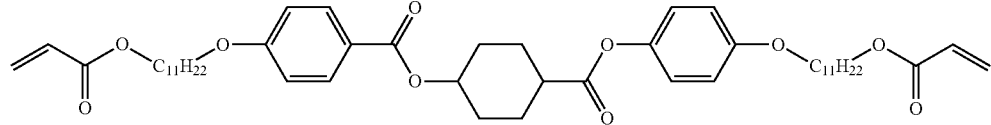
(LC-54)
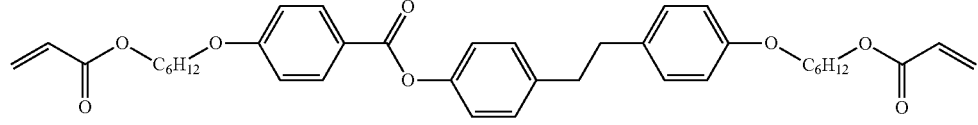
(LC-55)
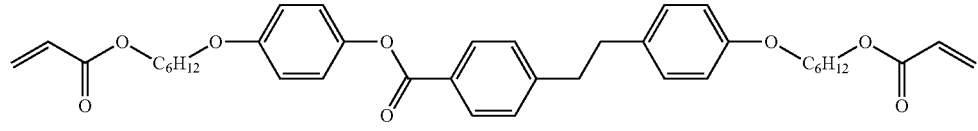
(LC-56)
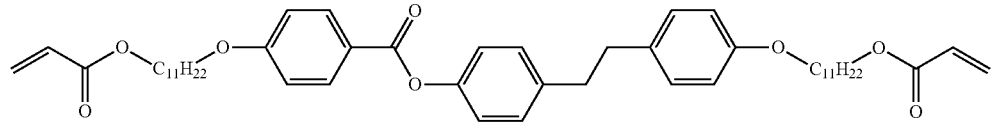
(LC-57)
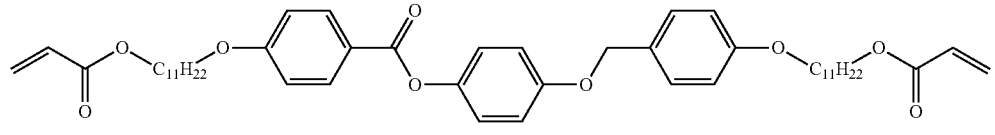
(LC-58)
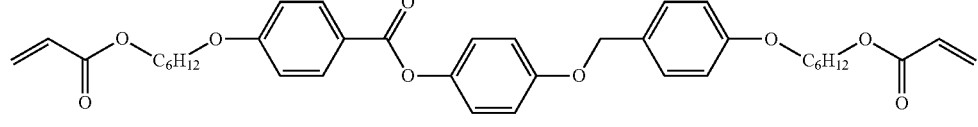
(LC-59)
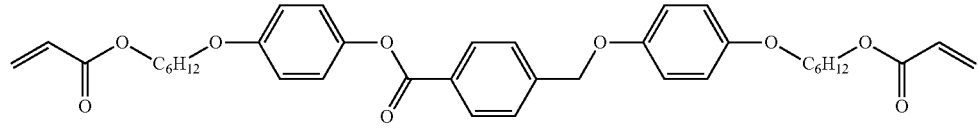
(LC-60)
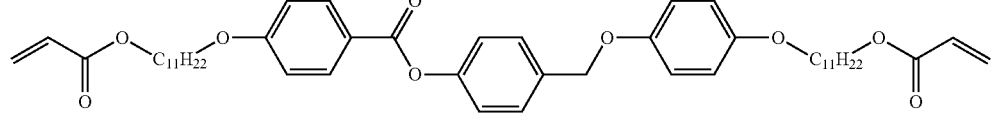
(LC-61)

-continued
(LC-62)
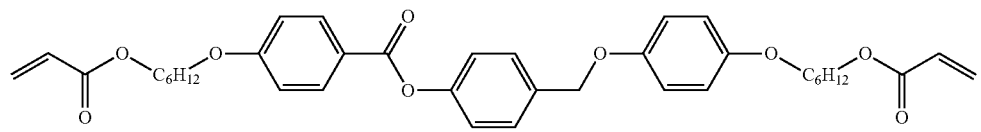
(LC-63)
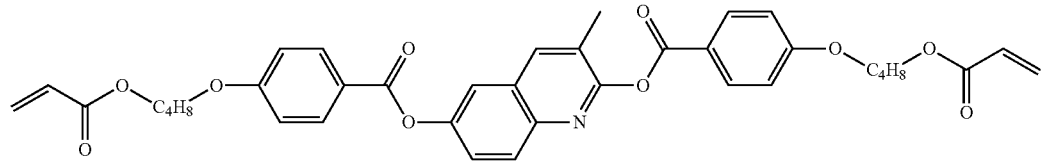
(LC-64)
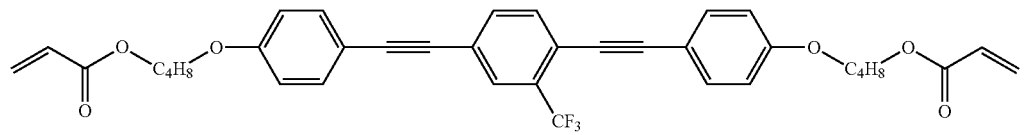
(LC-65)
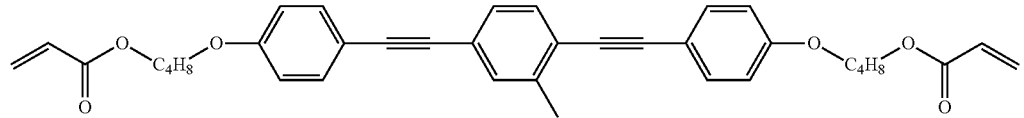
(LC-65)
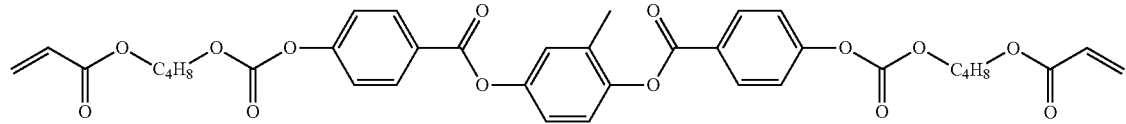
(LC-66)
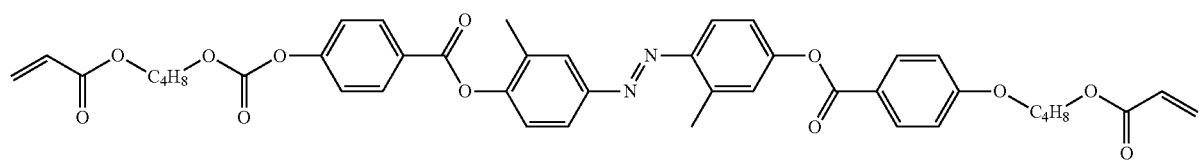
(LC-67)
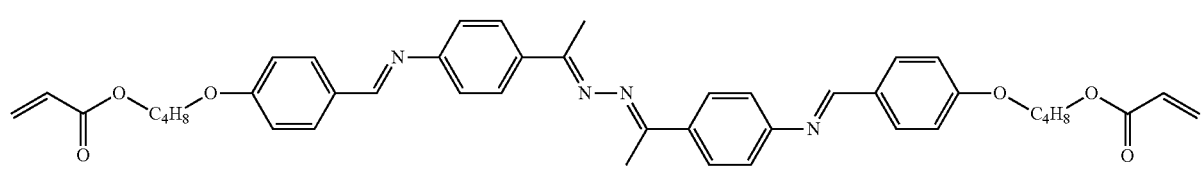
(LC-68)
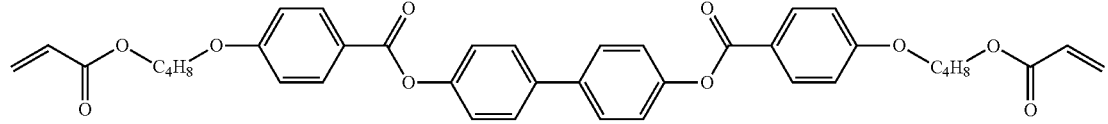
(LC-69)
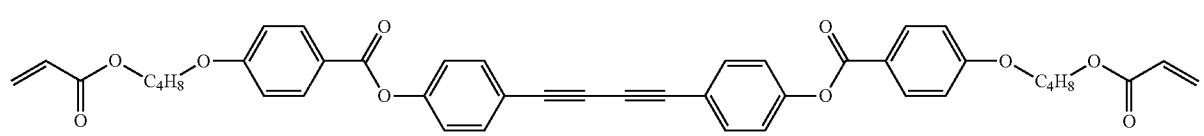
(LC-70)
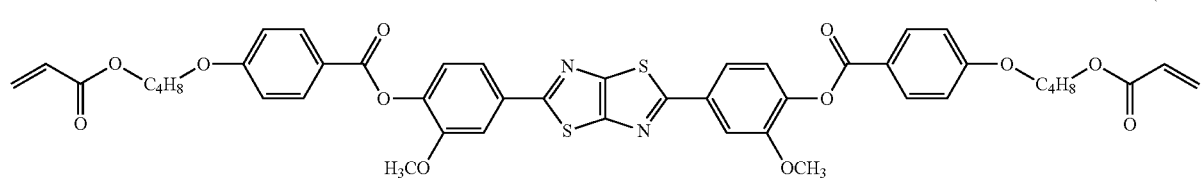

-continued

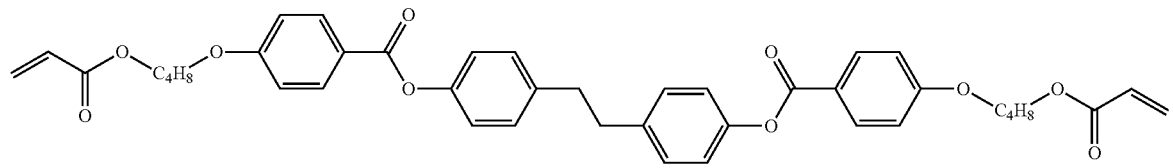
(LC-71)

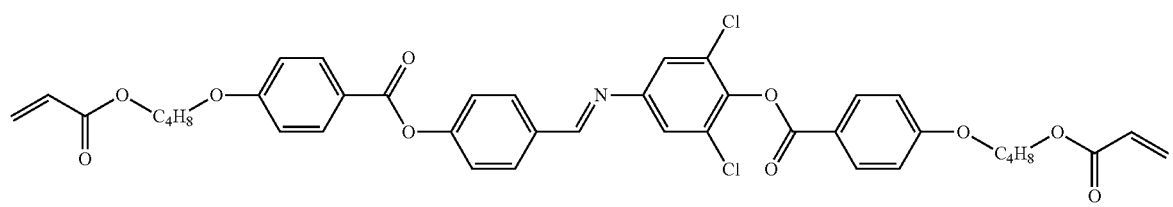
(LC-72)

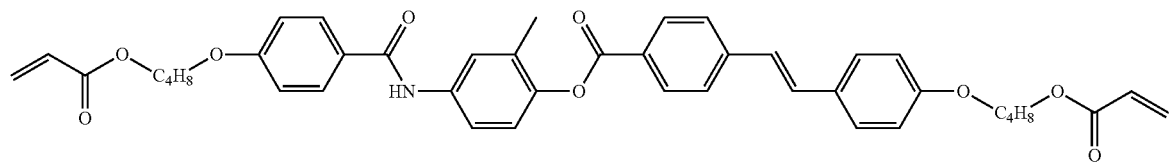
(LC-73)

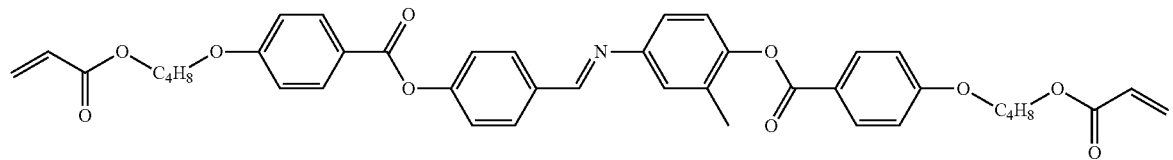
(LC-74)

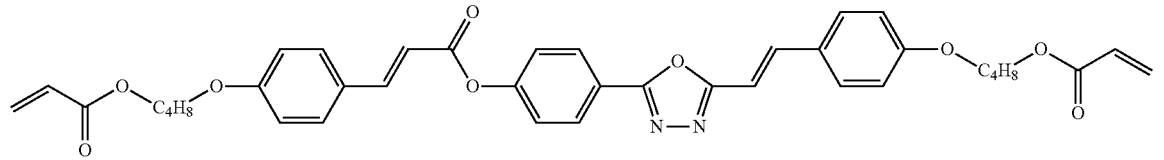
(LC-75)

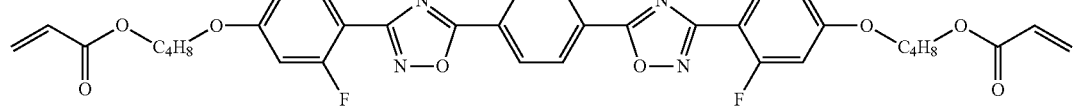
(LC-76)

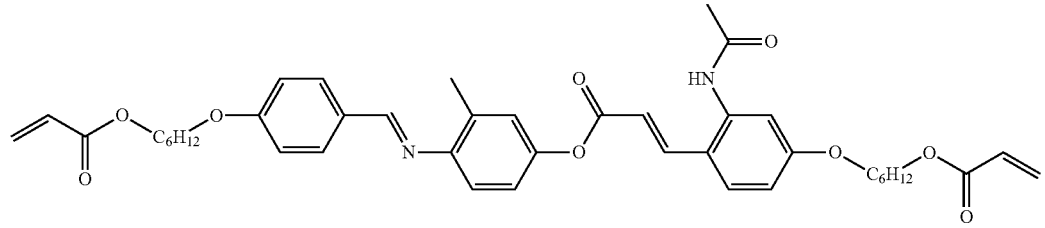
(LC-77)

<Polymer Liquid Crystal Compound>

The polymer liquid crystal compound is preferably a homopolymer or a copolymer having a repeating unit described below, and may be any of a random polymer, a block polymer, a graft polymer, or a star polymer.

(Repeating Unit (1))

It is preferable that the polymer liquid crystal compound has a repeating unit represented by Formula (1) (hereinafter, also referred to as "repeating unit (1)").

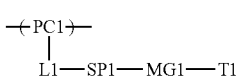
(1)

In Formula (1), PC1 represents the main chain of the repeating unit, L1 represents a single bond or a divalent linking group, SP1 represents a spacer group, MG1 represents a mesogen group MG in Formula (LC), and T1 represents a terminal group.

Examples of the main chain of the repeating unit represented by PC1 include groups represented by Formulae (P1-A) to (P1-D). Among these, from the viewpoints of diversity and handleability of a monomer serving as a raw material, a group represented by Formula (P1-A) is preferable.

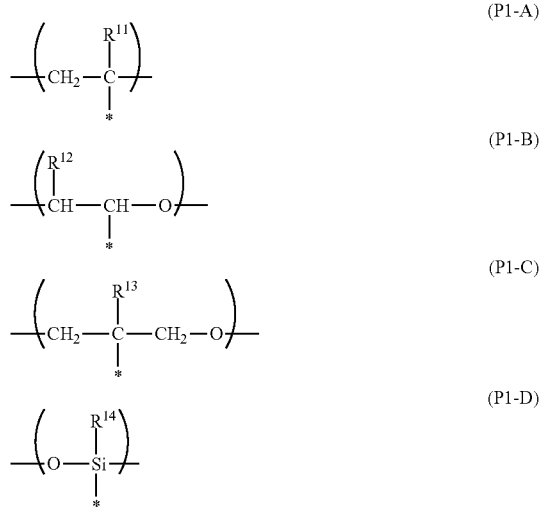

In Formulae (P1-A) to (P1-D), "*" represents a bonding position with respect to L1 in Formula (1). In Formulae (P1-A) to (P1-D), $R^{11}$, $R^{12}$, $R^{13}$, and $R^{14}$ each independently represent a hydrogen atom, a halogen atom, a cyano group, an alkyl group having 1 to 10 carbon atoms, or an alkoxy group having 1 to 10 carbon atoms. The alkyl group may be a linear or branched alkyl group or an alkyl group having a cyclic structure (cycloalkyl group). Further, the number of carbon atoms of the alkyl group is preferably in a range of 1 to 5.

It is preferable that the group represented by Formula (P1-A) is a unit of a partial structure of poly(meth)acrylic acid ester obtained by polymerization of (meth)acrylic acid ester.

It is preferable that the group represented by Formula (P1-B) is an ethylene glycol unit formed by ring-opening polymerization of an epoxy group of a compound containing the epoxy group.

It is preferable that the group represented by Formula (P1-C) is a propylene glycol unit formed by ring-opening polymerization of an oxetane group of a compound containing the oxetane group.

It is preferable that the group represented by Formula (P1-D) is a siloxane unit of a polysiloxane obtained by polycondensation of a compound containing at least one of an alkoxysilyl group or a silanol group. Here, examples of the compound containing at least one of an alkoxysilyl group or a silanol group include a compound containing a group represented by Formula $SiR^{14}(OR^{15})_2$—. In the formula, $R^{14}$ has the same definition as that for $R^{14}$ in Formula (P1-D), and a plurality of $R^{15}$'s each independently represent a hydrogen atom or an alkyl group having 1 to 10 carbon atoms.

The divalent linking group represented by L1 is the same, divalent linking group represented by LW in Formula (W1), and preferred embodiments thereof include —C(O)O—, —OC(O)—, —O—, —S—, —C(O)NR$^{16}$—, —NR$^{16}$C(O)—, —S(O)$_2$—, and —NR$^{16}$R$^{17}$—. In the formulae, $R^{16}$ and $R^{17}$ each independently represent a hydrogen atom or an alkyl group having 1 to 6 carbon atoms which may have a substituent (for example, the substituent W described above). In the specific examples of the divalent linking group described above, the bonding site on the left side is bonded to PC1 and the bonding site on the right side is bonded to SP1.

In a case where PC1 represents a group represented by Formula (P1-A), it is preferable that L1 represents a group represented by —C(O)O— or —C(O)NR$^{16}$—.

In a case where PC1 represents a group represented by any of Formulae (P1-B) to (P1-D), it is preferable that L1 represents a single bond.

Examples of the spacer group represented by SP1 are the same groups as those represented by S1 and S2 in Formula (LC), and from the viewpoint of the alignment degree, a group having at least one structure selected from the group consisting of an oxyethylene structure, an oxypropylene structure, a polysiloxane structure, and an alkylene fluoride structure or a linear or branched alkylene group having 2 to 20 carbon atoms is preferable. However, the alkylene group may contain —O—, —S—, —O—CO—, —CO—O—, —O—CO—O—, —O—CNR— (R represents an alkyl group having 1 to 10 carbon atoms), or —S(O)$_2$—.

From the viewpoints of easily exhibiting liquid crystallinity and the availability of raw materials, it is more preferable that the spacer group represented by SP1 is a group having at least one structure selected from the group consisting of an oxyethylene structure, an oxypropylene structure, a polysiloxane structure, and an alkylene fluoride structure.

Here, as the oxyethylene structure represented by SP1, a group represented by *—(CH$_2$—CH$_2$O)$_{n1}$—* is preferable. In the formula, n1 represents an integer of 1 to 20, and * represents a bonding position with respect to L1 or MG1. From the viewpoint that the effects of the present invention are more excellent, n1 represents preferably an integer of 2 to 10, more preferably an integer of 2 to 6, and most preferably an integer of 2 to 4.

Here, a group represented by *—(CH(CH$_3$)—CH$_2$O)$_{n2}$—* is preferable as the oxypropylene structure represented by SP1. In the formula, n2 represents an integer of 1 to 3, and "*" represents a bonding position with respect to L1 or MG1.

Further, a group represented by *—(Si(CH$_3$)$_2$—O)$_{n3}$—* is preferable as the polysiloxane structure represented by SP1. In the formula, n3 represents an integer of 6 to 10, and "*" represents a bonding position with respect to L1 or MG1.

Further, a group represented by *—(CF$_2$—CF$_2$)$_{n4}$—* is preferable as the alkylene fluoride structure represented by SP1. In the formula, n4 represents an integer of 6 to 10, and "*" represents a bonding position with respect to L1 or MG1.

Examples of the terminal group represented by T1 include a hydrogen atom, a halogen atom, a cyano group, a nitro group, a hydroxy group, —SH, a carboxyl group, a boronic acid group, —SO$_3$H, —PO$_3$H$_2$, —NR$^{11}$R$^{12}$ (here, R$^{11}$ and R$^{12}$ each independently represent a hydrogen atom, a substituted or unsubstituted alkyl group having 1 to 10 carbon atoms, a cycloalkyl group, or an aryl group), an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an acyloxy group having 1 to 10 carbon atoms, an acylamino group having 1 to 10 carbon atoms, an alkoxycarbonyl group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a crosslinkable group-containing group.

Examples of the crosslinkable group-containing group include -L-CL. L represents a single bond or a linking group. Specific examples of the linking group are the same as those for LW and SPW described above. CL represents a crosslinkable group, and examples thereof include a group represented by Q1 or Q2, and a group represented by Formulae (P-1) to (P-30) is preferable. Further, T1 may represent a group obtained by combining two or more of these groups.

From the viewpoint that the effects of the present invention are more excellent, T1 represents preferably an alkoxy group having 1 to 10 carbon atoms, more preferably an alkoxy group having 1 to 5 carbon atoms, and still more preferably a methoxy group. These terminal groups may be further substituted with these groups or the polymerizable groups described in JP2010-244038A.

From the viewpoint that the effects of the present invention are more excellent, the number of atoms in the main chain of T1 is preferably in a range of 1 to 20, more preferably in a range of 1 to 15, still more preferably in a range of 1 to 10, and particularly preferably in a range of 1 to 7. In a case where the number of atoms in the main chain of T1 is 20 or less, the alignment degree of the light absorption anisotropic layer is further improved. Here, "main chain" in T1 indicates the longest molecular chain bonded to M1, and the number of hydrogen atoms is not included in the number of atoms in the main chain of T1. For example, the number of atoms in the main chain is 4 in a case where T1 represents an n-butyl group, the number of atoms in the main chain is 3 in a case where T1 represents a sec-butyl group.

The content of the repeating unit (1) is preferably in a range of 40% to 100% by mass and more preferably in a range of 50% to 95% by mass with respect to all the repeating units (100% by mass) of the polymer liquid crystal compound. In a case where the content of the repeating unit (1) is 40% by mass or greater, an excellent light absorption anisotropic layer can be obtained due to satisfactory aligning properties. Further, in a case where the content of the repeating unit (1) is 100% by mass or less, an excellent light absorption anisotropic layer can be obtained due to satisfactory aligning properties.

The polymer liquid crystal compound may have only one or two or more kinds of repeating units (1). In a case where the polymer liquid crystal compound has two or more kinds of repeating units (1), the content of the repeating unit (1) indicates the total content of the repeating units (1).

(Log P Value)

In Formula (1), a difference ($|\log P_1 - \log P_2|$) between the log P value of PC1, L1, and SP1 (hereinafter, also referred to as "log $P_1$") and the log P value of MG1 (hereinafter, also referred to as "log $P_2$") is preferably 4 or greater. Further, from the viewpoint of further improving the alignment degree of the light absorption anisotropic layer, the difference thereof is more preferably 4.25 or greater and still more preferably 4.5 or greater.

Further, from the viewpoints of adjusting the liquid crystal phase transition temperature and the synthetic suitability, the upper limit of the difference is preferably 15 or less, more preferably 12 or less, and still more preferably 10 or less.

Here, the log P value is an index for expressing the properties of the hydrophilicity and hydrophobicity of a chemical structure and is also referred to as a hydrophilic-hydrophobic parameter. The log P value can be calculated using software such as ChemBioDraw Ultra or HSPiP (Ver. 4.1.07). Further, the log P value can be acquired experimentally by the method of the OECD Guidelines for the Testing of Chemicals, Sections 1, Test No. 117 or the like. In the present invention, a value calculated by inputting the structural formula of a compound to HSPiP (Ver. 4.1.07) is employed as the log P value unless otherwise specified.

The log $P_1$ indicates the log P value of PC1, L1, and SP1 as described above. The expression "log P value of PC1, L1, and SP1" indicates the log P value of a structure in which PC1, L1, and SP1 are integrated and is not the sum of the log P values of PC1, L1, and SP1. Specifically, the log $P_1$ is calculated by inputting a series of structural formulae of PC1 to SP1 in Formula (1) into the above-described software.

Here, in the calculation of the log $P_1$, in regard to the part of the group represented by PC1 in the series of structural formulae of PC1 to SP1, the structure of the group itself represented by PC1 (for example, Formulae (P1-A) to (P1-D) described above) may be used or a structure of a group that can be PC1 after polymerization of a monomer used to obtain the repeating unit represented by Formula (1) may be used.

Here, specific examples of the latter (the group that can be PC1) are as follows. In a case where PC1 is obtained by polymerization of (meth)acrylic acid ester, PC1 represents a group represented by $CH_2=C(R^1)-$ ($R^1$ represents a hydrogen atom or a methyl group). Further, PC1 represents ethylene glycol in a case where PC1 is obtained by polymerization of ethylene glycol, and PC1 represents propylene glycol in a case where PC1 is obtained by polymerization of propylene glycol. Further, in a case where PC1 is obtained by polycondensation of silanol, PC1 represents silanol (a compound represented by Formula $Si(R^2)_3(OH)$, and a plurality of $R^2$'s each independently represent a hydrogen atom or an alkyl group, where at least one of the plurality of $R^2$'s represents an alkyl group).

The log P1 may be less than the log $P_2$ or greater than the log $P_2$ in a case where the difference between log $P_1$ and log $P_2$ described above is 4 or greater.

Here, the log P value of a general mesogen group (the log $P_2$ described above) tends to be in a range of 4 to 6. In a case where the log $P_1$ is less than the log $P_2$, the value of log P1 is preferably 1 or less and more preferably 0 or less. Further, in a case where the log $P_1$ is greater than the log $P_2$, the value of log $P_1$ is preferably 8 or greater and more preferably 9 or greater.

In a case where PC1 in Formula (1) is obtained by polymerization of (meth)acrylic acid ester and the log $P_1$ is less than the log $P_2$, the log P value of SP1 in Formula (1) is preferably 0.7 or less and more preferably 0.5 or less. Further, in a case where PC1 in Formula (1) is obtained by polymerization of (meth)acrylic acid ester and the log $P_1$ is greater than the log $P_2$, the log P value of SP1 in Formula (1) is preferably 3.7 or greater and more preferably 4.2 or greater.

Further, examples of the structure having a log P value of 1 or less include an oxyethylene structure and an oxypropylene structure. Examples of the structure having a log P value of 6 or greater include a polysiloxane structure and an alkylene fluoride structure.

(Repeating Units (21) and (22))

From the viewpoint of improving the alignment degree, it is preferable that the polymer liquid crystal compound has a repeating unit having an electron-donating property and/or an electron-withdrawing property at a terminal. More specifically, it is more preferable that the polymer liquid crystal compound has a repeating unit (21) containing a mesogen group and an electron-withdrawing group present at the terminal of the mesogen group and having a σp value of greater than 0 and a repeating unit (22) containing a mesogen group and a group present at the terminal of the mesogen group and having a σp value of 0 or less. As described above, in a case where the polymer liquid crystal compound has the repeating unit (21) and the repeating unit (22), the alignment degree of the light absorption anisotropic layer to be formed of the polymer liquid crystal compound is further improved as compared with a case where the polymer liquid crystal compound has only one of the repeating unit (21) or the repeating unit (22). The details of the reason for this are not clear, but it is assumed as follows.

That is, it is assumed that since the opposite dipole moments generated in the repeating unit (21) and the repeating unit (22) interact between molecules, the interaction between the mesogen groups in the minor axis direction is strengthened, and the orientation in which the liquid crystals are aligned is more uniform, and as a result, the degree of order of the liquid crystals is considered to be high. In this manner, it is assumed that the aligning properties of the dichroic substance are enhanced, and thus the alignment degree of the light absorption anisotropic layer to be formed increases.

Further, the repeating units (21) and (22) may be the repeating units represented by Formula (1).

The repeating unit (21) contains a mesogen group and an electron-withdrawing group present at the terminal of the mesogen group and having a σp value of greater than 0.

The electron-withdrawing group is a group that is positioned at the terminal of the mesogen group and has a σp value of greater than 0. Examples of the electron-withdrawing group (a group having a σp value of greater than 0) include a group represented by EWG in Formula (LCP-21) described below, and specific examples thereof are also the same as those described below.

The σp value of the electron-withdrawing group described above is greater than 0. From the viewpoint of further increasing the alignment degree of the light absorption anisotropic layer, the σp value is preferably 0.3 or greater and more preferably 0.4 or greater. From the viewpoint that the uniformity of alignment is excellent, the upper limit of the σp value of the electron-withdrawing group is preferably 1.2 or less and more preferably 1.0 or less.

The σp value is a Hammett's substituent constant σp value. (also simply referred to as "σp value") and is a parameter showing the intensity of the electron-withdrawing property and the electron-donating property of a substituent, which numerically expresses the effect of the substituent on the acid dissociation equilibrium constant of substituted benzoic acid. The Hammett's substituent constant σp value in the present specification indicates the substituent constant σ in a case where the substituent is positioned at the para position of benzoic acid.

As the Hammett's substituent constant σp value of each group in the present specification, the values described in the document "Hansch et al., Chemical Reviews, 1991, Vol, 91, No. 2, pp. 165 to 195" are employed. Further, the Hammett's substituent constant σp values can be calculated for groups whose Hammett's substituent constant σp values are not described in the document described above using software "ACD/ChemSketch (ACD/Labs 8.00 Release Product Version: 8.08)" based on a difference between the pKa of benzoic acid and the pKa of a benzoic acid derivative having a substituent at the para position.

The repeating unit (21) is not particularly limited as long as the repeating unit (21) contains, at a side chain thereof, a mesogen group and an electron-withdrawing group present at the terminal of the mesogen group and having a σp value of greater than 0, and from the viewpoint of further increasing the alignment degree of the light absorption anisotropic layer, it is preferable that the repeating unit (21) is a repeating unit represented by Formula (LCP-21).

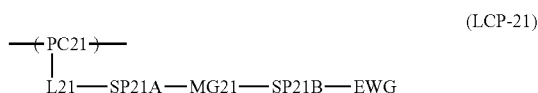

(LCP-21)

In Formula (LCP-21), PC21 represents the main chain of the repeating unit and more specifically the same structure as that for PC1 in Formula (1), L21 represents a single bond or a divalent linking group and more specifically the same structure as that for L1 in Formula (1), SP21A and SP21B each independently represent a single bond or a spacer group and more specifically the same structure as that for SP1 in Formula (1), MG21 represents a mesogen structure and more specifically a mesogen group MG in Formula (LC), and EWG represents an electron-withdrawing group having a σp value of greater than 0.

The spacer group represented by SP21A and SP21B is a group represented by Formulae S1 and S2, and a group having at least one structure selected from the group consisting of an oxyethylene structure, an oxypropylene structure, a polysiloxane structure, and an alkylene fluoride structure or a linear or branched alkylene group having 2 to 20 carbon atoms is preferable. Here, the alkylene group may contain —O—, —O—CO—, —CO—O—, or —O—CO—O—.

From the viewpoints of easily exhibiting liquid crystallinity and the availability of raw materials, it is preferable that the spacer group represented by SP1 has at least one structure selected from the group consisting of an oxyethylene structure, an oxypropylene structure, a polysiloxane structure, and an alkylene fluoride structure.

It is preferable that SP21B represents a single bond or a linear or branched alkylene group having 2 to 20 carbon atoms. Here, the alkylene group may contain —O—, —O—CO—, —CO—O—, or —O—CO—O—.

Among these, from the viewpoint of further increasing the alignment degree of the light absorption anisotropic layer, a single bond is preferable as the spacer group represented by SP21B. In other words, it is preferable that the repeating unit (21) has a structure in which EWG that represents an electron-withdrawing group in Formula (LCP-21) is directly linked to MG21 that represents a mesogen group in Formula (LCP-21). In this manner, it is assumed that in a case where the electron-withdrawing group is directly linked to the mesogen group, the intermolecular interaction due to an appropriate dipole moment works more effectively in the polymer liquid crystal compound, and the orientation in which the liquid crystals are aligned is more uniform, and as a result, the degree of order of the liquid crystals and the alignment degree are considered to be high.

EWG represents an electron-withdrawing group having a σp value of greater than 0. Examples of the electron-withdrawing group having a up value of greater than 0 includes an ester group (specifically, a group represented by *—C(O)O—$R^E$), a (meth)acryloyl group, a (meth)acryloyloxy group, a carboxy group, a cyano group, a nitro group, a sulfo group, —S(O)(O)—O$R^E$, —S(O)(O)—$R^E$, —O—S(O)(O)—$R^E$, an acyl group (specifically, a group represented by *—C(O)$R^E$), an acyloxy group (specifically, a group represented by *—OC(O)$R^E$), an isocyanate group (—N=C(O)), *—C(O)N($R^F$)$_2$, a halogen atom, and an alkyl group substituted with any of these groups (preferably having 1 to 20 carbon atoms). In each of the above-described groups, * represents a bonding position with respect to SP21B. $R^E$ represents an alkyl group having 1 to 20 carbon atoms (preferably 1 to 4 carbon atoms and more preferably 1 or 2 carbon atoms). $R^F$'s each independently represents a hydrogen atom or an alkyl group having 1 to 20 carbon atoms (preferably 1 to 4 carbon atoms and more preferably 1 or 2 carbon atoms).

Among the above-described groups, from the viewpoint of further exhibiting the effects of the present invention, it is preferable that EWG represents a group represented by *—C(O)O—$R^E$, a (meth)acryloyloxy group, a cyano group, or a nitro group.

From the viewpoint that the polymer liquid crystal compound and the dichroic substance can be uniformly aligned while a high alignment degree of the light absorption anisotropic layer is maintained, the content of the repeating unit (21) is preferably 60% by mass or less, more preferably 50% by mass or less, and still more preferably 45% by mass or less with respect to all the repeating units (100% by mass) of the polymer liquid crystal compound.

From the viewpoint of further exhibiting the effects of the present invention, the lower limit of the content of the repeating unit (21) is preferably 1% by mass or greater and more preferably 3% by mass or greater with respect to all the repeating units (100% by mass) of the polymer liquid crystal compound.

In the present invention, the content of each repeating unit contained in the polymer liquid crystal compound is calculated based on the charged amount (mass) of each monomer used for obtaining each repeating unit.

The polymer liquid crystal compound may have only one or two or more kinds of repeating units (21). In a case where the polymer liquid crystal compound has two or more kinds of repeating units (21), there is an advantage in that the solubility of the polymer liquid crystal compound in a solvent is improved and the liquid crystal phase transition temperature is easily adjusted. In the case where the polymer liquid crystal compound has two or more kinds of repeating units (21), it is preferable that the total amount thereof is in the above-described range.

In the case where the polymer liquid crystal compound has two or more kinds of repeating units (21), a repeating unit (21) that does not contain a crosslinkable group in EWG and a repeating unit (21) that contains a polymerizable group in EWG may be used in combination. In this manner, the curing properties of the light absorption anisotropic layer are further improved. Further, preferred examples of the crosslinkable group include a vinyl group, a butadiene group, a (meth)acryl group, a (meth)acrylamide group, a vinyl acetate group, a fumaric acid ester group, a styryl group, a vinylpyrrolidone group, a maleic acid anhydride, a maleimide group, a vinyl ether group, an epoxy group, and an oxetanyl group.

In this case, from the viewpoint of the balance between the curing properties and the alignment degree of the light absorption anisotropic layer, the content of the repeating unit (21) containing a polymerizable group in EWG is preferably in a range of 1% to 30% by mass with respect to all the repeating units (100% by mass) of the polymer liquid crystal compound.

Hereinafter, examples of the repeating unit (21) will be described, but the repeating unit (21) is not limited to the following repeating units.

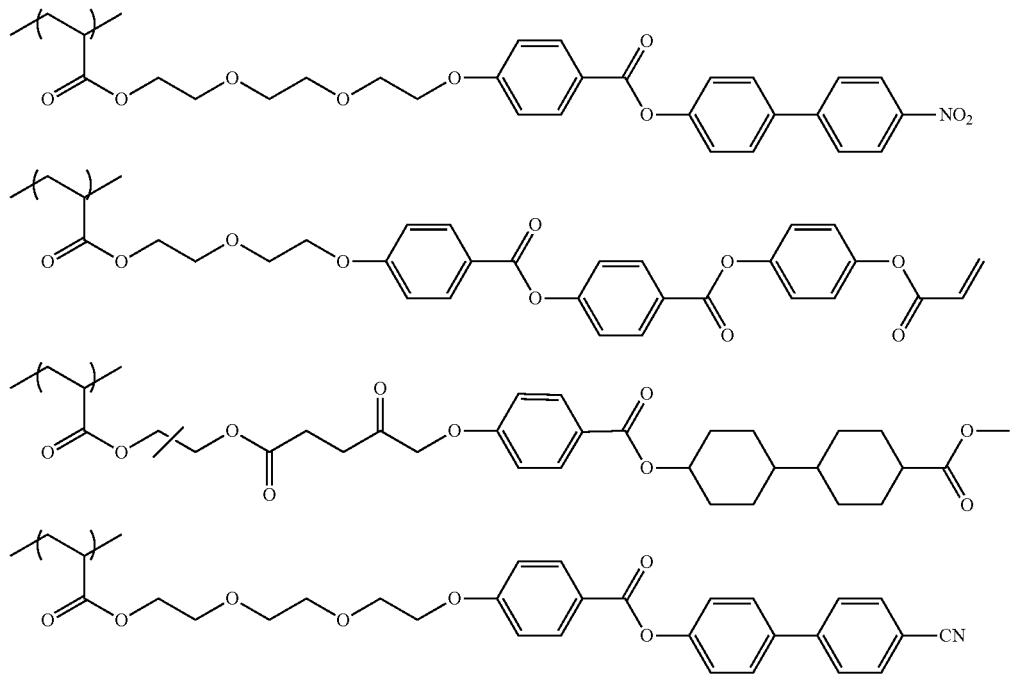

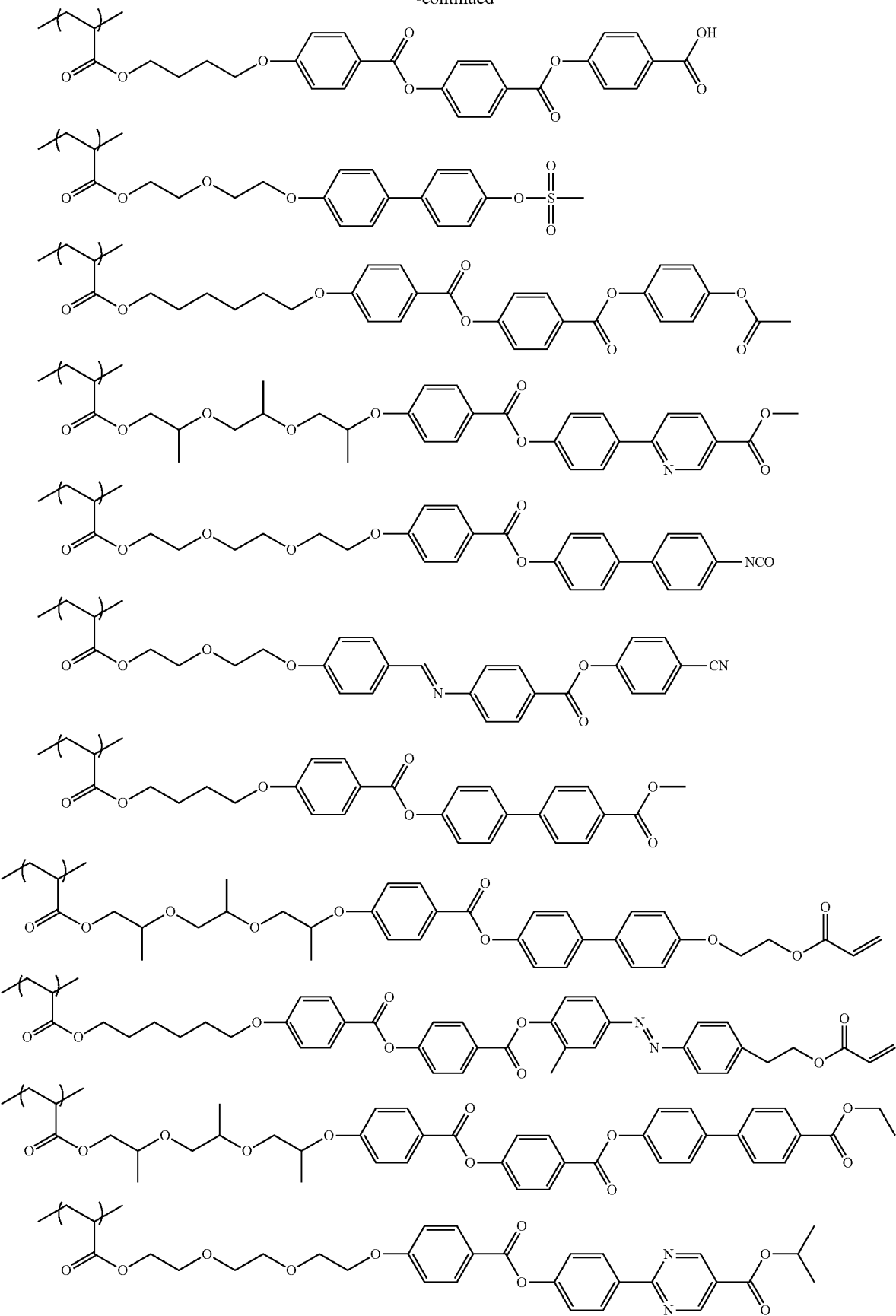

-continued

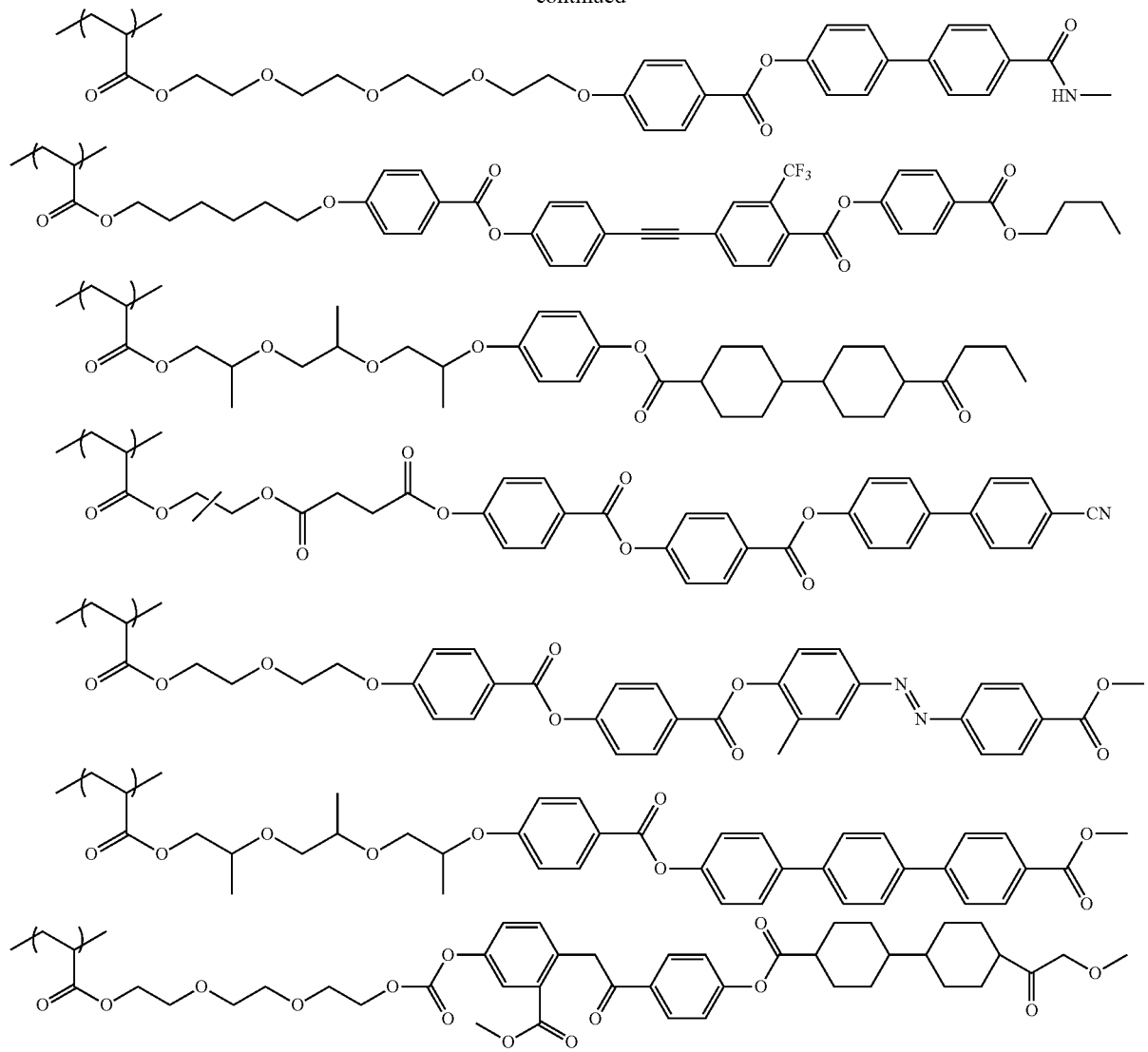

As a result of intensive examination on the composition (content ratio) and the electron-donating property and the electron-withdrawing property of the terminal groups of the repeating unit (21) and the repeating unit (22), the present inventors found that the alignment degree of the light absorption anisotropic layer is further increased by decreasing the content ratio of the repeating unit (21) in a case where the electron-withdrawing property of the electron-withdrawing group of the repeating unit (21) is high (that is, in a case where the σp value is large), and the alignment degree of the light absorption anisotropic layer is further increased by increasing the content ratio of the repeating unit (21) in a case where the electron-withdrawing property of the electron-withdrawing group of the repeating unit (21) is low (that is, in a case where the σp value is close to 0).

The details of the reason for this are not clear, but it is assumed as follows. That is, it is assumed that since the intermolecular interaction due to an appropriate dipole moment works in the polymer liquid crystal compound, the orientation in which the liquid crystals are aligned is more uniform, and as a result, the degree of order of the liquid crystals and the alignment degree of the light absorption anisotropic layer are considered to be high.

Specifically, the product of the σp value of the electron-withdrawing group (EWG in Formula (LCP-21)) in the repeating unit (21) and the content ratio (on a mass basis) of the repeating unit (21) to the polymer liquid crystal compound is preferably in a range of 0.020 to 0.150, more preferably in a range of 0.050 to 0.130, and still more preferably in a range of 0.055 to 0.125. In a case where the product is in the above-described range, the alignment degree of the light absorption anisotropic layer is further increased.

The repeating unit (22) contains a mesogen group and a group present at the terminal of the mesogen group and having a σp value of 0 or less. In a case where the polymer liquid crystal compound has the repeating unit (22), the polymer liquid crystal compound and the dichroic substance can be uniformly aligned.

The mesogen group is a group showing the main skeleton of a liquid crystal compound that contributes to liquid crystal formation, and the details thereof are as described in the section of MG in Formula (LCP-22) described below, and specific examples thereof are also the same as described below.

The above-described group is positioned at the terminal of the mesogen group and has a σp value of 0 or less. Examples of the above-described group (a group having a σp value of 0 or less) includes a hydrogen atom having a σp value of 0 and a group (electron-donating group) having a σp value of less than 0 and represented by T22 in Formula (LCP-22). Among the above-described groups, specific example of the group having a σp value of less than 0 (electron-donating group) are the same as those for T22 in Formula (LCP-22) described below.

The σp value of the above-described group is 0 or less, and from the viewpoint that the uniformity of alignment is more excellent, the σp value is preferably less than 0, more preferably −0.1 or less, and still more preferably −0.2 or less. The lower limit of the σp value of the above-described group is preferably −0.9 or greater and more preferably −0.7 or greater.

The repeating unit (22) is not particularly limited as long as the repeating unit (22) contains, at a side chain thereof, a mesogen group and a group present at the terminal of the mesogen group and having a σp value of 0 or less, and from the viewpoint of further increasing the uniformity of alignment of liquid crystals, it is preferable that the repeating unit (22) is a repeating unit represented by Formula (PCP-22) which does not correspond to a repeating unit represented by Formula (LCP-21).

In Formula (LCP-22), PC22 represents the main chain of the repeating unit and more specifically the same structure as that for PC1 in Formula (1), L22 represents a single bond or a divalent linking group and more specifically the same structure as that for L1 in Formula (1), SP22 represents a spacer group and more specifically the same structure as that for SP1 in Formula (1), MG22 represents a mesogen structure and more specifically the same structure as the mesogen group MG in Formula (LC), and T22 represents an electron-donating group having a Hammett's substituent constant σp value of less than 0.

T22 represents an electron-donating group having a σp value of less than 0. Examples of the electron-donating group having a σp value of less than 0 include a hydroxy group, an alkyl group having 1 to 10 carbon atoms, an alkoxy group having 1 to 10 carbon atoms, and an alkylamino group having 1 to 10 carbon atoms.

In a case where the number of atoms in the main chain of T22 is 20 or less, the alignment degree of the light absorption anisotropic layer is further improved. Here, "main chain" in T22 indicates the longest molecular chain bonded to MG22, and the number of hydrogen atoms is not included in the number of atoms in the main chain of T22. For example, the number of atoms in the main chain is 4 in a case where T22 represents an n-butyl group, and the number of atoms in the main chain is 3 in a case where T22 represents a sec-butyl group.

Hereinafter, examples of the repeating unit (22) will be described, but the repeating unit (22) is not limited to the following repeating units.

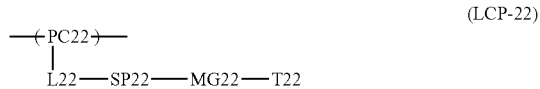

(LCP-22)

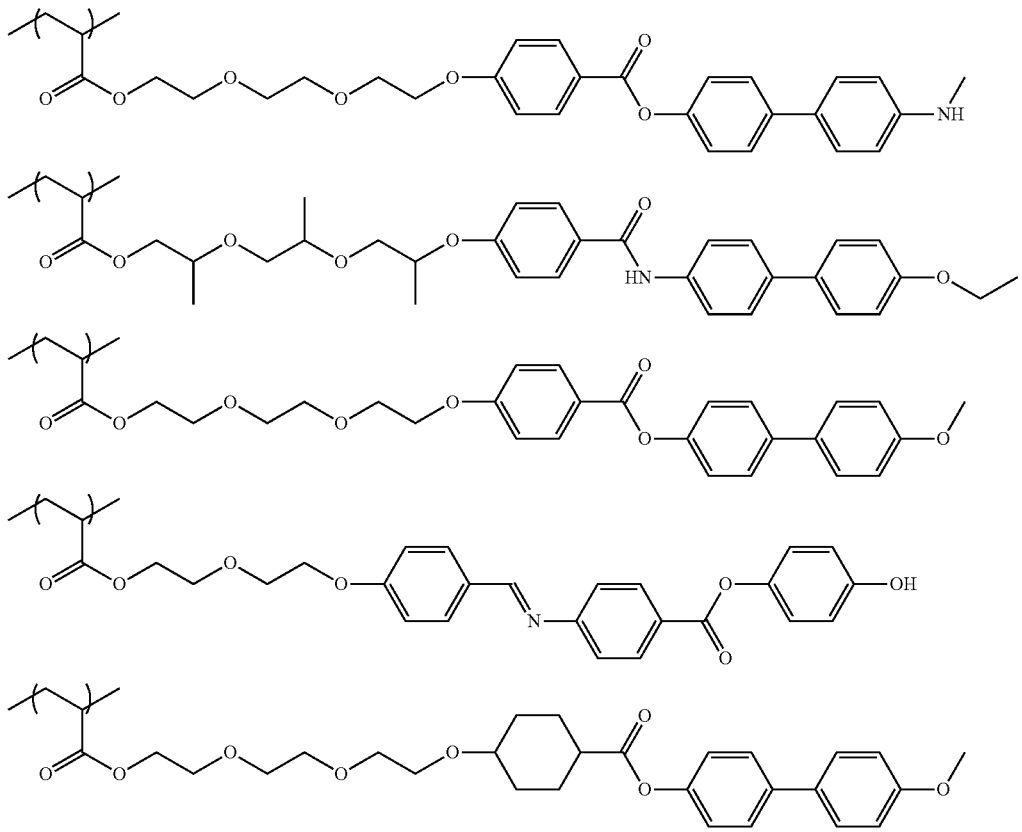

-continued
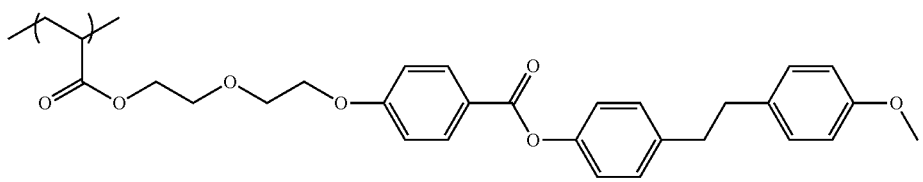
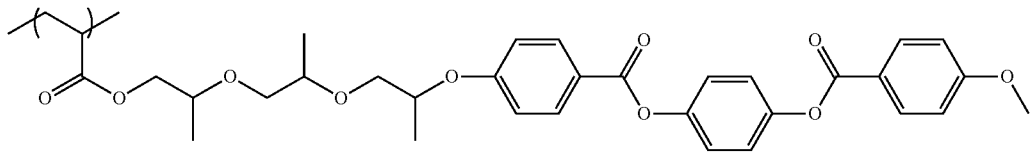
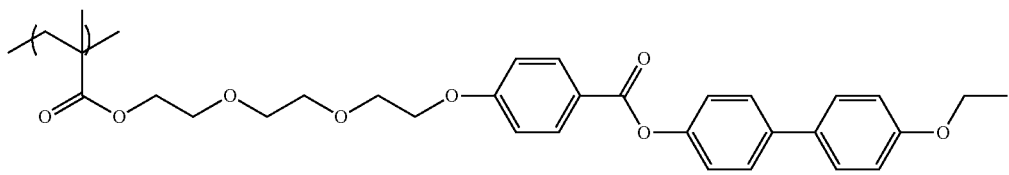
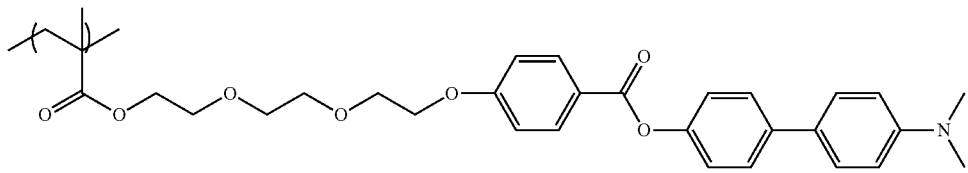
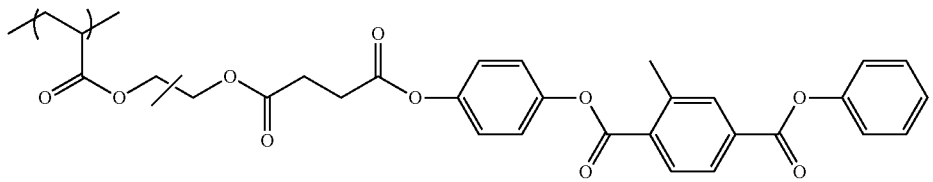
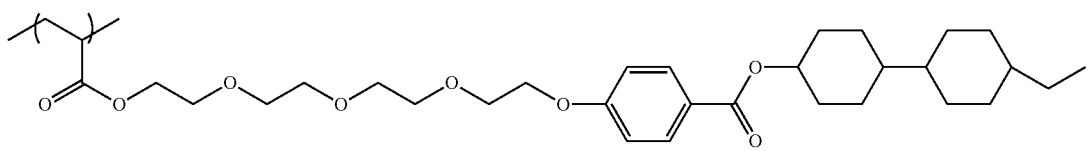
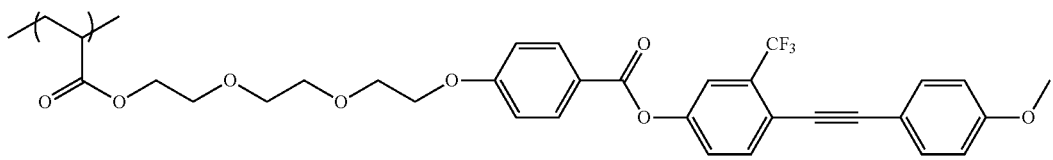
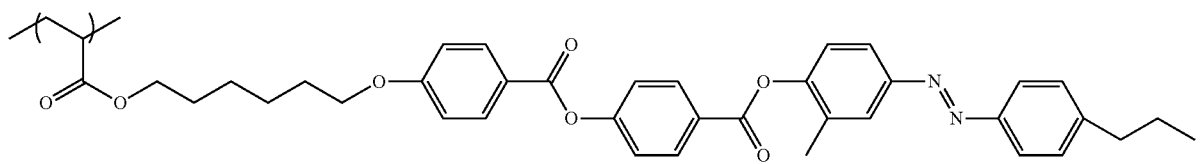
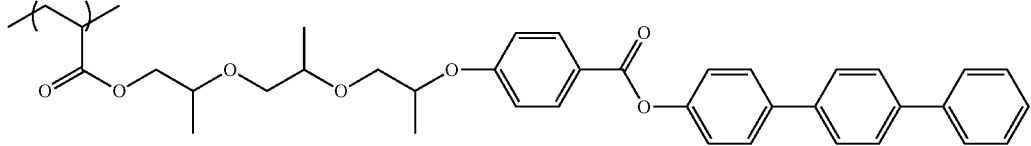
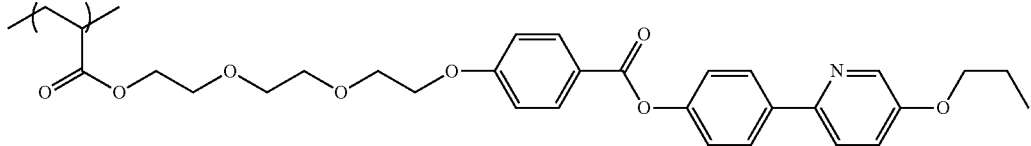

-continued

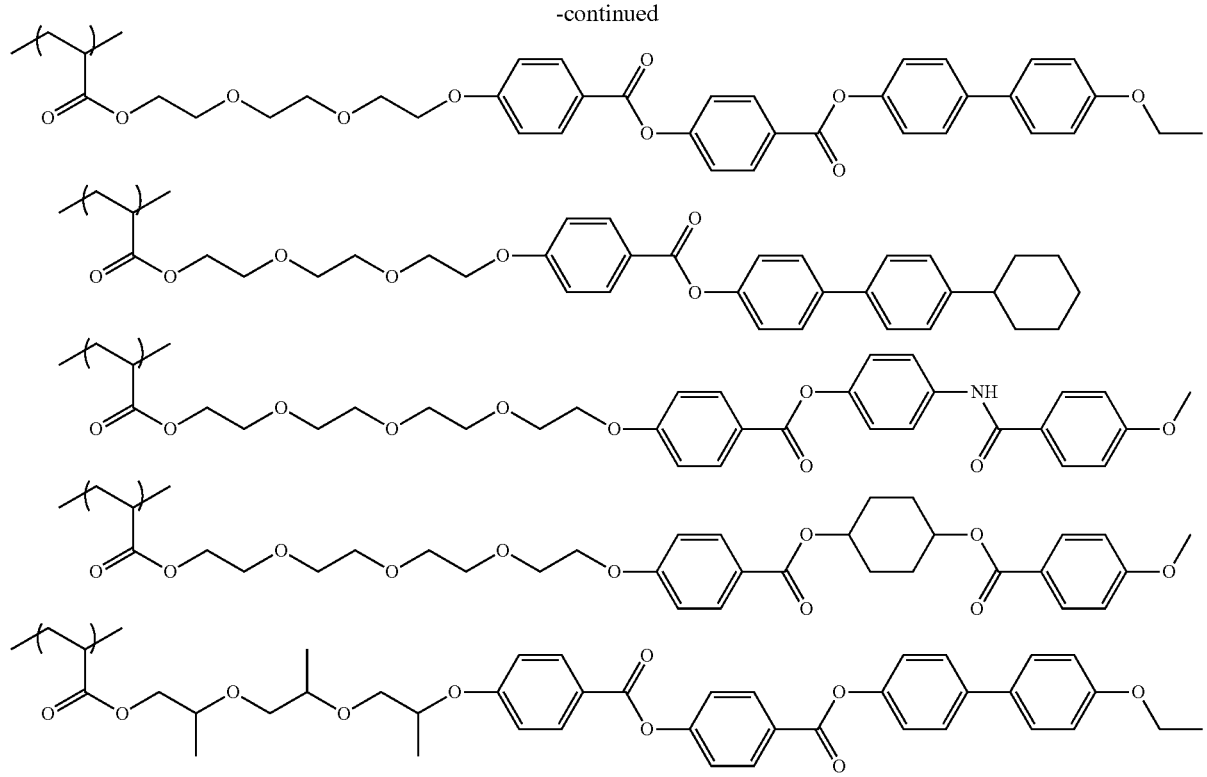

It is preferable that the structures of the repeating unit (21) and the repeating unit (22) have a part in common. It is assumed that the liquid crystals are uniformly aligned as the structures of repeating units are more similar to each other. In this manner, the alignment degree of the light absorption anisotropic layer is further improved.

Specifically, from the viewpoint of further increasing the alignment degree of the light absorption anisotropic layer, it is preferable to satisfy at least one of a condition that SP21A of Formula (LCP-21) has the same structure as that for SP22 of Formula (LCP-22), a condition that MG21 of Formula (LCP-21) has the same structure as that for MG22 of Formula (LCP-22), or a condition that L21 of Formula (LCP-21) has the same structure as that for L22 of Formula (LCP-22), more preferable to satisfy two or more of the conditions, and particularly preferable to satisfy all the conditions.

From the viewpoint that the uniformity of alignment is excellent, the content of the repeating unit (22) is preferably 50% by mass or greater, more preferably 55% or greater, and particularly preferably 60% or greater with respect to all the repeating units (100% by mass) of the polymer liquid crystal compound.

From the viewpoint of improving the alignment degree, the upper limit of the content of the repeating unit (22) is preferably 99% by mass or less and more preferably 97% by mass with respect to all the repeating units (100% by mass) of the polymer liquid crystal compound.

The polymer liquid crystal compound may have only one or two or more kinds of repeating units (22). In a case where the polymer liquid crystal compound has two or more kinds of repeating units (22), there is an advantage in that the solubility of the polymer liquid crystal compound in a solvent is improved and the liquid crystal phase transition temperature is easily adjusted. In a case where the polymer liquid crystal compound has two or more kinds of repeating units (22), it is preferable that the total amount thereof is in the above-described range.

(Repeating Unit (3))

From the viewpoint of improving the solubility in a general-purpose solvent, the polymer liquid crystal compound may have a repeating unit (3) that does not contain a mesogen group. Particularly in order to improve the solubility while suppressing a decrease in the alignment degree, it is preferable that the polymer liquid crystal compound has a repeating unit having a molecular weight of 280 or less as the repeating unit (3) that does not contain a mesogen group. As described above, the reason why the solubility is improved while a decrease in the alignment degree is suppressed by allowing the polymer liquid crystal compound to have a repeating unit having a molecular weight of 280 or less which does not contain a mesogen group is assumed as follows.

That is, it is considered that in a case where the polymer liquid crystal compound has a repeating unit (3) that does not contain a mesogen group in a molecular chain thereof, since a solvent is likely to enter the polymer liquid crystal compound, the solubility is improved, but the alignment degree is decreased in the case of the non-mesogenic repeating unit (3). However, it is assumed that since the molecular weight of the repeating unit is small, the alignment of the repeating unit (1), the repeating unit (21), or the repeating unit (22) containing a mesogen group is unlikely to be disturbed, and thus a decrease in the alignment degree can be suppressed.

It is preferable that the repeating unit (3) is a repeating unit having a molecular weight of 280 or less.

The molecular weight of the repeating unit (3) does not indicates the molecular weight of the monomer used to obtain the repeating unit (3), but indicates the molecular weight of the repeating unit (3) in a state of being incorporated into the polymer liquid crystal compound by polymerization of the monomer.

The molecular weight of the repeating unit (3) is preferably 280 or less, more preferably 180 or less, and still more preferably 100 or less. The lower limit of the molecular weight of the repeating unit (3) is commonly 40 or greater and more preferably 50 or greater. In a case where the molecular weight of the repeating unit (3) is 280 or less, a light absorption anisotropic layer having excellent solubility of the polymer liquid crystal compound and a high alignment degree can be obtained.

Further, in a case where the molecular weight of the repeating unit (3) is greater than 280, the alignment of the liquid crystals in the portion of the repeating unit (1), the repeating unit (21), or the repeating unit (22) is disturbed, and thus the alignment degree is decreased in some cases. Further, since the solvent is unlikely to enter the polymer liquid crystal compound, the solubility of the polymer liquid crystal compound is decreased in some cases.

Specific examples of the repeating unit (3) include a repeating unit (hereinafter, also referred to as "repeating unit (3-1)") that does not contain a crosslinkable group (for example, an ethylenically unsaturated group) and a repeating unit (hereinafter, also referred to as "repeating unit (3-2)") that contains a crosslinkable group.

Repeating Unit (3-1)

Specific examples of the monomer used for polymerization of the repeating unit (3-1) include acrylic acid [72.1], α-alkylacrylic acids (such as methacrylic acid [86.1] and itaconic acid [130.1]), esters and amides derived therefrom (such as N-i-propylacrylamide [113.2], N-n-butylacrylamide [127.2], N-t-butylacrylamide [127.2], N,N-dimethylacrylamide [99.1], N-methylmethacrylamide [99.1], acrylamide [71.1], methacrylamide [85.1], diacetoneacrylamide [169.2], acryloylmorpholine [141.2], N-methylol acrylamide [101.1], N-methylol methacrylamide [115.1], methyl acrylate [86.0], ethyl acrylate [100.1], hydroxyethyl acrylate [116.1], n-propyl acrylate [114.1], i-propyl acrylate [114.2], 2-hydroxypropyl acrylate [130.1], 2-methyl-2-nitropropyl acrylate [173.2], n-butyl acrylate [128.2], i-butyl acrylate [128.2], t-butyl acrylate [128.2], t-pentyl acrylate [142.2], 2-methoxyethyl acrylate [130.1], 2-ethoxyethyl acrylate [144.2], 2-ethoxyethoxyethyl acrylate [188.2], 2,2,2-trifluoroethyl acrylate [154.1], 2,2-dimethylbutyl acrylate [156.2], 3-methoxybutyl acrylate [158.2], ethyl carbitol acrylate [188.2], phenoxyethyl acrylate [192.2], n-pentyl acrylate [142.2], n-hexyl acrylate [156.2], cyclohexyl acrylate [154.2], cyclopentyl acrylate [140.2], benzyl acrylate [162.2], n-octyl acrylate [184.3], 2-ethylhexyl acrylate [184.3], 4-methyl-2-propylpentyl acrylate [198.3], methyl methacrylate [100.0], 2,2,2-trifluoroethyl methacrylate [168.1], hydroxyethyl methacrylate [130.1], 2-hydroxypropyl methacrylate [144.2], n-butyl methacrylate [142.2], i-butyl methacrylate [142.2], sec-butyl methacrylate [142.2], n-octyl methacrylate [198.3], 2-ethylhexyl methacrylate [198.3], 2-methoxyethyl methacrylate [144.2], 2-ethoxyethyl methacrylate [158.2], benzyl methacrylate [176.2], 2-norbornyl methyl methacrylate [194.3], 5-norbornen-2-ylmethyl methacrylate [194.3], and dimethylaminoethyl methacrylate [157.2]), vinyl esters (such as vinyl acetate [86.1]), esters derived from maleic acid or fumaric acid (such as dimethyl maleate [144.1] and diethyl fumarate [172.2]), maleimides (such as N-phenylmaleimide [173.2]), maleic acid [116.1], fumaric acid [116.1], p-styrenesulfonic acid [184.1], acrylonitrile [53.1], methacrylonitrile [67.1], dienes (such as butadiene [54.1], cyclopentadiene [66.1], and isoprene [68.1]), aromatic vinyl compounds (such as styrene [104.2], p-chlorostyrene [138.6], t-butylstyrene [160.3], and α-methylstyrene [118.2]), N-vinylpyrrolidone [111.1], N-vinyloxazolidone [113.1], N-vinyl succinimide [125.1], N-vinylformamide [71.1], N-vinyl-N-methylformamide [85.1], N-vinylacetamide [85.1], N-vinyl-N-methylacetamide [99.1], 1-vinylimidazole [94.1]; 4-vinylpyridine [105.2], vinylsulfonic acid [108.1], sodium vinyl sulfonate [130.2], sodium allyl sulfonate [144.1], sodium methallyl sulfonate [158.2], vinylidene chloride [96.9], vinyl alkyl ethers (such as methyl vinyl ether [58.1]), ethylene [28.0], propylene [42.1], 1-butene [56.1], and isobutene [56.1]. Further, the numerical values in the parentheses indicate the molecular weights of the monomers.

The above-described monomers may be used alone or in combination of two or more kinds thereof.

Among the above-described monomers, acrylic acid, α-alkylacrylic acids, esters and amides derived therefrom, acrylonitrile, methacrylonitrile, and aromatic vinyl compounds are preferable.

As monomers other than the above-described monomers, the compounds described in Research Disclosure No. 1955 (July, 1980) can be used.

Hereinafter, specific examples of the repeating unit (3-1) and the molecular weights thereof will be described, but the present invention is not limited to these specific examples.

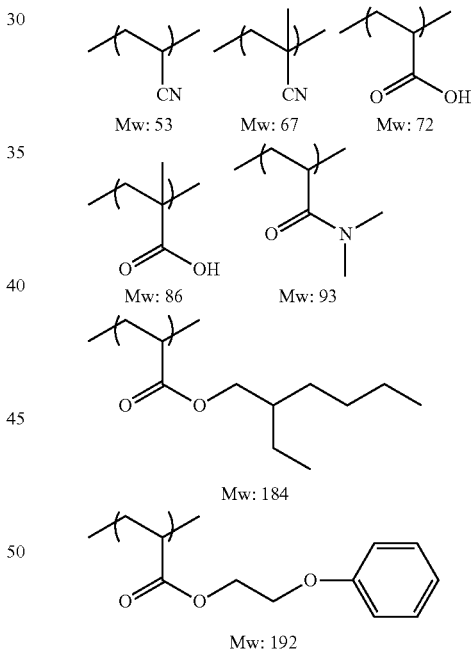

Repeating Unit (3-2)

Specific examples of the crosslinkable group in the repeating unit (3-2) include the groups represented by Formulae (P-1) to (P-30). Among these, a vinyl group, a butadiene group, a (meth)acryl group, a (meth)acrylamide group, a vinyl acetate group, a fumaric acid ester group, a styryl group, a vinylpyrrolidone group, a maleic acid anhydride, a maleimide group, a vinyl ether group, an epoxy group, and an oxetanyl group are more preferable.

From the viewpoint of easily performing polymerization, it is preferable that the repeating unit (3-2) is a repeating unit represented by Formula (3).

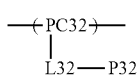
(3)

In Formula (3), PC32 represents the main chain of the repeating unit and more specifically the same structure as that for PC1 in Formula (1), L32 represents a single bond or a divalent linking group and more specifically the same structure as that for L1 in Formula (1), and P32 represents a crosslinkable group represented by any of Formulae (P-1) to (P-30).

Hereinafter, specific examples of the repeating unit (3-2) and the molecular weights (Mw) thereof will be described, but the present invention is not limited to these specific examples.

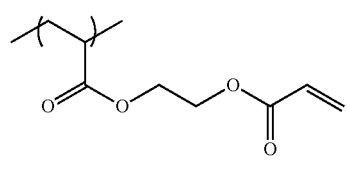

Mw: 170.16

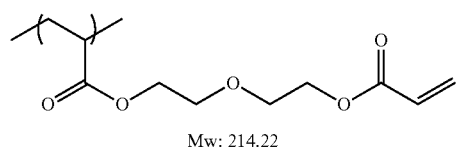

Mw: 214.22

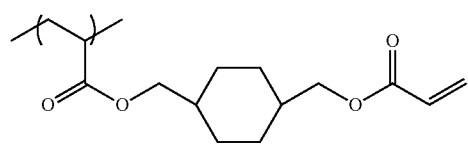

Mw: 252.31

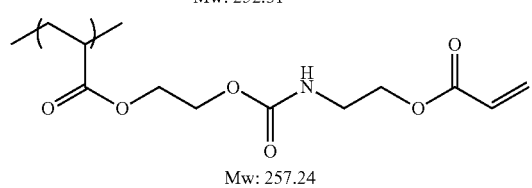

Mw: 257.24

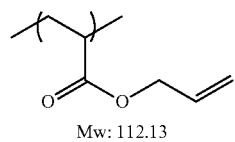

Mw: 112.13

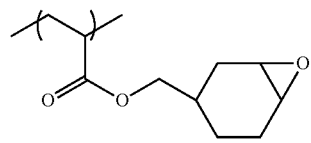

Mw: 162.22

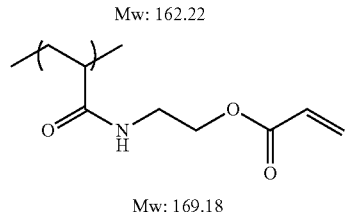

Mw: 169.18

-continued

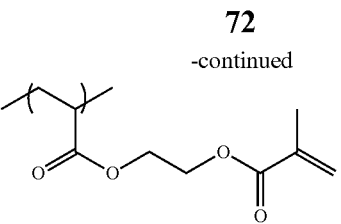

Mw: 184.19

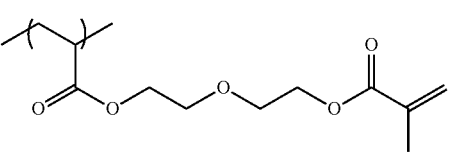

Mw: 228.24

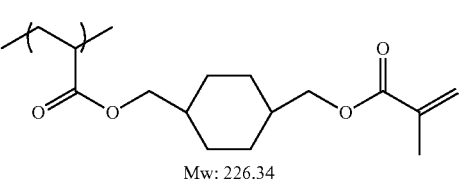

Mw: 226.34

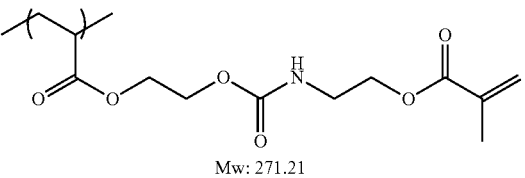

Mw: 271.21

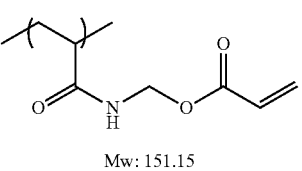

Mw: 151.15

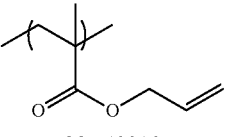

Mw: 126.16

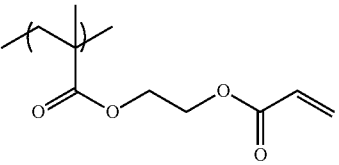

Mw: 184.69

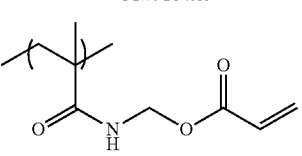

Mw: 169.18

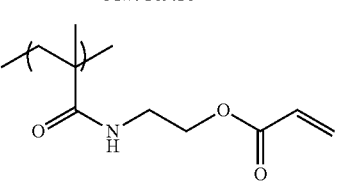

Mw: 183.21

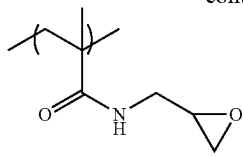

Mw: 145.15

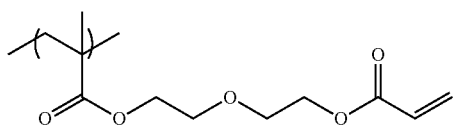

Mw: 226.24

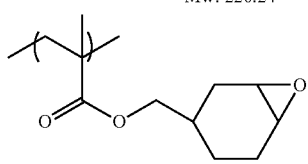

Mw: 196.25

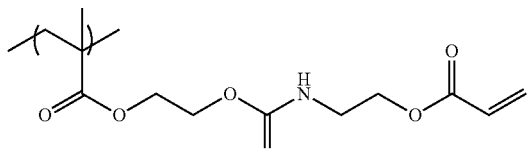

Mw: 271.27

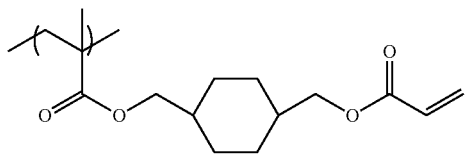

Mw: 266.34

The content of the repeating unit (3) is preferably less than 14% by mass, more preferably 7% by mass or less, and still more preferably 5% by mass or less with respect to all the repeating units (100% by mass) of the polymer liquid crystal compound. The lower limit of the content of the repeating unit (3) is preferably 2% by mass or greater and more preferably 3% by mass or greater with respect to all the repeating units (100% by mass) of the polymer liquid crystal compound. In a case where the content of the repeating unit (3) is less than 14% by mass, the alignment degree of the light absorption anisotropic layer is further improved. In a case where the content of the repeating unit (3) is 2% by mass or greater, the solubility of the polymer liquid crystal compound is further improved.

The polymer liquid crystal compound may have only one or two or more kinds of repeating units (3). In a case where the polymer liquid crystal compound has two or more kinds of repeating units (3), it is preferable that the total amount thereof is in the above-described range.

(Repeating Unit (4))

From the viewpoint of improving the adhesiveness and planar uniformity, the polymer liquid crystal compound may have a repeating unit (4) having a flexible structure with a long molecular chain (SP4 in Formula (4) described below). The reason for this is assumed as follows.

That is, in a case where the polymer liquid crystal compound has such a flexible structure having a long molecular chain, entanglement of the molecular chains constituting the polymer liquid crystal compound is likely to occur, and aggregation destruction of the light absorption anisotropic layer (specifically, destruction of the light absorption anisotropic layer) is suppressed. As a result, the adhesiveness between the light absorption anisotropic layer and the underlayer (for example, the base material or the alignment film) is assumed to be improved. Further, it is considered that a decrease in planar uniformity occurs due to the low compatibility between the dichroic substance and the polymer liquid crystal compound. That is, it is considered that in a case where the compatibility between the dichroic substance and the polymer liquid crystal compound is not sufficient, a planar defect (alignment defect) having the dichroic substance to be precipitated as a nucleus occurs. Meanwhile, it is assumed that in the case where the polymer liquid crystal compound has such a flexible structure having a long molecular chain, a light absorption anisotropic layer in which precipitation of the dichroic substance is suppressed and the planar uniformity is excellent is obtained. Here, the expression "planar uniformity is excellent" denotes that the alignment defect occurring in a case where the liquid crystal composition containing the polymer liquid crystal compound is repelled on the underlayer (for example, the base material or the alignment film) is less likely to occur.

The repeating unit (4) is a repeating unit represented by Formula (4).

(4)

In Formula (4), PC4 represents the main chain of the repeating unit and more specifically the same structure as that for PC1 in Formula (1), L4 represents a single bond or a divalent linking group and more specifically the same structure as that for L1 in Formula (1) (preferably a single bond), SP4 represents an alkylene group having 10 or more atoms in the main chain, and T4 represents a terminal group and more specifically the same structure as that for T1 in Formula (1).

Specific examples and preferred embodiments of PC4 are the same as those for PC1 in Formula (1), and thus description thereof will not be repeated.

From the viewpoint of further exhibiting the effects of the present invention, it is preferable that L4 represents a single bond.

In Formula (4), SP4 represents an alkylene group having 10 or more atoms in the main chain. Here, one or more of —$CH_2$—'s constituting the alkylene group represented by SP4 may be substituted with "SP-C" described above and particularly preferably at least one group selected from the group consisting of —O—, —S—, —N($R^{21}$)—, —C(=O)—, —C(=S)—, —C($R^{22}$)=C($R^{23}$)—, an alkynylene group, —Si($R^{24}$)($R^{25}$)—, —N=N—, —C($R^{26}$)=N—N=C($R^{27}$)—, —C($R^{28}$)=N—, and S(=O)$_2$—. In addition, $R^{21}$ to $R^{28}$ each independently represent a hydrogen atom, a halogen atom, a cyano group, a nitro group, or a linear or branched alkyl group having 1 to 10 carbon atoms. Further, the hydrogen atoms contained in one or more of —$CH_2$—'s constituting the alkylene group represented by SP4 may be substituted with "SP-H" described above.

The number of atoms in the main chain of SP4 is 10 or greater, and from the viewpoint of obtaining a light absorption anisotropic layer in which at least one of the adhesiveness or the planar uniformity is more excellent, the number of atoms thereof is preferably 15 or greater and more preferably 19 or greater. Further, from the viewpoint of obtaining a light absorption anisotropic layer with a more excellent alignment degree, the upper limit of the number of atoms in the main chain of SP2 is preferably 70 or less, more preferably 60 or less, and still more preferably 50 or less.

Here, "main chain" in SP4 indicates a partial structure required for directly linking L4 and T4 to each other, and "number of atoms in the main chain" indicates the number of atoms constituting the partial structure. In other words, "main chain" in SP4 is a partial structure in which the number of atoms linking L4 and T4 to each other is the smallest. For example, the number of atoms in the main chain in a case where SP4 represents a 3,7-dimethyldecanyl group is 10, and the number of atoms in the main chain in a case where SP4 represents a 4,6-dimethyldodecanyl group is 12. Further, in Formula (4-1), the inside of the frame shown by the dotted quadrangle corresponds to SP4, and the number of atoms in the main chain of SP4 (corresponding to the total number of atoms circled by the dotted line) is 11.

Particularly, it is preferable that SP4 represents a group having at least one selected from the group consisting of an oxyalkylene structure in which one or more of —$CH_2$—'s constituting an alkylene group are substituted with —O—, an ester structure in which one or more of —$CH_2$—$CH_2$—'s constituting an alkylene group are substituted with —O— and —C(=O)—, and a urethane bond in which one or more of —$CH_2$—$CH_2$—$CH_2$—'s constituting an alkylene group are substituted with —O—, —C(=O)—, and —NH—.

The hydrogen atoms contained in one or more of —$CH_2$—'s constituting the alkylene group represented by SP4 may be substituted with "SP-H" described above. In this case, one or more hydrogen atoms contained in —$CH_2$— may be substituted with "SP-H". That is, only one hydrogen atom contained in —$CH_2$— may be substituted with "SP-H" or all (two) hydrogen atoms contained in —$CH_2$— may be substituted with "SP-H".

Among the examples of "SP-H", at least one group selected from the group consisting of a halogen atom, a cyano group, a nitro group, a hydroxy group, a linear alkyl (4-1)

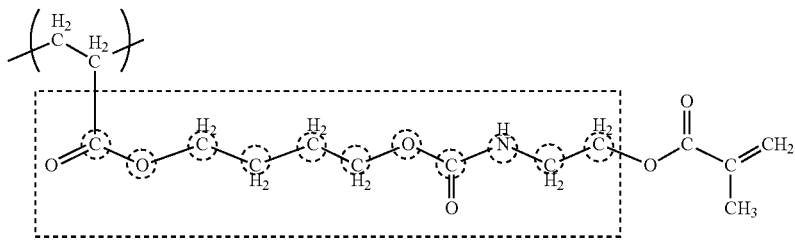

The alkylene group represented by SP4 may be linear or branched.

From the viewpoint of obtaining a light absorption anisotropic layer with a more excellent alignment degree, the number of carbon atoms of the alkylene group represented by SP4 is preferably in a range of 8 to 80, more preferably in a range of 15 to 80, still more preferably in a range of 25 to 70, and particularly preferably in a range of 25 to 60.

From the viewpoint of obtaining a light absorption anisotropic layer with more excellent adhesiveness and planar uniformity, it is preferable that one or more of —$CH_2$—'s constituting the alkylene group represented by SP4 are substituted with "SP-C" described above.

Further, in a case where a plurality of —$CH_2$—'s constituting the alkylene group represented by SP4 are present, it is more preferable that only some of the plurality of —$CH_2$—'s are substituted with "SP-C" described above from the viewpoint of obtaining a light absorption anisotropic layer with more excellent adhesiveness and planar uniformity.

Among examples of "SP-C", at least one group selected from the group consisting of —O—, —S—, —N($R^{21}$)—, —C(=O)—, —C(=S)—, —C($R^{22}$)=C($R^{23}$)—, an alkynylene group, —Si($R^{24}$)($R^{25}$)—, —N=N—, —C($R^{26}$)=N—N=C($R^{27}$)—, —C($R^{28}$)=N—, and —S(=O)$_2$— is preferable, and from the viewpoint of obtaining a light absorption anisotropic layer with more excellent adhesiveness and planar uniformity, at least one group selected from the group consisting of —O—, —N($R^{21}$)—, —C(=O)—, and S(=O)$_2$— is more preferable, and at least one group selected from the group consisting of —O—, —N($R^{21}$)—, and —C(=O)— is still more preferable.

group having 1 to 10 carbon atoms, a branched alkyl group having 1 to 10 carbon atoms, and a halogenated alkyl group having 1 to 10 carbon atoms is preferable, and at least one group selected from the group consisting of a hydroxy group, a linear alkyl group having 1 to 10 carbon atoms, and a branched alkyl group having 1 to 10 carbon atoms is more preferable.

As described above, T4 represents the same terminal group as that for T1 and preferably a hydrogen atom, a methyl group, a hydroxy group, a carboxy group, a sulfonic acid group, a phosphoric acid group, a boronic acid group, an amino group, a cyano group, a nitro group, a phenyl group which may have a substituent, or -L-CL (L represents a single bond or a divalent linking group, specific examples of the divalent linking group are the same as those for LW and SPW described above, and CL represents a crosslinkable group, and examples thereof include a group represented by Q1 or Q2, among these, a crosslinkable group represented by any of Formulae (P-1) to (P-30) is preferable), and it is preferable that CL represents a vinyl group, a butadiene group, a (meth)acryl group, a (meth)acrylamide group, a vinyl acetate group, a fumaric acid ester group, a styryl group, a vinylpyrrolidone group, a maleic acid anhydride, a maleimide group, a vinyl ether group, an epoxy group, or an oxetanyl group.

The epoxy group may be an epoxycycloalkyl group, and the number of carbon atoms of the cycloalkyl group moiety in the epoxycycloalkyl group is preferably in a range of 3 to 15, more preferably in a range of 5 to 12, and still more preferably 6 (that is, in a case where the epoxycycloalkyl group is an epoxycyclohexyl group) from the viewpoint that the effects of the present invention are more excellent.

Examples of the substituent of the oxetanyl group include an alkyl group having 1 to 10 carbon atoms. Among the examples, an alkyl group having 1 to 5 carbon atoms is preferable from the viewpoint that the effects of the present invention are more excellent. The alkyl group as a substituent of the oxetanyl group may be linear or branched, but is preferably linear from the viewpoint that the effects of the present invention are more excellent.

Examples of the substituent of the phenyl group include a boronic acid group, a sulfonic acid group, a vinyl group, and an amino group. Among these, from the viewpoint that the effects of the present invention are more excellent, a boronic acid group is preferable.

Specific examples of the repeating unit (4) include the following structures, but the present invention is not limited thereto. Further, in the following specific examples, n1 represents an integer of 2 or greater, and n2 represents an integer of 1 or greater.

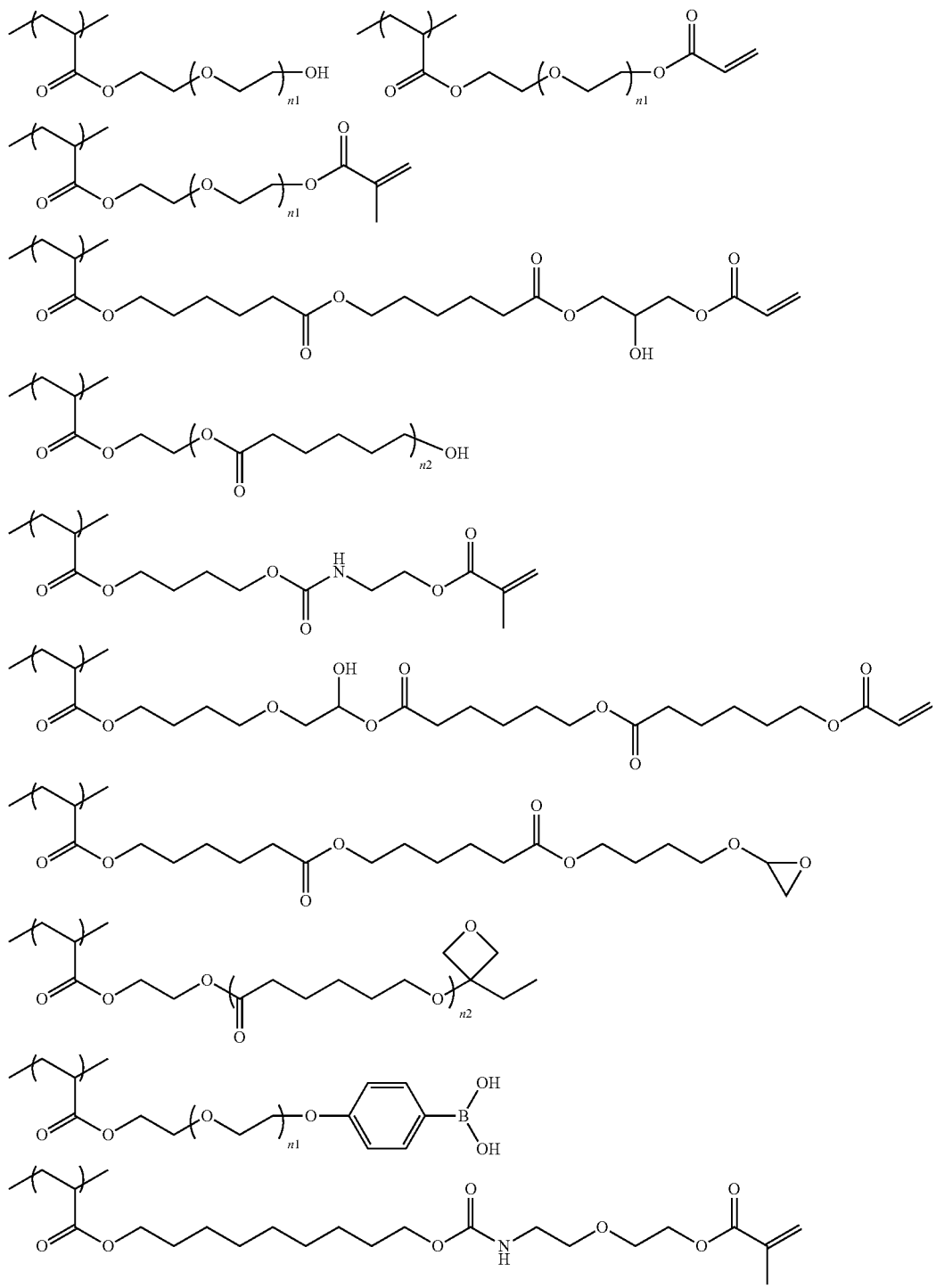

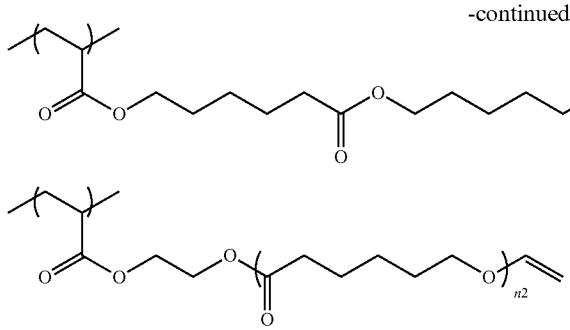
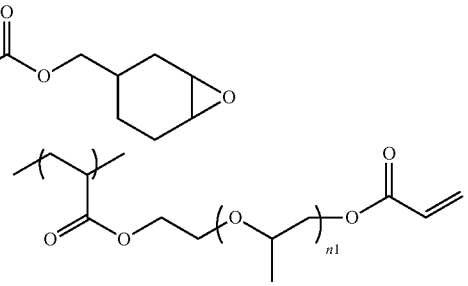

The content of the repeating unit (4) is preferably in a range of 2% to 20% by mass and more preferably in a range of 3% to 18% by mass with respect to all the repeating units (100% by mass) of the polymer liquid crystal compound. In a case where the content of the repeating unit (4) is 2% by mass or greater, a light absorption anisotropic layer having more excellent adhesiveness can be obtained. Further, in a case where the content of the repeating unit (4) is 20% by mass or less, a light absorption anisotropic layer having more excellent planar uniformity can be obtained.

The polymer liquid crystal compound may have only one or two or more kinds of repeating units (4). In a case where the polymer liquid crystal compound has two or more kinds of repeating units (4), the content of the repeating unit (4) indicates the total content of the repeating units (4).

(Repeating Unit (5))

From the viewpoint of the planar uniformity, the polymer liquid crystal compound may have a repeating unit (5) to be introduced by polymerizing a polyfunctional monomer. Particularly in order to improve the planar uniformity while suppressing a decrease in the alignment degree, it is preferable that the polymer liquid crystal compound has 10% by mass or less of the repeating unit (5) to be introduced by polymerizing a polyfunctional monomer. As described above, the reason why the planar uniformity can be improved while a decrease in the alignment degree is suppressed by allowing the side-chain type polymer liquid crystal compound to have 10% by mass or less of the repeating unit (5) is assumed as follows.

The repeating unit (5) is a unit to be introduced to the polymer liquid crystal compound by polymerizing a polyfunctional monomer. Therefore, it is considered that the polymer liquid crystal compound contains a high-molecular-weight body in which a three-dimensional crosslinked structure is formed by the repeating unit (5). Here, since the content of the repeating unit (5) is small, the content of the high-molecular-weight body having the repeating unit (5) is considered to be small.

It is assumed that a light absorption anisotropic layer in which cissing of the liquid crystal composition is suppressed and the planar uniformity is excellent is obtained due to the presence of a small amount of the high-molecular-weight body with the three-dimensional crosslinked structure that has been formed as described above.

Further, it is assumed that the effect of suppressing a decrease in the alignment degree can be maintained because the content of the high-molecular-weight body is small.

It is preferable that the repeating unit (5) to be introduced by polymerizing a polyfunctional monomer is a repeating unit represented by Formula (5).

In Formula (5), PC5A and PC5B represent the main chain of the repeating unit and more specifically the same structure as that for PC1 in Formula (1), L5A and L5B represent a single bond or a divalent linking group and more specifically the same structure as that for L1 in Formula (1), SP5A and SP5B represent a spacer group and more specifically the same structure as that for SP1 in Formula (1), MG5A and MG5B represent a mesogen structure and more specifically the same structure as that for the mesogen group MG in Formula (LC), and a and b represent an integer of 0 or 1.

PC5A and PC5B may represent the same group or different groups, but it is preferable that PC5A and PC5B represent the same group from the viewpoint of further improving the alignment degree of the light absorption anisotropic layer.

Both L5A and L5B may represent a single bond, the same group, or different groups, but both L5A and L5B represent preferably a single bond or the same group and more preferably the same group from the viewpoint of further improving the alignment degree of the light absorption anisotropic layer.

Both SP5A and SP5B may represent a single bond, the same group, or different groups, but both SP5A and SP5B represent preferably a single bond or the same group and more preferably the same group from the viewpoint of further improving the alignment degree of the light absorption anisotropic layer.

Here, the same group in Formula (5) indicates that the chemical structures are the same as each other regardless of the orientation in which each group is bonded. For example, even in a case where SP5A represents *—$CH_2$—$CH_2$—O—** (* represents a bonding position with respect to L5A, and ** represents a bonding position with respect to MG5A) and SP5B represents *—O—$CH_2$—$CH_2$—** (* represents a bonding position with respect to MG5B, and ** represents a bonding position with respect to L5B), SP5A and SP5B represent the same group.

a and b each independently represent an integer of 0 or 1 and preferably 1 from the viewpoint of further improving the alignment degree of the light absorption anisotropic layer.

a and b may be the same as or different from each other, but from the viewpoint of further improving the alignment degree of the light absorption anisotropic layer, it is preferable that both a and b represent 1.

From the viewpoint of further improving the alignment degree of the light absorption anisotropic layer, the sum of a and b is preferably 1 or 2 (that is, the repeating unit represented by Formula (5) contains a mesogen group) and more preferably 2.

From the viewpoint of further improving the alignment degree of the light absorption anisotropic layer, it is preferable that the partial structure represented by -(MG5A)$_a$-(MG5B)$_b$— has a cyclic structure. In this case, from the viewpoint of further improving the alignment degree of the light absorption anisotropic layer, the number of cyclic structures in the partial structure represented by -(MG5A2)$_a$-(MG5B)$_b$— is preferably 2 or greater, more preferably in a range of 2 to 8, still more preferably in a range of 2 to 6, and particularly preferably in a range of 2 to 4.

From the viewpoint of further improving the alignment degree of the light absorption anisotropic layer, the mesogen groups represented by MG5A and MG5B each independently have preferably one or more cyclic structures, more preferably 2 to 4 cyclic structures, still more preferably 2 or 3 cyclic structures, and particularly preferably 2 cyclic structures.

Specific examples of the cyclic structure include an aromatic hydrocarbon group, a heterocyclic group, and an alicyclic group. Among these, an aromatic hydrocarbon group and an alicyclic group are preferable.

MG5A and MG5B may represent the same group or different groups, but from the viewpoint of further improving the alignment degree of the light absorption anisotropic layer, it is preferable that MG5A and MG5B represent the same group.

From the viewpoints of exhibiting the liquid crystallinity, adjusting the liquid crystal phase transition temperature, and the availability of raw materials and synthetic suitability and from the viewpoint that the effects of the present invention are more excellent, it is preferable that the mesogen group represented by MG5A and MG5B is the mesogen group MG in Formula (LC).

Particularly in the repeating unit (5), it is preferable that PC5A and PC5B represent the same group, both L5A and L5B represent a single bond or the same group, both SP5A and SP5B represent a single bond or the same group, and MG5A and MG5B represent the same group. In this manner, the alignment degree of the light absorption anisotropic layer is further improved.

The content of the repeating unit (5) is preferably 10% by mass or less, more preferably in a range of 0.001% to 5% by mass, and still more preferably in a range of 0.05% to 3% by mass with respect to the content (100% by mass) of all the repeating units of the polymer liquid crystal compound.

The polymer liquid crystal compound may have only, one or two or more kinds of repeating units (5). In a case where the polymer liquid crystal compound has two or more kinds of repeating units (5), it is preferable that the total amount thereof is in the above-described range.

(Star-Shaped Polymer)

The polymer liquid crystal compound may be a star-shaped-polymer. The star-shaped polymer in the present invention indicates a polymer having three or more polymer chains extending from the nucleus and is specifically represented by Formula (6).

The star-shaped polymer represented by Formula (6) as the polymer liquid crystal compound can form a light absorption anisotropic layer having a high alignment degree while having high solubility (excellent solubility in a solvent).

In Formula (6), n$_A$ represents an integer of 3 or greater and preferably an integer of 4 or greater. The upper limit of n$_A$ is not limited thereto, but is commonly 12 or less and preferably 6 or less.

A plurality of PI's each independently represent a polymer chain having any of repeating units represented by Formulae (1), (21), (22), (3), (4), and (5). Here, at least one of the plurality of PI's represents a polymer chain having a repeating unit represented by Formula (1).

A represents an atomic group that is the nucleus of the star-shaped polymer. Specific examples of A include structures obtained by removing hydrogen atoms from thiol groups of the polyfunctional thiol compound, described in paragraphs [0052] to [0058] of JP2011-074280A, paragraphs [0017] to [0021] of JP2012-189847A, paragraphs [0012] to [0024] of JP2013-031986A, and paragraphs [0118] to [0142] of JP2014-104631A. In this case, A and PI are bonded to each other through a sulfide bond.

The number of thiol groups of the polyfunctional thiol compound from which A is derived is preferably 3 or greater and more preferably 4 or greater. The upper limit of the number of thiol groups of the polyfunctional thiol compound is commonly 12 or less and preferably 6 or less.

Specific examples of the polyfunctional thiol compound are shown below.

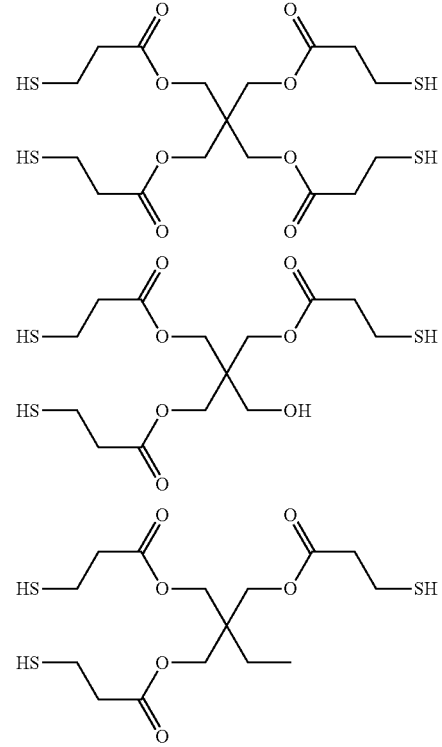

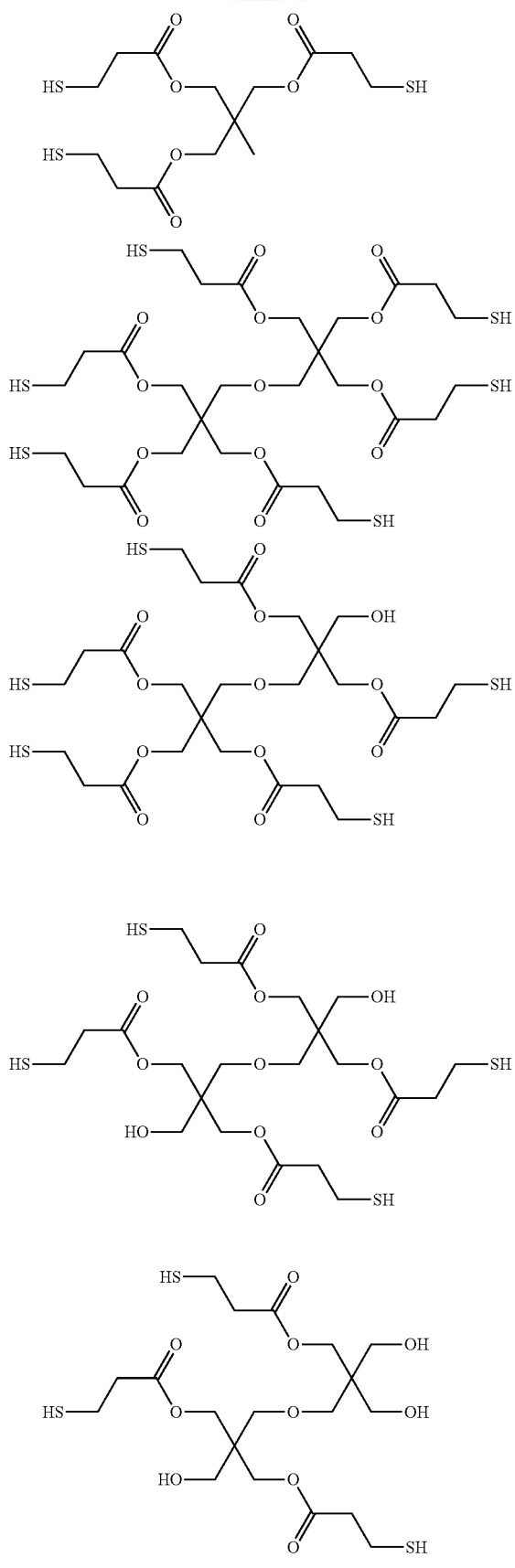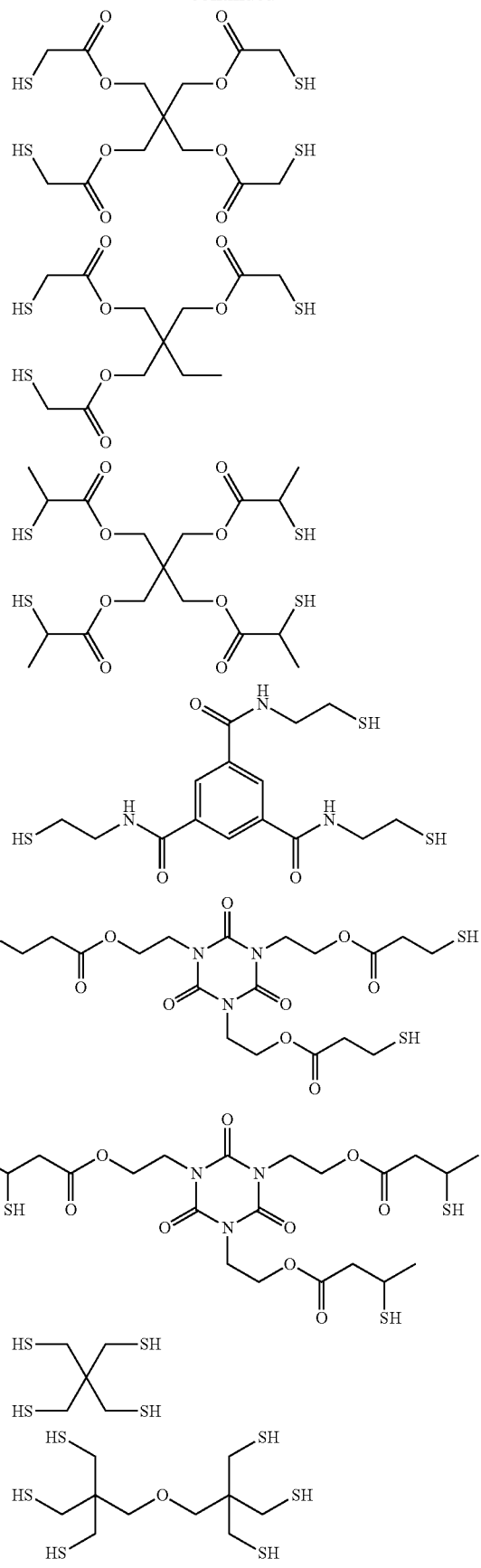

-continued

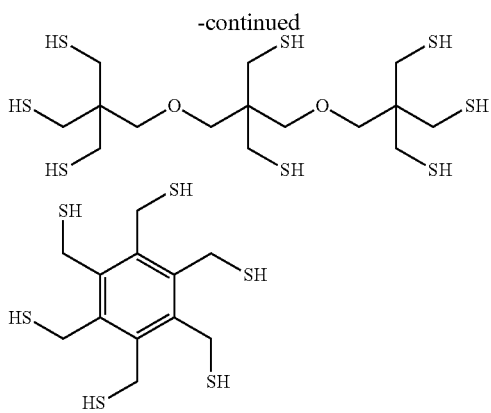

From the viewpoint of improving the alignment degree, the polymer liquid crystal compound may be a thermotropic liquid crystal and a crystalline polymer.
(Thermotropic Liquid Crystal)

A thermotropic liquid crystal is a liquid crystal that shows transition to a liquid crystal phase due to a change in temperature.

The polymer liquid crystal compound is a thermotropic liquid crystal and may exhibit any of a nematic phase or a smectic phase, but it is preferable that the polymer liquid crystal compound exhibits at least the nematic phase from the viewpoint that haze is more difficult to observe (haze is further enhanced).

The temperature range showing the nematic phase is preferably in a range of room temperature (23° C.) to 450° C. from the viewpoint that the alignment degree of the light absorption anisotropic layer is further increased and haze is unlikely to be observed and more preferably in a range of 40° C. to 400° C. from the viewpoints of the handleability and the manufacturing suitability.
(Crystalline Polymer)

A crystalline polymer is a polymer showing a transition to a crystal phase due to a change in temperature. The crystalline polymer may show a glass transition other than the transition to the crystal phase.

It is preferable that the crystalline polymer is a polymer liquid crystal compound that has a transition from a crystal phase to a liquid crystal phase in a case of being heated (glass transition may be present in the middle of the transition) from the viewpoint that the alignment degree of the light absorption anisotropic layer is further increased and haze is more difficult to observe or a polymer liquid crystal compound that has a transition to a crystal phase in a case where the temperature is lowered after entering a liquid crystal state by being heated (glass transition may be present in the middle of the transition).

The presence or absence of crystallinity of the polymer liquid crystal compound is evaluated as follows.

Two light absorption anisotropic layers of an optical microscope (ECLIPSE E600 POL, manufactured by Nikon Corporation) are disposed so as to be orthogonal to each other, and a sample table is set between the two light absorption anisotropic layers. Further, a small amount of the polymer liquid crystal compound is placed on slide glass, and the slide glass is set on a hot stage placed on the sample table. While the state of the sample is observed, the temperature of the hot stage is increased to a temperature at which the polymer liquid crystal compound exhibits liquid crystallinity, and the polymer liquid crystal compound is allowed to enter a liquid crystal state. After the polymer liquid crystal compound enters the liquid crystal state, the behavior of the liquid crystal phase transition is observed while the temperature of the hot stage is gradually lowered, and the temperature of the liquid crystal phase transition is recorded. In a case where the polymer liquid crystal compound exhibits a plurality of liquid crystal phases (for example, a nematic phase and a smectic phase), all the transition temperatures are also recorded.

Next, approximately 5 mg of a sample of the polymer liquid crystal compound is put into an aluminum pan, and the pan is covered and set on a differential scanning calorimeter (DSC) (an empty aluminum pan is used as a reference). The polymer liquid crystal compound measured in the above-described manner is heated to a temperature at which the compound exhibits a liquid crystal phase, and the temperature is maintained for 1 minute. Thereafter, the calorific value is measured while the temperature is lowered at a rate of 10° C./min. An exothermic peak is confirmed from the obtained calorific value spectrum.

As a result, in a case where an exothermic peak is observed at a temperature other than the liquid crystal phase transition temperature, it can be said that the exothermic peak is a peak due to crystallization and the polymer liquid crystal compound has crystallinity.

Meanwhile, in a case where an exothermic peak is not observed at a temperature other than the liquid crystal phase transition temperature, it can be said that the polymer liquid crystal compound does not have crystallinity.

The method of obtaining a crystalline polymer is not particularly limited, but as a specific example, a method of using a polymer liquid crystal compound having the repeating unit (1) described above is preferable, and a method of using a suitable form among polymer liquid crystal compounds having the repeating unit (1) described above is more preferable.
(Crystallization Temperature)

From the viewpoint that the alignment degree of the light absorption anisotropic layer is further increased and haze is more difficult to observe, the crystallization temperature of the polymer liquid crystal compound is preferably −50° C. or higher and lower than 150° C., more preferably 120° C. or lower, still more preferably −20° C. or higher and lower than 120° C., and particularly preferably 95° C. or lower. The crystallization temperature of the polymer liquid crystal compound is preferably lower than 150° C. from the viewpoint of reducing haze.

Further, the crystallization temperature is a temperature of an exothermic peak due to crystallization in the above-described DSC.
(Molecular Weight)

From the viewpoint that the effects of the present invention are more excellent, the weight-average molecular weight (Mw) of the polymer liquid crystal compound is preferably in a range of 1000 to 500000 and more preferably in a range of 2000 to 300000. In a case where the Mw of the polymer liquid crystal compound is in the above-described range, the polymer liquid crystal compound is easily handled.

In particular, from the viewpoint of suppressing cracking during the coating, the weight-average molecular weight (Mw) of the polymer liquid crystal compound is preferably 10000 or greater and more preferably in a range of 10000 to 300000.

In addition, from the viewpoint of the temperature latitude of the alignment degree, the weight-average molecular weight (Mw) of the polymer liquid crystal compound is preferably less than 10000 and more preferably 2000 or greater and less than 10000.

Here, the weight-average molecular weight and the number average molecular weight in the present invention are values measured by the gel permeation chromatography (GPC) method.

Solvent-(eluent): N-methylpyrrolidone
Device name: TOSOH HLC-8220GPC
Column: Connect and use three of TOSOH TSKgel Super AWM-H (6 mm×15 cm)
Column temperature: 25° C.
Sample concentration: 0.1% by mass
Flow rate: 0.35 mL/min
Calibration curve: TSK standard polystyrene (manufactured by TOSOH Corporation), calibration curves of 7 samples with Mw of 2800000 to 1050 (Mw/Mn=1.03 to 1.06) are used.

The polymer liquid crystal compound having liquid crystallinity may exhibit any of a nematic phase or a smectic phase, but it is preferable that the polymer liquid crystal compound exhibits at least the nematic phase.

The temperature range showing the nematic phase is preferably in a range of 0° C. to 450° C., and preferably in a range of 30° C. to 400° C. from the viewpoints of handleability and manufacturing suitability.

The content of the liquid crystal compound is preferably in a range of 25 to 2000 parts by mass, more preferably in a range of 100 to 1300 parts by mass, and still more preferably in a range of 200 to 900 parts by mass with respect to 100 parts by mass of the content of the dichroic substances in the liquid crystal composition. In a case where the content of the liquid crystal compound is in the above-described ranges, the alignment degree of the polarizer is further improved.

The light absorption anisotropic layer may contain only one or two or more kinds of liquid crystal compounds. In a case where the light absorption anisotropic layer contains two or more kinds of liquid crystal compounds, the content of the liquid crystal compounds denotes the total content of the liquid crystal compounds.

[Dichroic Substance]

The light absorption anisotropic layer used in the present invention contains an organic dichroic substance.

The organic dichroic substance is not particularly limited, and examples thereof include a visible light absorbing material (such as a dichroic substance or a dichroic azo compound), a light emitting material (such as a fluorescent material or a phosphorescent material), an ultraviolet absorbing material, an infrared absorbing material, a non-linear optical material, a carbon nanotube, and an inorganic material (for example, a quantum rod). Further, known organic dichroic substances (such as dichroic dyes and dichroic coloring agents) of the related art can be used.

As the dichroic substance to be used, an organic dichroic substance is preferable, and a dichroic azo coloring agent compound is more particularly preferable.

The dichroic azo coloring agent compound is not particularly limited, and known dichroic azo coloring agents of the related art can be used, but the compounds described below are preferably used.

In the present invention, the dichroic azo coloring agent compound denotes a coloring agent having different absorbances depending on the direction.

The dichroic azo coloring agent compound may or may not exhibit liquid crystallinity.

In a case where the dichroic azo coloring agent compound exhibits liquid crystallinity, the dichroic azo coloring agent compound may exhibit any of a nematic phase or a smectic phase. The temperature at which the liquid crystal phase is exhibited is preferably in a range of room temperature (approximately 20° C. to 28° C.) to 300° C. and from the viewpoints of handleability and manufacturing suitability, more preferably in a range of 50° C. to 200° C.

In the present invention, from the viewpoint of adjusting the tint, the light absorption anisotropic layer contains preferably at least one coloring agent compound having a maximal absorption wavelength in a wavelength range of 560 to 700 nm (hereinafter, also referred to as "first dichroic azo coloring agent compound") and at least one coloring agent compound having a maximal absorption wavelength in a wavelength range of 455 nm or greater and less than 560 nm (hereinafter, also referred to as "second dichroic azo coloring agent compound") and specifically more preferably at least a dichroic azo coloring agent compound represented by Formula (1) and a dichroic azo coloring agent compound represented by Formula (2).

In the present invention, three or more kinds of dichroic azo coloring agent compounds may be used in combination. For example, from the viewpoint of making the color of the light absorption anisotropic layer close to black, it is preferable to use a first dichroic azo coloring agent compound, a second dichroic azo coloring agent compound, and at least one coloring agent compound having a maximal absorption wavelength in a wavelength range of 380 nm or greater and less than 455 nm (hereinafter, also referred to as "third dichroic azo coloring agent compound") in combination.

That is, in the present invention, the light absorption anisotropic layer contains preferably two or more kinds of organic dichroic substances with different absorption peak wavelengths and more preferably three or more kinds of organic dichroic substances with different absorption peak wavelengths.

In the present invention, from the viewpoint of further enhancing pressing resistance, it is preferable that the dichroic azo coloring agent compound contains a crosslinkable group.

Specific examples of the crosslinkable group include a (meth)acryloyl group, an epoxy group, an oxetanyl group, and a styryl group. Among these, a (meth)acryloyl group is preferable.

(First Dichroic Azo Coloring Agent Compound)

It is preferable that the first dichroic azo coloring agent compound is a compound having a chromophore which is a nucleus and a side chain bonded to a terminal of the chromophore.

Specific examples of the chromophore include an aromatic ring group (such as an aromatic hydrocarbon group or an aromatic heterocyclic group) and an azo group. In addition, a structure containing both an aromatic ring group and an azo group is preferable, and a bisazo structure containing an aromatic heterocyclic group (preferably a thienothiazole group) and two azo groups is more preferable.

The side chain is not particularly limited, and examples thereof include a group represented by L3, R2, or L4 in Formula (1).

The first dichroic azo coloring agent compound is a dichroic azo coloring agent compound having a maximum absorption wavelength in a wavelength range of 560 nm or greater and 700 nm or less, and from the viewpoint of adjusting the tint of the polarizer, preferably a dichroic azo coloring agent compound having a maximum absorption wavelength in a wavelength range of 560 to 650 nm and more preferably a dichroic azo coloring agent compound having a maximum absorption wavelength in a wavelength range of 560 to 640 nm.

The maximum absorption wavelength (nm) of the dichroic azo coloring agent compound in the present specification is acquired from an ultraviolet visible spectrum in a wavelength range of 380 to 800 nm measured by a spectrophotometer using a solution prepared by dissolving the dichroic azo coloring agent compound in a good solvent.

In the present invention, from the viewpoint of further improving the alignment degree of the light absorption anisotropic layer to be formed, it is preferable that the first dichroic azo coloring agent compound is a compound represented by Formula (1).

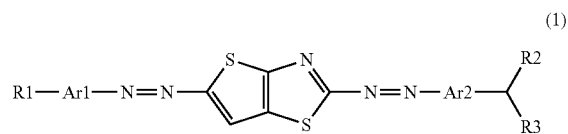

(1)

In Formula (1), Ar1 and Ar2 each independently represent a phenylene group which may have a substituent or a naphthylene group which may have a substituent. Among these, a phenylene group is preferable.

In Formula (1), R1 represents a hydrogen atom, a linear or branched alkyl group having 1 to 20 carbon atoms which may have a substituent, an alkoxy group, an alkylthio group, an alkylsulfonyl group, an alkylcarbonyl group, an alkyloxycarbonyl group, an acyloxy group, an alkylcarbonate group, an alkylamino group, an acylamino group, an alkylcarbonylamino group, an alkoxycarbonylamino group, an alkylsulfonylamino group, an alkylsulfamoyl group, an alkylcarbamoyl group, an alkylsulfinyl group, an alkylureido group, an alkylphosphoric acid amide group, an alkylimino group, or an alkylsilyl group.

Further, —CH$_2$— constituting the alkyl group may be substituted with —O—, —CO—, —C(O)—O—, —O—C(O)—, —Si(CH$_3$)$_2$—O—Si(CH$_3$)$_2$—, —N(R1')—, —N(R1')—CO—, —CO—N(R1')—, —N(R1')—C(O)—O—, —O—C(O)—N(R1')—, —N(R1')—C(O)—N(R1')—, —CH=CH—, —C≡C—, —N=N—, —C(R1')=CH—C(O)—, or —O—C(O)—O—.

In a case where R1 represents a group other than a hydrogen atom, the hydrogen atom in each group may be substituted with a halogen atom, a nitro group, a cyano group, —N(R1')$_2$, an amino group, —C(R1')=C(R1')—NO$_2$, —C(R1')=C(R1')—CN, or —C(R1')=C(CN)$_2$.

R1' represents a hydrogen atom or a linear or branched alkyl group having 1 to 6 carbon atoms. In a case where a plurality of (R1')'s are present in each group, these may be the same as or different from one another.

In Formula (1), R2 and R3 each independently represent a hydrogen atom, a linear or branched alkyl group having 1 to 20 carbon atoms which may have a substituent, an alkoxy group, an acyl group, an alkyloxycarbonyl group, an alkylamide group, an alkylsulfonyl group, an aryl group, an arylcarbonyl group, an arylsulfonyl group, an aryloxycarbonyl group, or an arylamide group.

Further, —CH$_2$— constituting the alkyl group may be substituted with —O—, —S—, —C(O)—, —C(O)—O—, —O—C(O)—, —C(O)—S—, —S—C(O)—, —Si(CH$_3$)$_2$—O—Si(CH$_3$)$_2$—, —NR2'—, —NR2'-CO—, —CO—NR2'—, —NR2'-C(O)—O—, —O—C(O)—NR2'—, —NR2'-C(O)—NR2'—, —CH=CH—, —C≡C—, —N=N—, —C(R2')=CH—C(O)—, or —O—C(O)—O—.

In a case where R2 and R3 represent a group other than a hydrogen atom, the hydrogen atom of each group may be substituted with a halogen atom, a nitro group, a cyano group, a —OH group, —N(R2')$_2$, an amino group, —C(R2')=C(R2')—NO$_2$, —C(R2')=C(R2')—CN, or —C(R2')=C(CN)$_2$.

R2' represents a hydrogen atom or a linear or branched alkyl group having 1 to 6 carbon atoms. In a case where a plurality of (R2')'s are present in each group, these may be the same as or different from one another.

R2 and R3 may be bonded to each other to form a ring, or R2 or R3 may be bonded to Ar2 to form a ring.

From the viewpoint of the light fastness, it is preferable that R1 represents an electron-withdrawing group and R2 and R3 represent a group having a low electron-donating property.

Specific examples of such a group as R1 include an alkylsulfonyl group, an alkylcarbonyl group, an alkyloxycarbonyl group, an acyloxy group, an alkylsulfonylamino group, an alkylsulfamoyl group, an alkylsulfinyl group, and an alkylureido group, and examples of groups as R2 and R3 include groups having the following structures. In addition, the groups having the following structures are shown in the form having a nitrogen atom to which R2 and R3 are bonded in Formula (1).

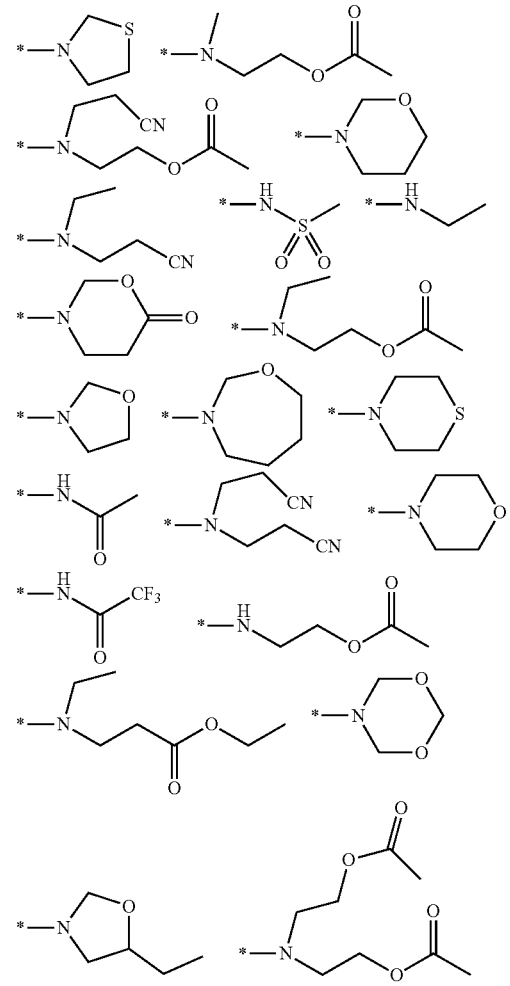

Specific examples of the first dichroic azo coloring agent compound are shown below, but the present invention is not limited thereto.
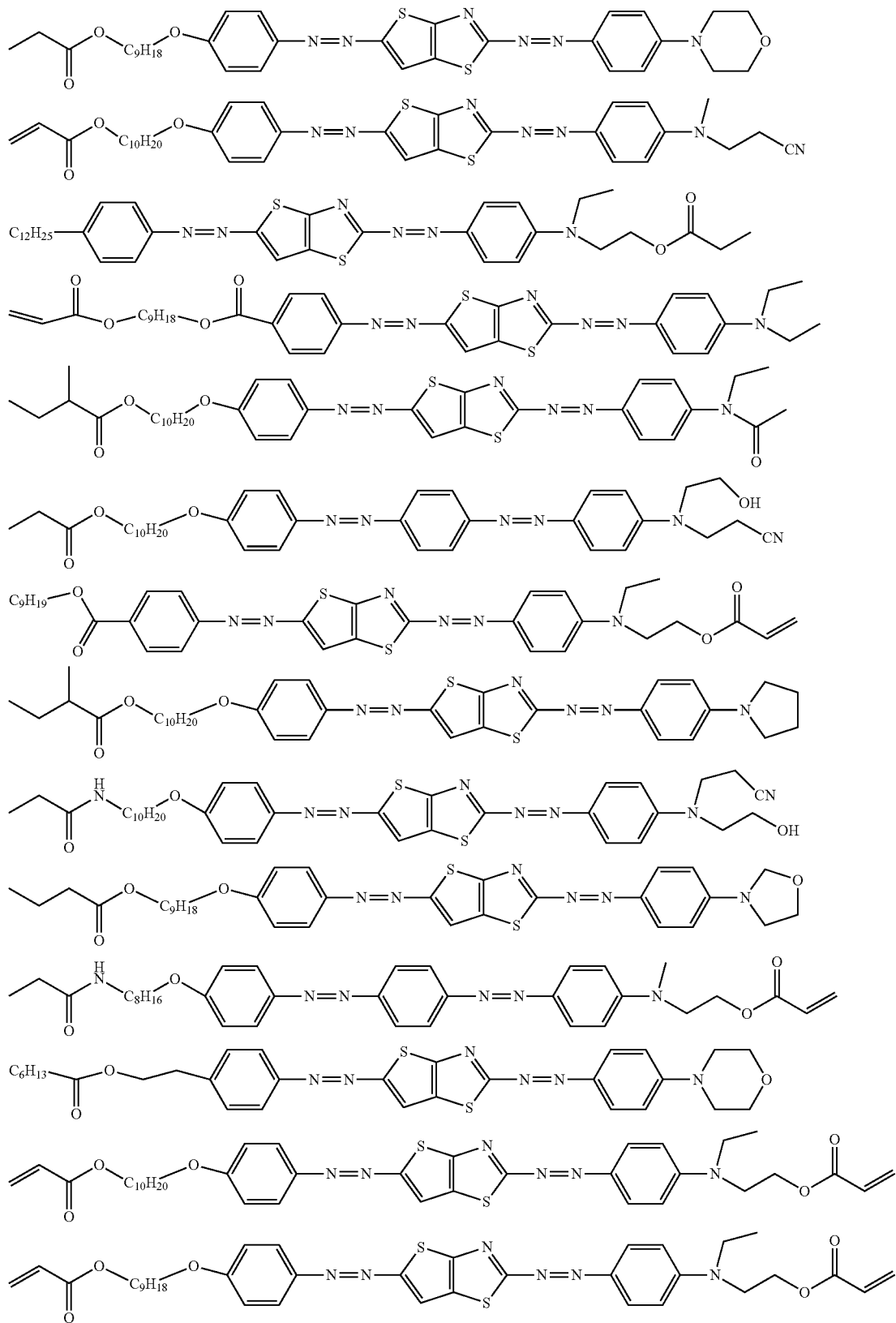

-continued

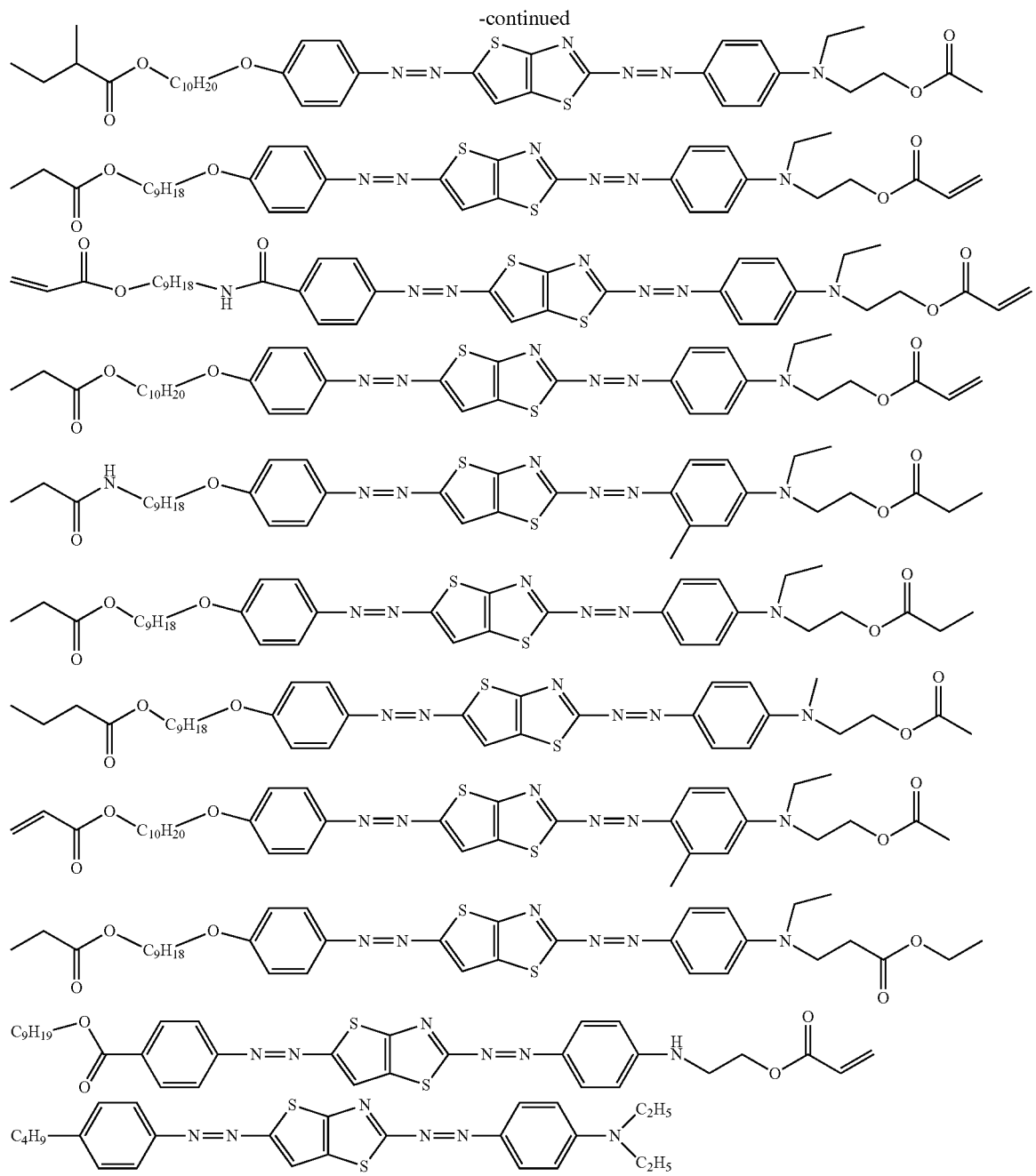

(Second Dichroic Azo Coloring Agent Compound)

The second dichroic azo coloring agent compound is a compound different from the first dichroic azo coloring agent compound, and specifically, the chemical structure thereof is different from that of the first dichroic azo coloring agent compound.

It is preferable that the second dichroic azo coloring agent compound is a compound having a chromophore which is a nucleus of a dichroic azo coloring agent compound and a side chain bonded to a terminal of the chromophore.

Specific examples of the chromophore include an aromatic ring group (such as an aromatic hydrocarbon group or an aromatic heterocyclic group) and an azo group. In addition, a structure containing both an aromatic hydrocarbon group and an azo group is preferable, and a bisazo or trisazo structure containing an aromatic hydrocarbon group and two or three azo groups is more preferable.

The side chain is not particularly limited, and examples thereof include a group represented by R4, R5, or R6 in Formula (2).

The second dichroic azo coloring agent compound is a dichroic azo coloring agent compound having a maximum absorption wavelength in a wavelength range of 455 nm or greater and less than 560 nm. From the viewpoint of adjusting the tint of the polarizer, the second dichroic azo coloring agent compound is preferably a dichroic azo coloring agent compound having a maximum absorption wavelength in a wavelength range of 455 to 555 nm and more preferably a dichroic azo coloring agent compound having a maximum absorption wavelength in a wavelength range of 455 to 550 nm.

In particular, the tint of the polarizer is easily adjusted by using a first dichroic azo coloring agent compound having a maximum absorption wavelength of 560 to 700 nm and a second dichroic azo coloring agent compound having a maximum absorption wavelength of 455 nm or greater and less than 560 nm.

From the viewpoint of further improving the alignment degree of the polarizer, it is preferable that the second dichroic azo coloring agent compound is a compound represented by Formula (2).

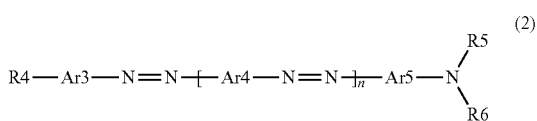

In Formula (2), n represents 1 or 2.

In Formula (2), Ar3, Ar4, and Ar5 each independently represent a phenylene group which may have a substituent, a naphthylene group which may have a substituent, or a heterocyclic group which may have a substituent.

The heterocyclic group may be aromatic or non-aromatic.

The atoms other than carbon constituting the aromatic heterocyclic group include a nitrogen atom, a sulfur atom, and an oxygen atom. In a case where the aromatic heterocyclic group has a plurality of atoms constituting a ring other than carbon, these may be the same as or different from each other.

Specific examples of the aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, and a thienooxazole-diyl group.

In Formula (2), R4 has the same definition as that for R1 in Formula (1).

In Formula (2), R5 and R6 each have the same definition as that for R2 and R3 in Formula (1).

From the viewpoint of the light fastness, it is preferable that R4 represents an electron-withdrawing group and R5 and R6 represent a group having a low electron-donating property.

Among such groups, specific examples of a case where R4 represents an electron-withdrawing group are the same as the specific examples of a case where R1 represents an electron-withdrawing group, and specific examples of a case where R5 and R6 represent a group having a low electron-donating property are the same as the specific examples of a case where R2 and R3 represent a group having a low electron-donating property.

Specific examples of the second dichroic azo coloring agent compound are shown below, but the present invention is not limited thereto.

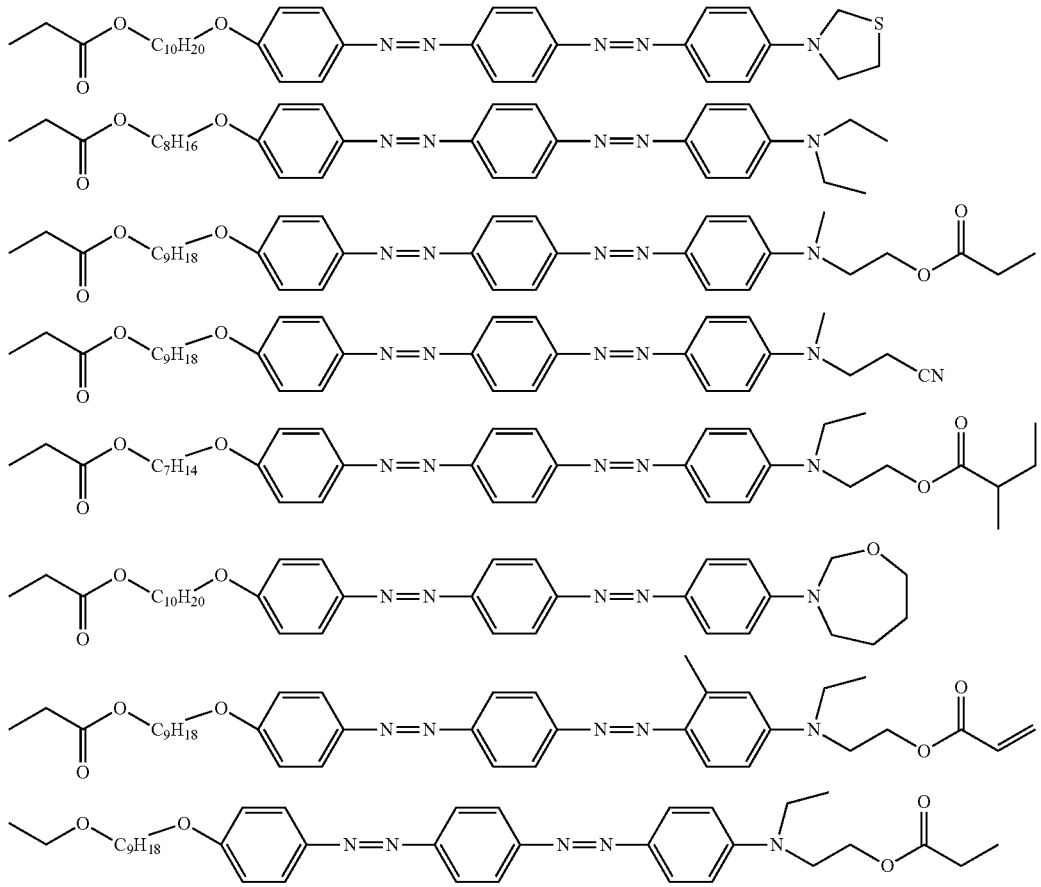

-continued
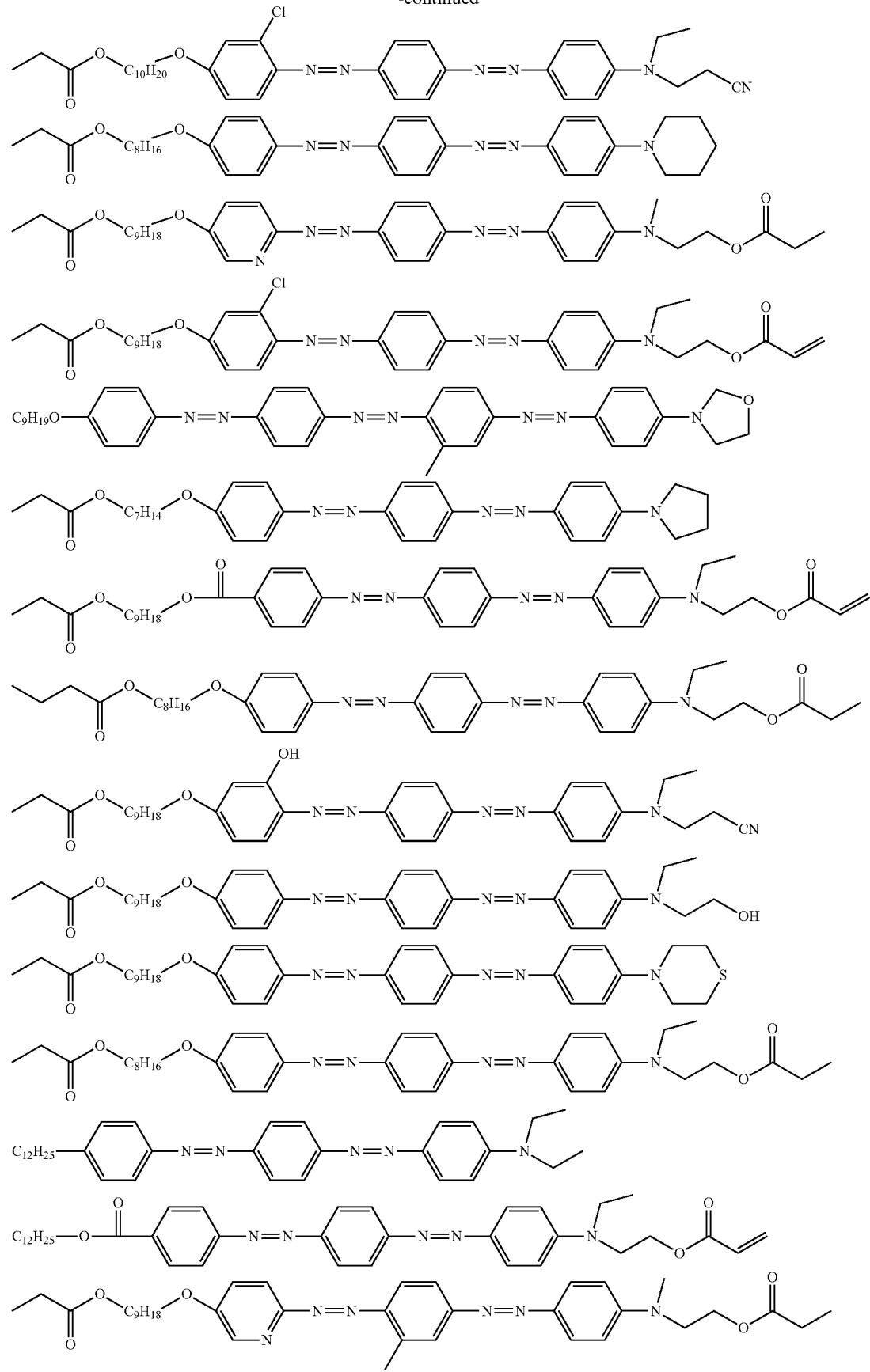

-continued
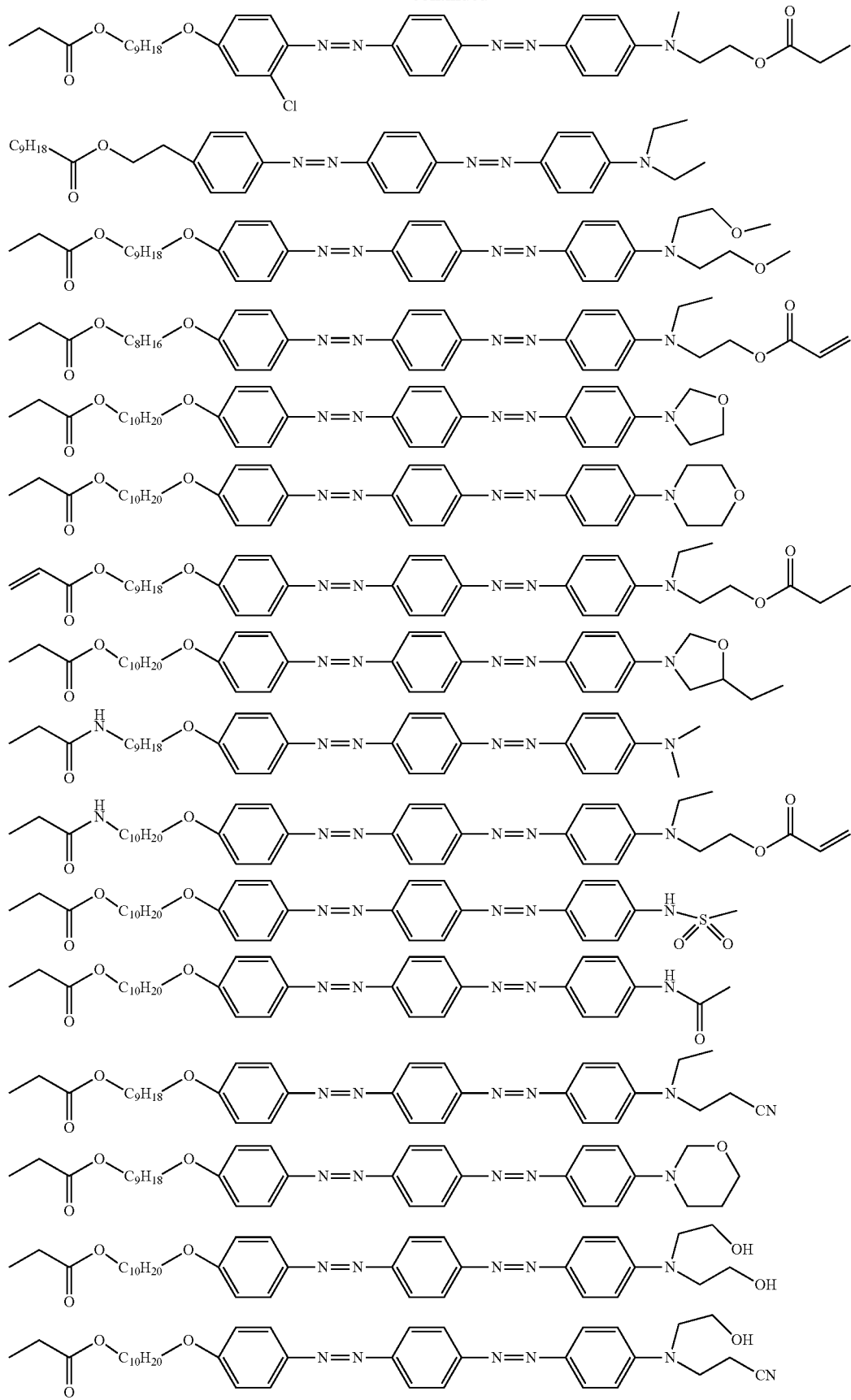

-continued

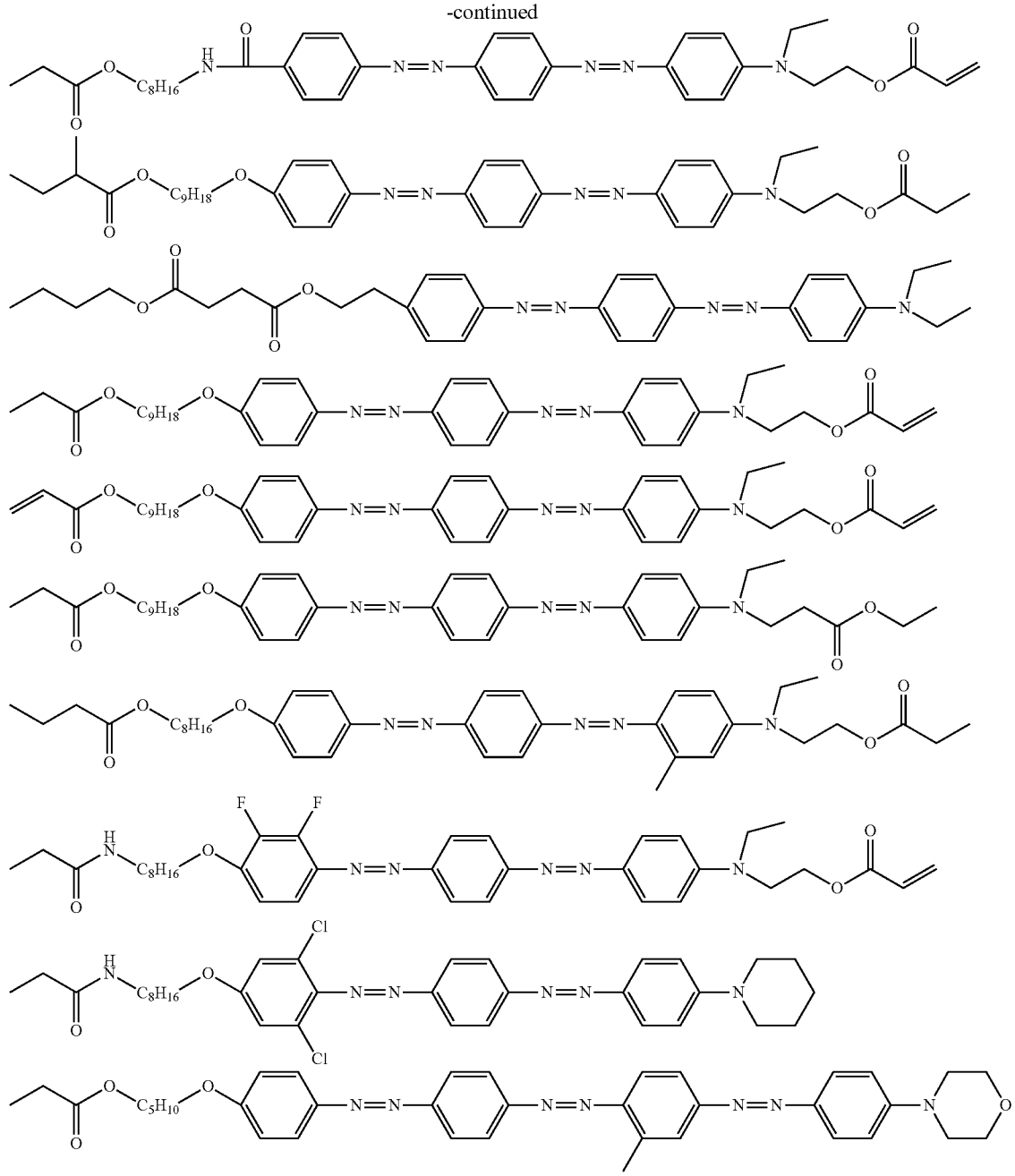

(Difference in Log P Value)

The log P value is an index expressing the hydrophilicity and the hydrophobicity of a chemical structure. An absolute value of a difference (hereinafter, also referred to as "difference in log P value") between the log P value of a side chain of the first dichroic azo coloring agent compound and the log P value of a side chain of the second dichroic azo coloring agent compound is preferably 2.30 or less, more preferably 2.0 or less, still more preferably 1.5 or less, and particularly preferably 1.0 or less. In a case where the difference in log P value is 2.30 or less, since the affinity between the first dichroic azo coloring agent compound and the second dichroic azo coloring agent compound is enhanced and an aligned structure is more easily formed, the alignment degree of the light absorption anisotropic layer is further improved.

Further, in a case where the first dichroic azo coloring agent compound or the second dichroic azo coloring agent compound has a plurality of side chains, it is preferable that at least one difference in log P value is in the above-described ranges.

Here, the side chain of the first dichroic azo coloring agent compound and the side chain of the second dichroic azo coloring agent compound denote a group bonded to a terminal of the above-described chromophore. For example, R1, R2, and R3 in Formula (1) represent a side chain in a case where the first dichroic azo coloring agent compound is a compound represented by Formula (1), and R4, R5, and R6 in Formula (2) represent a side chain in a case where the second dichroic azo coloring agent compound is a compound represented by Formula (2). In particularly, in a case where the first dichroic azo coloring agent compound is a compound represented by Formula (1) and the second dichroic azo coloring agent compound is a compound represented by Formula (2), it is preferable that at least one difference in log P value among the difference in log P value between R1 and R4, the difference in log P value between R1 and R5, the difference in log P value between R2 and R4, and the difference in log P value between R2 and R5 is in the above-described ranges.

Here, the log P value is an index for expressing the properties of the hydrophilicity and hydrophobicity of a chemical structure and is also referred to as a hydrophilic-hydrophobic parameter. The log P value can be calculated using software such as ChemBioDraw Ultra or HSPiP (Ver. 4.1.07). Further, the log P value can be acquired experimentally by the method of the OECD Guidelines for the Testing of Chemicals, Sections 1, Test No. 117 or the like. In the present invention, a value calculated by inputting the structural formula of a compound to HSPiP (Ver. 4.1.07) is employed as the log P value unless otherwise specified.

(Third Dichroic Azo Coloring Agent Compound)

The third dichroic azo coloring agent compound is a dichroic azo coloring agent compound other than the first dichroic azo coloring agent compound and the second dichroic azo coloring agent compound, and specifically, the chemical structure thereof is different from those of the first dichroic azo coloring agent compound and the second dichroic azo coloring agent compound. In a case where the composition for forming a light absorption anisotropic layer contains the third dichroic azo coloring agent compound, there is an advantage that the tint of the light absorption anisotropic layer is easily adjusted.

The maximum absorption wavelength of the third dichroic azo coloring agent compound is 380 nm or greater and less than 455 nm and preferably in a range of 385 to 454 nm.

It is preferable that the third dichroic azo coloring agent compound contains a dichroic azo coloring agent represented by Formula (6).

In Formula (6), $R_1$, $R_2$, and $R_3$ each independently represent a monovalent substituent. A plurality of $R_1$'s may be the same as or different from each other in a case of "n1≥2", a plurality of $R_2$'s may be the same as or different from each other in a case of "n2≥2", and a plurality of $R_3$'s may be the same as or different from each other in a case of "n3≥2".

In Formula (6), k represents an integer of 1 to 4. In a case of "k≥2", a plurality of $Ar_2$'s may be the same as or different from each other and a plurality of $R_2$'s may be the same as or different from each other.

In Formula (6), n1, n2, and n3 each independently represent an integer of 0 to 4. Here, an expression of "n1+n2+n3≥0" is satisfied in a case of "k=1", and an expression of "n1+n2+n3≥1" is satisfied in a case of "k≥2".

In Formula (6), examples of the crosslinkable group represented by A and B include the polymerizable groups described in paragraphs [0040] to [0050] of JP2010-244038A. Among these, an acryloyl group, a methacryloyl group, an epoxy group, an oxetanyl group, and a styryl group are preferable from the viewpoint of improving the reactivity and the synthetic suitability, and an acryloyl group and a methacryloyl group are more preferable from the viewpoint of further improving the solubility.

In Formula (6), $L_1$ represents a monovalent substituent in a case where a represents 0, and $L_1$ represents a single bond or a divalent linking group in a case where a represents 1. Further, $L_2$ represents a monovalent substituent in a case where b represents 0, and $L_2$ represents a single bond or a divalent linking group in a case where b represents 1.

As the monovalent substituent represented by $L_1$ and $L_2$, a group to be introduced to increase the solubility of the dichroic substance or a group having an electron-donating property or an electron-withdrawing property which is to be introduced to adjust the color tone of the coloring agent is preferable.

Examples of the substituent include an alkyl group (preferably an alkyl group having 1 to 20 carbon atoms, more preferably an alkyl group having 1 to 12 carbon atoms, and particularly preferably an alkyl group having 1 to 8 carbon atoms, and examples thereof a methyl group, an ethyl group, an isopropyl group, a tert-butyl group, an n-octyl group, an n-decyl group, an n-hexadecyl group, a cyclopropyl group,

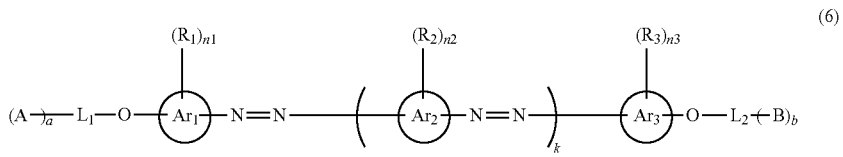

(6)

In Formula (6), A and B each independently represent a crosslinkable group.

In Formula (6), a and b each independently represent 0 or 1. From the viewpoint that the alignment degree at 420 nm is excellent, it is preferable that both a and b represent 0.

In Formula (6), $L_1$ represents a monovalent substituent in a case where a represents 0, and $L_1$ represents a single bond or a divalent linking group in a case where a represents 1. Further, $L_2$ represents a monovalent substituent in a case where b represents 0, and $L_2$ represents a single bond or a divalent linking group in a case where b represents 1.

In Formula (6), $Ar_1$ represents a (n1+2)-valent aromatic hydrocarbon group or a heterocyclic group, $Ar_2$ represents a (n2+2)-valent aromatic hydrocarbon group or a heterocyclic group, and $Ar_3$ represents a (n3+2)-valent aromatic hydrocarbon group or a heterocyclic group.

a cyclopentyl group, and a cyclohexyl group), an alkenyl group (preferably an alkenyl group having 2 to 20 carbon atoms, more preferably an alkenyl group having 2 to 12 carbon atoms, and particularly preferably an alkenyl group having 2 to 8 carbon atoms, and examples thereof include a vinyl group, an allyl group, a 2-butenyl group, and a 3-pentenyl group), an alkynyl group (preferably an alkynyl group having 2 to 20 carbon atoms, more preferably an alkynyl group 2 to 12 carbon atoms, and particularly preferably an alkynyl group having 2 to 8 carbon atoms, and examples thereof include a propargyl group and a 3-pentynyl group), an aryl group (preferably an aryl group having 6 to 30 carbon atoms, more preferably an aryl group having 6 to 20 carbon atoms, and particularly preferably an aryl group having 6 to 12 carbon atoms, and examples thereof include a phenyl group, a 2,6-diethylphenyl group, a 3,5-ditrifluoromethylphenyl group, a naphthyl group, and a biphenyl group), a substituted or unsubstituted amino group (preferably an amino group having 0 to 20 carbon atoms, more preferably an amino group having 0 to 10 carbon atoms, and particularly preferably an amino group having 0 to 6 carbon atoms, and examples thereof include an unsubstituted amino group, a methylamino group, a dimethylamino group, a diethylamino group, and an anilino group), an alkoxy group (preferably an alkoxy group having 1 to 20 carbon atoms and more preferably an alkoxy group having 1 to 15 carbon atoms, and examples thereof include a methoxy group, an ethoxy group, and a butoxy group), an oxycarbonyl group (preferably an oxycarbonyl group having 2 to 20 carbon atoms, more preferably an oxycarbonyl group having 2 to 15 carbon atoms, and particularly preferably an oxycarbonyl group having 2 to 10 carbon atoms, and examples thereof include a methoxycarbonyl group, an ethoxycarbonyl group, and a phenoxycarbonyl group), an acyloxy group (preferably an acyloxy group having 2 to 20 carbon atoms, more preferably an acyloxy group having 2 to 10 carbon atoms, and particularly preferably an acyloxy group having 2 to 6 carbon atoms, and examples thereof include an acetoxy group and a benzoyloxy group), an acylamino group (preferably an acylamino group having 2 to 20 carbon atoms, more preferably an acylamino group having 2 to 10 carbon atoms, and particularly preferably an acylamino group having 2 to 6 carbon atoms, and examples thereof include an acetylamino group and a benzoylamino group), an alkoxycarbonylamino group (preferably an alkoxycarbonylamino group having 2 to 20 carbon atoms, more preferably an alkoxycarbonylamino group having 2 to 10 carbon atoms, and particularly preferably an alkoxycarbonylamino group having 2 to 6 carbon atoms, and examples thereof include a methoxycarbonylamino group), an aryloxycarbonylamino group (preferably an aryloxycarbonylamino group having 7 to 20 carbon atoms, more preferably an aryloxycarbonylamino group having 7 to 16 carbon atoms, and particularly preferably an aryloxycarbonylamino group having 7 to 12 carbon atoms, and examples thereof include a phenyloxycarbonylamino group), a sulfonylamino group (preferably a sulfonylamino group having 1 to 20 carbon atoms, more preferably a sulfonylamino group having 1 to 10 carbon atoms, and particularly preferably a sulfonylamino group having 1 to 6 carbon atoms, and examples thereof include a methanesulfonylamino group and a benzenesulfonylamino group), a sulfamoyl group (preferably a sulfamoyl group having 0 to 20 carbon atoms, more preferably a sulfamoyl group having 0 to 10 carbon atoms, and particularly preferably a sulfamoyl group having 0 to 6 carbon atoms, and examples thereof include a sulfamoyl group, a methylsulfamoyl group, a dimethylsulfamoyl group, and a phenylsulfamoyl group), a carbamoyl group (preferably a carbamoyl group having 1 to 20 carbon atoms, more preferably a carbamoyl group having 1 to 10 carbon atoms, and particularly preferably a carbamoyl group having 1 to 6 carbon atoms, and examples thereof include an unsubstituted carbamoyl group, a methylcarbamoyl group, a diethylcarbamoyl group, and a phenylcarbamoyl group), an alkylthio group (preferably an alkylthio group having 1 to 20 carbon atoms, more preferably an alkylthio group having 1 to 10 carbon atoms, and particularly preferably an alkylthio group having 1 to 6 carbon atoms, and examples thereof include a methylthio group and an ethylthio group), an arylthio group (preferably an arylthio group having 6 to 20 carbon atoms, more preferably an arylthio group having 6 to 16 carbon atoms, and particularly preferably an arylthio group having 6 to 12 carbon atoms, and examples thereof include a phenylthio group), a sulfonyl group (preferably a sulfonyl group having 1 to 20 carbon atoms, more preferably a sulfonyl group having 1 to 10 carbon atoms, and particularly preferably a sulfonyl group having 1 to 6 carbon atoms, and examples thereof include a mesyl group and a tosyl group), a sulfinyl group (preferably a sulfinyl group having 1 to 20 carbon atoms, more preferably a sulfinyl group having 1 to 10 carbon atoms, and particularly preferably a sulfinyl group having 1 to 6 carbon atoms, and examples thereof include a methanesulfinyl group and a benzenesulfinyl group), a ureido group (preferably a ureido group having 1 to 20 carbon atoms, more preferably a ureido group having 1 to 10 carbon atoms, and particularly preferably a ureido group having 1 to 6 carbon atoms, and examples thereof include an unsubstituted ureido group, a methylureido group, and a phenylureido group), a phosphoric acid amide group (preferably a phosphoric acid amide group having 1 to 20 carbon atoms, more preferably a phosphoric acid amide group having 1 to 10 carbon atoms, and particularly preferably a phosphoric acid amide group having 1 to 6 carbon atoms, and examples thereof include a diethylphosphoric acid amide group and a phenylphosphoric acid amide group), a heterocyclic group (preferably a heterocyclic group having 1 to 30 carbon atoms and more preferably a heterocyclic group having 1 to 12 carbon atoms, and examples thereof include a heterocyclic group having a heteroatom such as a nitrogen atom, an oxygen atom, or a sulfur atom, and examples of the heterocyclic group having a heteroatom include an imidazolyl group, a pyridyl group, a quinolyl group, a furyl group, a piperidyl group, a morpholino group, a benzoxazolyl group, a benzimidazolyl group, and a benzothiazolyl group), a silyl group (preferably a silyl group having 3 to 40 carbon atoms, more preferably a silyl group having 3 to 30 carbon atoms, and particularly preferably a silyl group having 3 to 24 carbon atoms, and examples thereof include a trimethylsilyl group and a triphenylsilyl group), a halogen atom (such as a fluorine atom, a chlorine atom, a bromine atom, and an iodine atom), a hydroxy group, a mercapto group, a cyano group, a nitro group, a hydroxamic acid group, a sulfino group, a hydrazino group, an imino group, and an azo group.

These substituents may be further substituted with these substituents. Further, in a case where two or more substituents are present, these may be the same as or different from each other. Further, these may be bonded to each other to form a ring where possible.

As the group in which the above-described substituent is further substituted with the above-described substituent, an $R_B—(O—R_A)_{na}—$ group which is a group in which an alkoxy group is substituted with an alkyl group is exemplified. Here, in the formula, $R_A$ represents an alkylene group having 1 to 5 carbon atoms, $R_B$ represents an alkyl group having 1 to 5 carbon atoms, and na represents an integer of 1 to 10 (preferably an integer of 1 to 5 and more preferably an integer of 1 to 3).

Among these, as the monovalent substituent represented by $L_1$ and $L_2$, an alkyl group, an alkenyl group, an alkoxy group, and groups in which these groups are further substituted with these groups (for example, $R_B—(O—R_A)_{na}—$ group) are preferable, an alkyl group, an alkoxy group, and groups in which these groups are further substituted with these groups (for example, an $R_B—(O—R_A)_{na}—$ group) are more preferable.

Examples of the divalent linking group represented by $L_1$ and $L_2$ include —O—, —S—, —CO—, —COO—, —OCO—, —O—CO—O—, —CO—$NR_N$—, —O—CO—

NR$_N$—, —NR$_N$—CO—NR$_N$—, —SO$_2$—, —SO—, an alkylene group, a cycloalkylene group, an alkenylene group, and a group obtained by combining two or more of these groups.

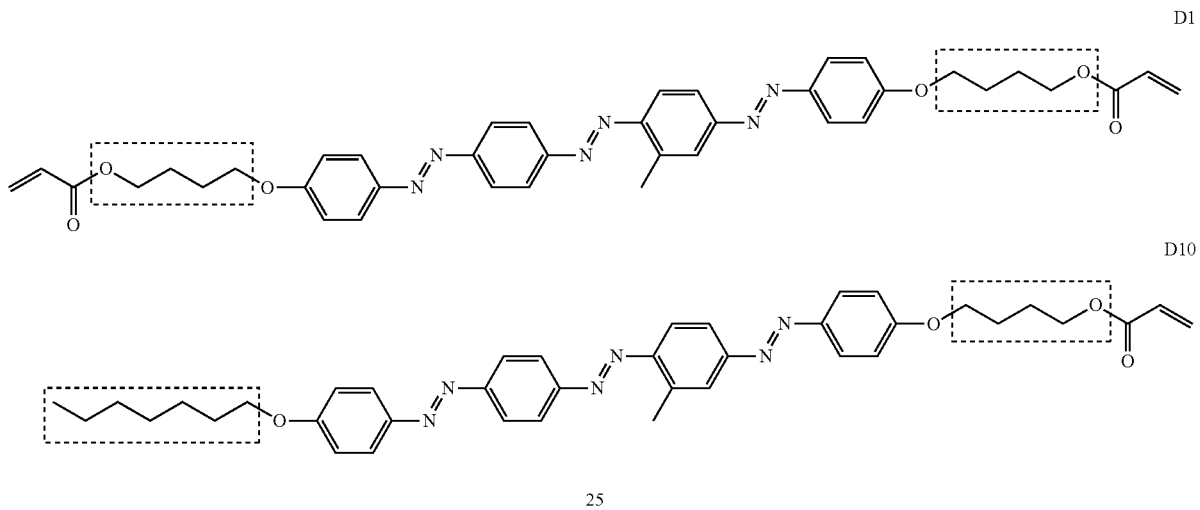

Among these, a group obtained by combining an alkylene group with one or more groups selected from the group consisting of —O—, —COO—, —OCO— and —O—CO—C— is preferable.

Here, R$_N$ represents a hydrogen atom or an alkyl group. In a case where a plurality of R$_N$'S are present, the plurality of R$_N$'s may be the same as or different from each other.

From the viewpoint of further improving the solubility of the dichroic substance, the number of atoms in the main chain of at least one of L$_1$ or L$_2$ is preferably 3 or greater, more preferably 5 or greater, still more preferably 7 or greater, and particularly preferably 10 or greater. Further, the upper limit value of the number of atoms in the main chain is preferably 20 or less and more preferably 12 or less.

In addition, from the viewpoint of further improving the alignment degree of the light absorption anisotropic layer, the number of atoms of the main chain of at least one of L$_1$ or L$_2$ is preferably in a range of 1 to 5.

Here, in a case where A is present in Formula (6), "main chain" of L$_1$ denotes a portion required for directly linking "A" with the "C" atom linked to L$_1$, and "number of atoms in the main chain" denotes the number of atoms constituting the above-described portion. Similarly, in a case where B is present in Formula (6), "main chain" of L$_2$ denotes a portion required for directly linking "B" with the "O" atom linked to L$_2$, and "number of atoms in the main chain" denotes the number of atoms constituting the above-described portion. Further, "number of atoms in the main chain" does not include the number of atoms in a branched chain described below.

Further, in a case where A is not present, "number of atoms in the main chain" in L$_1$ denotes the number of atoms in L$_1$ that does not have a branched chain. In a case where B is not present, "number of atoms in the main chain" in L$_2$ denotes the number of atoms in L$_2$ that does not have a branched chain.

Specifically, in Formula (D1), the number of atoms in the main chain of L$_1$ is 5 (the number of atoms in the dotted frame on the left side of Formula (D1)), and the number of atoms in the main chain of L$_2$ is 5 (the number of atoms in the dotted frame on the right side of Formula (D1)). Further, in Formula (D10), the number of atoms in the main chain of L$_1$ is 7 (the number of atoms in the dotted frame on the left side of Formula (D10)), and the number of atoms in the main chain of L$_2$ is 5 (the number of atoms in the dotted frame on the right side of Formula (D10)).

L$_1$ and L$_2$ may have a branched chain.

Here, in a case where A is present in Formula (6), "branched chain" of L$_1$ denotes a portion other than a portion required for directly linking "A" with the "O" atom linked to L$_1$ in Formula (6). Similarly, in a case where B is present in Formula (6), "branched chain" of L$_2$ denotes a portion other than a portion required for directly linking "B" with the "O" atom linked to L$_2$ in Formula (6).

Further, in a case where A is not present in Formula (6), "branched chain" of L$_1$ denotes a portion other than the longest atomic chain (that is, the main chain) extending from the "O" atom linked to L$_1$ in Formula (6) which is the starting point. Similarly, in a case where B is not present in Formula (6), "branched chain" of L$_2$ denotes a portion other than the longest atomic chain (that is, the main chain) extending from the "O" atom linked to L$_2$ in Formula (6) which is a starting point.

The number of atoms in the branched chain is preferably 3 or less. In a case where the number of atoms in the branched chain is set to 3 or less, there is an advantage that the alignment degree of the light absorption anisotropic layer is further improved. Further, the number of atoms in the branched chain does not include the number of hydrogen atoms.

In Formula (6), Ar$_1$ represents an (n1+2)-valent (for example, trivalent in a case where n1 represents 1) aromatic hydrocarbon group or heterocyclic group, Ar$_2$ represents an (n2+2)-valent (for example, trivalent in a case where n2 represents 1) aromatic hydrocarbon group or heterocyclic group, and Ar$_3$ represents an (n3+2)-valent (for example, trivalent in a case where n3 represents 1) aromatic hydrocarbon group or heterocyclic group. Here, Ar$_1$ to Ar$_3$ can be respectively rephrased as a divalent aromatic hydrocarbon group or a divalent heterocyclic group substituted with n1 to n3 substituents (R$_1$ to R$_3$ described below).

The divalent aromatic hydrocarbon group represented by Ar$_1$ to Ar$_3$ may be monocyclic or may have a bicyclic or higher cyclic fused ring structure. From the viewpoint of further improving the solubility, the number of rings of the divalent aromatic hydrocarbon group is preferably 1 to 4, more preferably 1 or 2, and still more preferably 1 (that is, a phenylene group).

Specific examples of the divalent aromatic hydrocarbon group include a phenylene group, an azulene-diyl group, a naphthylene group, a fluorene-diyl group, an anthracene-diyl group, and a tetracene-diyl group. From the viewpoints of further improving the solubility, a phenylene group or a naphthylene group is preferable, and a phenylene group is more preferable.

Specific examples of the third dichroic azo coloring agent compound are shown below, but the present invention is not limited thereto. In the following specific examples, n represents an integer of 1 to 10.

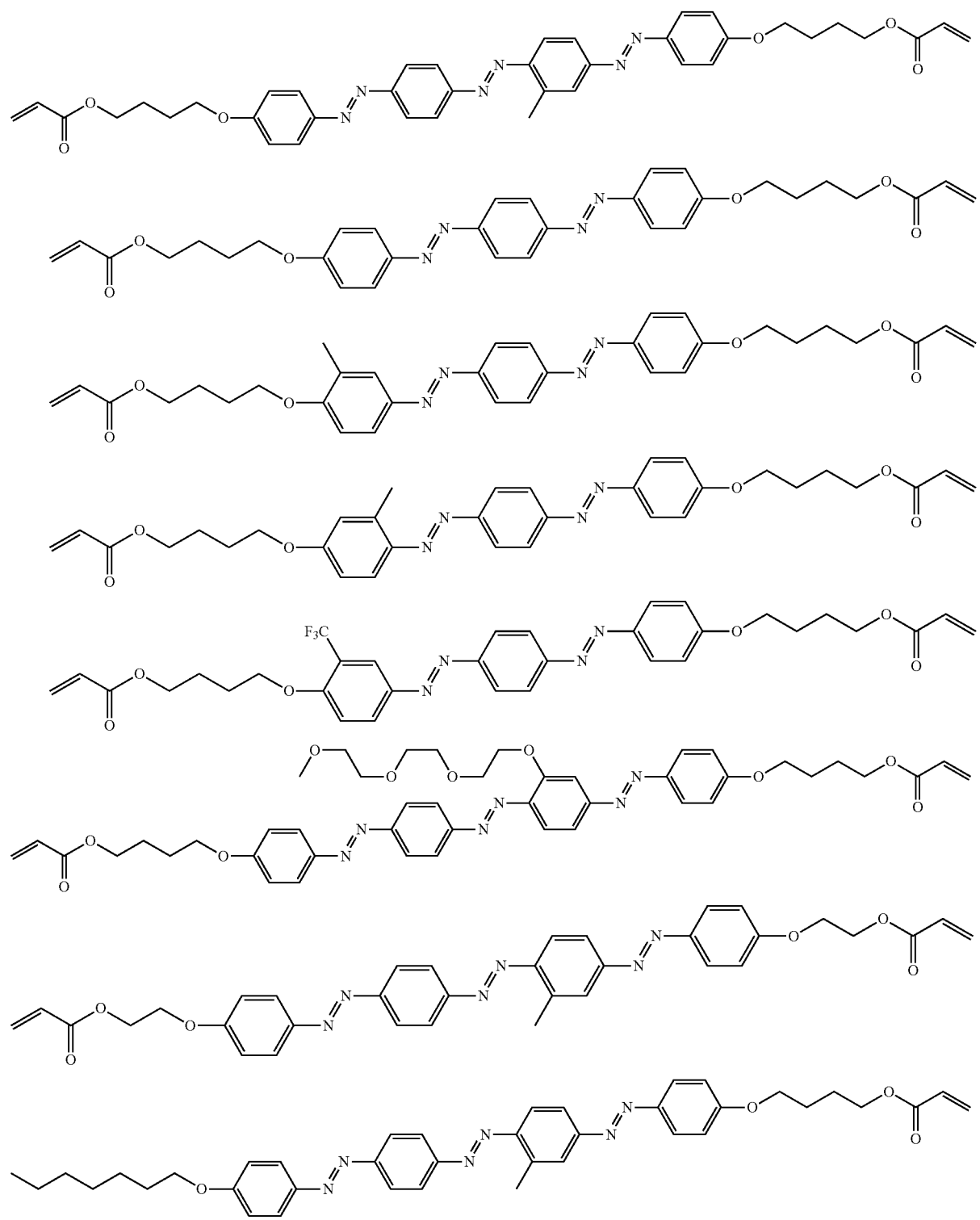

-continued
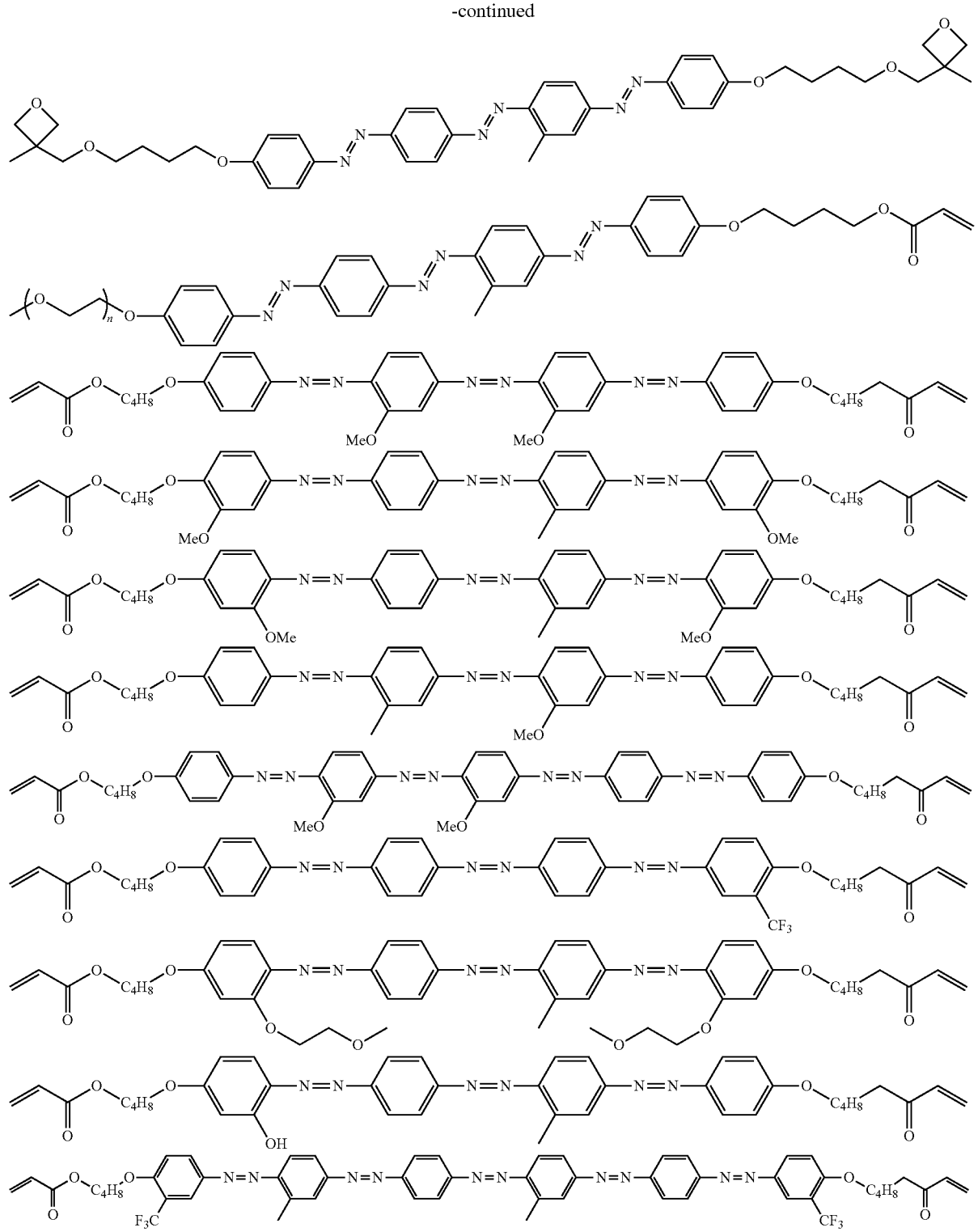
From the viewpoint that the alignment degree at 420 nm is excellent, a structure in which the third dichroic azo coloring agent compound does not contain a radically polymerizable group is preferable. Examples thereof include the following structures.

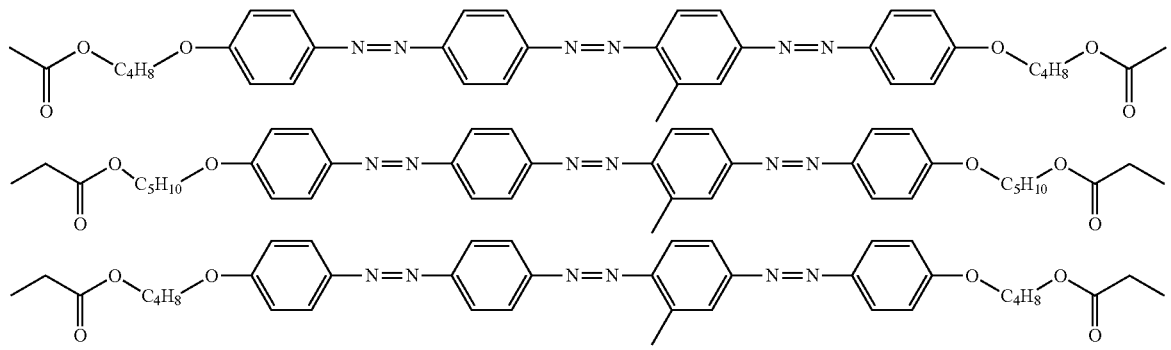

From the viewpoint that the alignment degree at a wavelength of 420 nm is particularly excellent, it is more preferable that the third dichroic azo coloring agent compound is a dichroic substance having a structure represented by Formula (1-1).

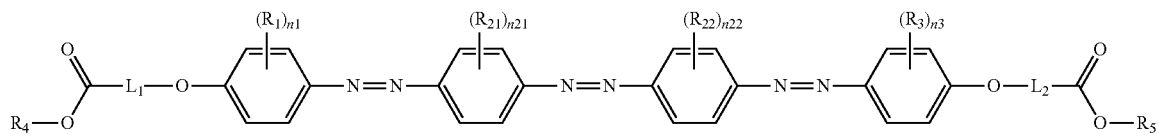

(1-1)

In Formula (1-1), $R_1$, $R_3$, $R_4$, $R_5$, n1, n3, $L_1$, and $L_2$ each have the same definition as that for $R_1$, $R_3$, $R_4$, $R_5$, n1, n3, $L_1$, and $L_2$ of Formula (1).

In Formula (1-1), $R_{21}$ and $R_{22}$ each independently have the same definition as that for $R_2$ in Formula (1).

In Formula (1-1), n21 and n22 each independently have the same definition as that for n2 in Formula (1).

An expression of "n1+n21+n22+n3≥1" is satisfied, and "n1+n21+n22+n3" is preferably in a range of 1 to 9 and more preferably in a range of 1 to 5.

Specific examples of the specific dichroic substance will be described below, but the present invention is not limited thereto.

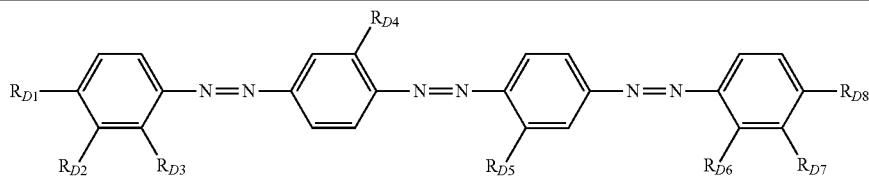

| No | $R_{D1}$ | $R_{D2}$ | $R_{D3}$ | $R_{D4}$ | $R_{D5}$ | $R_{D6}$ | $R_{D7}$ | $R_{D8}$ |
|---|---|---|---|---|---|---|---|---|
| D1 | $OC_4H_8C(O)OCH_2CH_3$ | H | H | H | $CH_3$ | H | H | $OC_4H_8C(O)OCH_2CH_3$ |
| D2 | $OC_4H_8C(O)OCH_3$ | H | H | H | $CH_3$ | H | H | $OC_4H_8C(O)OCH_3$ |
| D3 | $OC_4H_8C(O)OCH_2CH_3$ | H | H | H | $CH_3$ | H | H | $OC_{11}H_{23}$ |
| D4 | $OC_4H_8C(O)OCH_2CH_3$ | H | H | H | $CH_3$ | H | H | $OC_5H_{11}$ |
| D5 | $OC_4H_8C(O)OCH_2CH_3$ | H | H | H | $CH_3$ | H | H | $OCH_2CH_3$ |
| D6 | $OC_4H_8C(O)OCH_2CH_3$ | H | H | H | $CH_3$ | H | Cl | $OC_4H_8C(O)OCH_2CH_3$ |
| D7 | $OC_3H_6C(O)OCH_2CH_3$ | H | H | H | $CH_3$ | H | H | $OC_3H_6C(O)OCH_2CH_3$ |
| D8 | $OC_3H_6C(O)OCH_2CH_3$ | H | H | Cl | H | Cl | H | $OC_3H_6C(O)OCH_2CH_3$ |
| D9 | $OC_9H_{18}C(O)OCH_2CH_3$ | H | H | H | $CH_3$ | H | H | $OC_9H_{18}C(O)OCH_2CH_3$ |
| D10 | $OC_4H_8C(O)OCH_2CH=CH_2$ | H | H | H | $CH_3$ | H | H | $OC_4H_8C(O)OCH_2CH=CH_2$ |
| D11 | $OC_4H_8C(O)OCH_2CH_3$ | H | H | H | Cl | H | H | $OC_4H_8C(O)OCH_2CH_3$ |
| D12 | $OC_6H_4C(O)OCH_2CH_3$ | H | H | H | $CH_3$ | H | H | $OC_6H_4C(O)OCH_2CH_3$ |

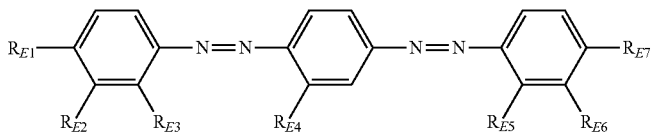

| No | $R_{E1}$ | $R_{E2}$ | $R_{E3}$ | $R_{E4}$ | $R_{E5}$ | $R_{E6}$ | $R_{E7}$ |
|---|---|---|---|---|---|---|---|
| E1 | $OC_4H_8C(O)OCH_2CH_3$ | H | H | H | H | H | $OC_4H_8C(O)OCH_2CH_3$ |
| E2 | $OC_4H_8C(O)OCH_3$ | H | H | H | H | H | $OC_4H_8C(O)OCH_3$ |
| E3 | $OC_4H_8C(O)OCH_2CH_3$ | Cl | H | H | H | Cl | $OC_4H_8C(O)OCH_2CH_3$ |
| E4 | $OC_4H_8C(O)OCH_2CH_3$ | H | H | H | H | Cl | $OC_5H_{11}$ |
| E5 | $OC_4H_8C(O)OCH_2CH_3$ | H | H | $CH_3$ | H | H | $OCH_2CH_3$ |
| E6 | $OC_3H_6C(O)OCH_2CH_3$ | H | H | H | H | H | $OC_3H_8C(O)OCH_2CH_3$ |
| E7 | $OC_9H_{18}G(O)OCH_2CH_3$ | H | H | H | H | H | $OC_9H_{18}C(O)OCH_2CH_3$ |
| E8 | $OC_4H_8C(O)OCH_2CH=CH_2$ | H | H | H | H | H | $OC_4H_8C(O)OCH_2CH=CH_2$ |

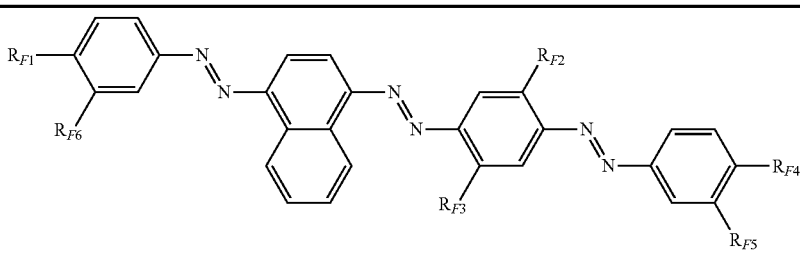

| No | $R_{F1}$ | $R_{F2}$ | $R_{F3}$ | $R_{F4}$ | $R_{F5}$ | $R_{F6}$ |
|---|---|---|---|---|---|---|
| F1 | $OC_4H_8C(O)OCH_2CH_3$ | H | H | $OC_4H_8C(O)OCH_2CH_3$ | H | H |
| F2 | $OC_4H_8C(O)OCH_3$ | H | $CH_3$ | $OC_4H_8C(O)OCH_3$ | H | H |
| F3 | $OC_3H_6C(O)OCH_2CH_3$ | H | H | $OC_3H_6C((O)OCH_2CH_3$ | H | Cl |

(Content of Dichroic Substance)

The content of the dichroic substance is preferably in a range of 5% to 30% by mass, more preferably in a range of 15% to 28% by mass, and still more preferably in a range of 20% to 30% by mass with respect to the total mass of the solid content of the light absorption anisotropic layer. In a case where the content of the dichroic substance is in the above-described ranges, a light absorption anisotropic layer having a high alignment degree can be obtained even in a case where the light absorption anisotropic layer is formed into a thin film. Therefore, a light absorption anisotropic layer having excellent flexibility is likely to be obtained. Further, in a case where the content thereof is greater than 30% by mass, internal reflection due to an increase in the refractive index is difficult to suppress.

From the viewpoint of increasing the contrast between the illuminance at the center of the viewing angle and the illuminance in a direction deviated from the center of the viewing angle, the content of the dichroic substance per unit area is preferably 0.2 g/m$^2$ or greater, more preferably 0.3 g/m$^2$ or greater, and still more preferably 0.5 g/m$^2$ or greater. The upper limit thereof is not particularly limited, but is typically 1.0 g/m$^2$ or less in many cases.

The content of the first dichroic azo coloring agent compound is preferably in a range of 40 to 90 parts by mass and more preferably in a range of 45 to 75 parts by mass with respect to 100 parts by mass of the total content of the dichroic substance in the composition for forming a light absorption anisotropic layer.

The content of the second dichroic azo coloring agent compound is preferably in a range of 6 to 50 parts by mass and more preferably in a range of 8 to 35 parts by mass with respect to 100 parts by mass of the total content of the dichroic substance in the composition for forming a light absorption anisotropic layer.

The content of the third dichroic azo coloring agent compound is preferably in a range of 3 to 35 parts by mass and more preferably in a range of 5 to 30 parts by mass with respect to 100 parts by mass of the content of the dichroic azo coloring agent compound in the composition for forming a light absorption anisotropic layer.

The content ratio between the first dichroic azo coloring agent compound, the second dichroic azo coloring agent compound, and the third dichroic azo coloring agent compound used as necessary can be optionally set in order to adjust the tint of the light absorption anisotropic layer. Here, the content ratio of the second dichroic azo coloring agent compound to the first dichroic azo coloring agent compound (second dichroic azo coloring agent compound/first dichroic azo coloring agent compound) is preferably in a range of 0.1 to 10, more preferably in a range of 0.2 to 5, and particularly preferably in a range of 0.3 to 0.8 in terms of moles. In a case where the content ratio of the second dichroic azo coloring agent compound to the first dichroic azo coloring agent compound is in the above-described ranges, the alignment degree is increased.

The light absorption anisotropic layer of the present invention can be prepared, for example, by using a composition for forming a light absorption anisotropic layer which contains the liquid crystal compound and the organic dichroic substance described above.

The composition for forming a light absorption anisotropic layer may contain components other than the liquid crystal compound and the organic dichroic substance.

Examples of the components other than the liquid crystal compound and the organic dichroic substance include a solvent, a vertical alignment agent, a polymerizable component, a polymerization initiator (for example, a radical polymerization initiator), and a leveling agent. In this case, the light absorption anisotropic layer according to the embodiment of the present invention contains a solid component other than a liquid component (such as a solvent).

(Polymerizable Component)

Examples of the polymerizable component include a compound containing an acrylate (such as an acrylate monomer). In this case, the light absorption anisotropic layer according to the embodiment of the present invention contains a polyacrylate obtained by polymerizing the compound containing an acrylate.

Examples of the polymerizable component include the compounds described in paragraph 0058 of JP2017-122776A.

In a case where the composition for forming a light absorption anisotropic layer contains a polymerizable component, the content of the polymerizable component is preferably in a range of 3 to 20 parts by mass with respect to 100 parts by mass of the total amount of the organic dichroic substance and the liquid crystal compound in the composition for forming a light absorption anisotropic layer.

(Vertical Alignment Agent)

The composition for forming a light absorption anisotropic layer may contain a vertical alignment agent as necessary. Examples of the vertical alignment agent include a boronic acid compound and an onium salt.

As the boronic acid compound, a compound represented by Formula (30) is preferable.

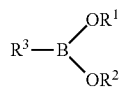

Formula (30)

In Formula (30), $R^1$ and $R^2$ each independently represent a hydrogen atom, a substituted or unsubstituted aliphatic hydrocarbon group, a substituted or unsubstituted aryl group, or a substituted or unsubstituted heterocyclic group. $R^3$ represents a substituent containing a (meth)acryl group.

Specific examples of the boronic acid compound include a boronic acid compound represented by General Formula (I) described in paragraphs [0023] to [0032] of JP2008-225281A.

As the boronic acid compound, compounds shown below are also preferable.

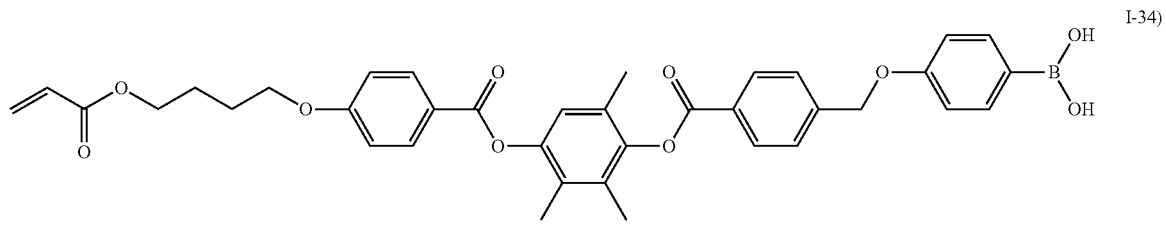

I-34)

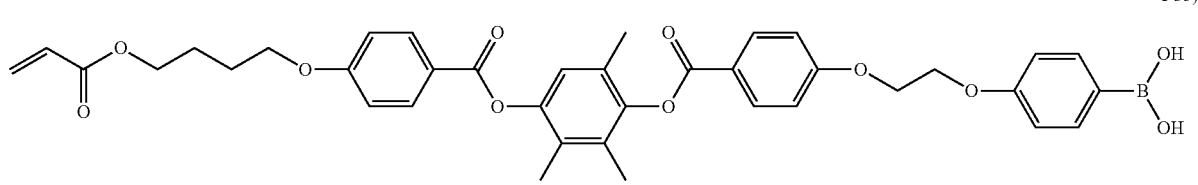

I-35)

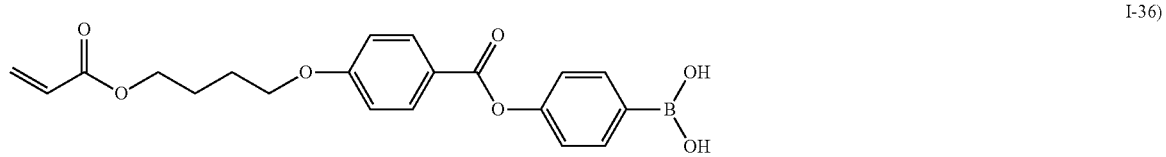

I-36)

As the onium salt, a compound represented by Formula (31) is preferable.

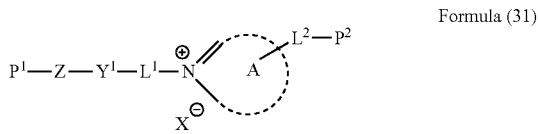

Formula (31)

In Formula (31), the ring A represents a quaternary ammonium ion consisting of a nitrogen-containing heterocyclic ring. X represents an anion. $L^1$ represents a divalent linking group. $L^2$ represents a single bond or a divalent linking group. $Y^1$ represents a divalent linking group having a 5- or 6-membered ring as a partial structure. Further, Z represents a divalent linking group containing an alkylene group having 2 to 20 carbon atoms as a partial structure. Further, $P^1$ and $P^2$ each independently represent a monovalent substituent having a polymerizable ethylenically unsaturated bond.

Specific examples of the onium salt include the onium salts described in paragraphs 0052 to 0058 of JP2012-208397A, the onium salts described in paragraphs 0024 to 0055 of JP2008-026730A, and the onium salts described in JP2002-37777A.

The content of the vertical alignment agent in the composition is preferably in a range of 0.1% to 400% by mass and more preferably in a range of 0.5% to 350% by mass with respect to the total mass of the liquid crystal compound.

The vertical alignment agent may be used alone or in combination of two or more kinds thereof. In a case where two or more kinds of vertical alignment agents are used, the total amount thereof is preferably in the above-described ranges.

(Leveling Agent)

It is preferable that the composition for forming a light absorption anisotropic layer contains a leveling agent described below. In a case where the composition contains a leveling agent, surface roughness due to dry air applied to the surface of the light absorption anisotropic layer is suppressed, and the organic dichroic substance is more uniformly aligned in the light absorption anisotropic layer.

Further, the leveling agent can also be used as a so-called surfactant.

The leveling agent is not particularly limited, and a leveling agent having a fluorine atom (fluorine-based leveling agent) or a leveling agent having a silicon atom (silicon-based leveling agent) is preferable, and a fluorine-based leveling agent is more preferable.

Examples of the fluorine-based leveling agent include fatty acid esters of polyvalent carboxylic acids in which a part of a fatty acid is substituted with a fluoroalkyl group and polyacrylates having a fluoro substituent. Particularly in a case where a rod-like compound is used as the dichroic substance and the liquid crystal compound, a leveling agent having a repeating unit derived from a compound represented by Formula (40) is preferable from the viewpoint of promoting the vertical alignment of the dichroic substance and the liquid crystal compound.

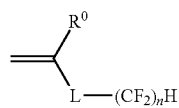

Formula (40)

$R^0$ represents a hydrogen atom, a halogen atom, or a methyl group.

L represents a divalent linking group. It is preferable that L represents an alkylene group having 2 to 16 carbon atoms, and optional —$CH_2$— that is not adjacent to the alkylene group may be substituted with —O—, —COO—, —CO—, or —CONH—.

n represents an integer of 1 to 18.

The leveling agent having a repeating unit derived from a compound represented by Formula (40) may further have other repeating units.

Examples of the other repeating units include a repeating unit derived from a compound represented by Formula (41).

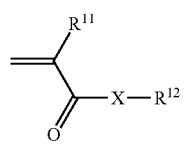

Formula (41)

$R^1$ represents a hydrogen atom, a halogen atom, or a methyl group.

X represents an oxygen atom, a sulfur atom, or —N($R^{13}$)—. $R^{13}$ represents a hydrogen atom or an alkyl group having 1 to 8 carbon atoms.

$R^{12}$ represents a hydrogen atom, an alkyl group which may have a substituent, or an aromatic group which may have a substituent. Further, the number of carbon atoms of the alkyl group is preferably in a range of 1 to 20. The alkyl group may be any of linear, branched, or cyclic.

Further, examples of the substituent that the alkyl group may have include a poly(alkyleneoxy) group and a polymerizable group. The definition of the polymerizable group is as described above.

In a case where the leveling agent has a repeating unit derived from a compound represented by Formula (40) and a repeating unit derived from a compound represented by Formula (41), the content of the repeating unit derived from the compound represented by Formula (40) is preferably in a range of 10% to 90% by mole and more preferably in a range of 15% to 95% by mole with respect to all the repeating units of the leveling agent.

In the case where the leveling agent has a repeating unit derived from a compound represented by Formula (40) and a repeating unit derived from a compound represented by Formula (41), the content of the repeating unit derived from the compound represented by Formula (41) is preferably in a range of 10% to 90% by mole and more preferably in a range of 5% to 85% by mole with respect to all the repeating units of the leveling agent.

Further, examples of the leveling agent include a leveling agent having a repeating unit derived from a compound represented by Formula (42) in place of the repeating unit derived from a compound represented by Formula (40).

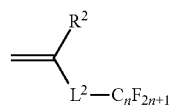

Formula (42)

$R^2$ represents a hydrogen atom, a halogen atom, or a methyl group.

$L^2$ represents a divalent linking group.

n represents an integer of 1 to 18.

Specific examples of the leveling agent include the compounds described in paragraphs 0046 to 0052 of JP2004-331812A and the compounds described in paragraphs 0038 to 0052 of JP2008-257205A.

The content of the leveling agent in the composition is preferably in a range of 0.001% to 10% by mass and more preferably in a range of 0.01% to 5% by mass with respect to the total mass of the liquid crystal compound.

The leveling agent may be used alone or in combination of two or more kinds thereof. In a case where two or more leveling agents are used, it is preferable that the total amount thereof is in the above-described ranges.

(Polymerization Initiator)

It is preferable that the composition for forming a light absorption anisotropic layer contains a polymerization initiator.

The polymerization initiator is not particularly limited, but a compound having photosensitivity, that is, a photopolymerization initiator is preferable.

As the photopolymerization initiator, various compounds can be used without any particular limitation. Examples of the photopolymerization initiator include α-carbonyl compounds (U.S. Pat. Nos. 2,367,661A and 2,367,670A), acyloin ether (U.S. Pat. No. 2,448,828A), α-hydrocarbon-substituted aromatic acyloin compounds (U.S. Pat. No. 2,722, 512A), polynuclear quinone compounds (U.S. Pat. Nos. 3,046,127A and 2,951,758A), a combination of a triarylimidazole dimer and a p-aminophenyl ketone (U.S. Pat. No. 3,549,367A), acridine and phenazine compounds (JP1985-105667A (JP-560-105667A) and U.S. Pat. No. 4,239,850A), oxadiazole compounds (U.S. Pat. No. 4,212,970A), o-acyloxime compounds (paragraph [0065] of JP2016-27384A), and acylphosphine oxide compounds (JP1988-40799B (JP-S63-40799B), JP1993-29234B (JP-H5-29234B), JP1998-95788A (JP-H10-95788A), and JP1998-29997A (JP-H10-29997A)).

Commercially available products can also be used as such a photopolymerization initiator, and examples thereof include IRGACURE 184, IRGACURE 907, IRGACURE 369, IRGACURE 651, IRGACURE 819, IRGACURE OXE-01, and IRGACURE OXE-02 (all manufactured by BASF SE).

In a case where the composition for forming a light absorption anisotropic layer contains a polymerization initiator, the content of the polymerization initiator is preferably in a range of 0.01 to 30 parts by mass and more preferably in a range of 0.1 to 15 parts by mass with respect to 100 parts by mass of the total amount of the dichroic substance and the polymer liquid crystal compound in the composition for forming a light absorption anisotropic layer. The durability of the light absorption anisotropic layer is enhanced in a case where the content of the polymerization initiator is 0.01 parts by mass or greater, and the alignment degree of the light absorption anisotropic layer is further enhanced in a case where the content thereof is 30 parts by mass or less.

The polymerization initiator may be used alone or in combination of two or more kinds thereof. In a case where the composition contains two or more kinds of polymerization initiators, it is preferable that the total amount of the polymerization initiators is in the above-described ranges.

(Solvent)

From the viewpoint of workability or the like, it is preferable that the composition for forming a light absorption anisotropic layer contains a solvent.

Examples of the solvent include organic solvents such as ketones (such as acetone, 2-butanone, methyl isobutyl ketone, cyclopentanone, and cyclohexanone), ethers (such as dioxane, tetrahydrofuran, 2-methyltetrahydrofuran, cyclopentyl methyl ether, tetrahydropyran, and dioxolane), aliphatic hydrocarbons (such as hexane), alicyclic hydrocarbons (such as cyclohexane), aromatic hydrocarbons (such as benzene, toluene, xylene, and trimethylbenzene), halogenated carbons (such as dichloromethane, trichloromethane, dichloroethane, dichlorobenzene, and chlorotoluene), esters (such as methyl acetate, ethyl acetate, butyl acetate, and ethyl lactate), alcohols (such as ethanol, isopropanol, butanol, cyclohexanol, isopentyl alcohol, neopentyl alcohol, diacetone alcohol, and benzyl alcohol), cellosolves (such as methyl cellosolve, ethyl cellosolve, and 1,2-dimethoxyethane), cellosolve acetates, sulfoxides (such as dimethyl sulfoxide), amides (such as dimethylformamide, dimethylacetamide, N-methylpyrrolidone, N-ethylpyrrolidone, and 1,3-dimethyl-2-imidazolidinone), and heterocyclic compounds (such as pyridine and N-methylimidazole), and water. These solvents may be used alone or in combination of two or more kinds thereof.

Among these solvents, from the viewpoint of exhibiting the effect of the excellent solubility, ketones (particularly cyclopentanone and cyclohexanone), ethers (particularly tetrahydrofuran, cyclopentyl methyl ether, tetrahydropyran, and dioxolane), and amides (particularly dimethylformamide, dimethylacetamide, N-methylpyrrolidone, and N-ethylpyrrolidone) are preferable.

In a case where the composition for forming a light absorption anisotropic layer contains a solvent, the content of the solvent is preferably in a range of 80% to 99% by mass, more preferably in a range of 83% to 97% by mass, and particularly preferably in a range of 85% to 95% by mass with respect to the total mass of the composition for forming a light absorption anisotropic layer.

These solvents may be used alone or in combination of two or more kinds thereof. In a case where the composition contains two or more kinds of solvents, it is preferable that the total amount of the solvents is in the above-described range.

The light absorption anisotropic film according to the embodiment of the present invention may be formed of only a light absorption anisotropic layer or may be a laminate having other layers in addition to the light absorption anisotropic layer as necessary.

For example, the light absorption anisotropic film according to the embodiment of the present invention may include the barrier layer 1, the liquid crystal layer 3 for alignment, the alignment layer 4, and the TAC film 5 in addition to the light absorption anisotropic layer 2 as illustrated in FIG. 2.

<Support>

The light absorption anisotropic film according to the embodiment of the present invention may include a support for supporting the light absorption anisotropic film. In the light absorption anisotropic film 101 illustrated in FIG. 2, the TAC film 5 is a support.

It is preferable that the support is disposed such that the surface thereof is on a side opposite to the air layer. Further, in a case where the light absorption anisotropic film includes a protective layer for protecting the light absorption anisotropic layer, it is preferable that the support is disposed on a surface opposite to a side where the protective layer is provided.

As the support, known transparent resin films, transparent resin plates, transparent resin sheets, and the like can be used without particular limitation. Examples of the transparent resin film include a cellulose acylate film (such as a cellulose triacetate film (refractive index of 1.48), a cellulose diacetate film, a cellulose acetate butyrate film, or a cellulose acetate propionate film), a polyethylene terephthalate film, a polyether sulfone film, a polyacrylic resin film, a polyurethane-based resin film, a polyester film, a polycarbonate film, a polysulfone film, a polyether film, a polymethylpentene film, a polyether ketone film, and a (meth)acrylonitrile film.

Among these, a cellulose acylate film which is highly transparent, has a small optical birefringence, is easily produced, and is typically used as a protective film of a polarizing plate is preferable, and a cellulose triacetate film is particularly preferable.

The thickness of the support is typically in a range of 20 to 100 μm.

In the present invention, it is particularly preferable that the support is a cellulose ester-based film having a film thickness 20 to 70 μm.

<Alignment Film>

The light absorption anisotropic film according to the embodiment of the present invention may include an alignment film between the support and the light absorption anisotropic layer.

The alignment film may be any layer as long as the liquid crystal compound that is a host of an organic dichroic substance on the alignment film can be placed in an alignment state in which the angle θA and the angle θB of the alignment direction of the above-described organic dichroic substance are at predetermined angles.

For example, a film formed of a polyfunctional acrylate compound or polyvinyl alcohol may be used as the alignment film. Polyvinyl alcohol is particularly preferable.

The alignment axis can be inclined by irradiating a photo-alignment film containing an azo compound or a cinnamoyl compound with UV rays in an oblique direction, and as a result, the transmittance central axis can be inclined with respect to the normal direction of the film.

Preferred examples of the alignment film include a liquid crystal layer for alignment (liquid crystal layer 3 for alignment in FIG. 2) which is used for aligning the liquid crystal compound serving as a host in the thickness direction in the light absorption anisotropic layer such that the angle θA and the angle θB described above are satisfied.

In addition, the alignment film may include an alignment layer (alignment layer 4 in FIG. 2) for aligning the liquid crystal compound constituting the liquid crystal layer for alignment in the in-plane direction as necessary, in addition to the liquid crystal layer for alignment.

[Liquid Crystal Layer for Alignment]

The liquid crystal layer for alignment is a liquid crystal layer formed by hybrid-aligning a liquid crystal compound in which the alignment direction of the liquid crystal compound in the thickness direction continuously changes from the support side to the air side (light absorption anisotropic layer side) as illustrated as the liquid crystal layer 3 for alignment in FIG. 2. In other words, the liquid crystal layer for alignment is a layer formed by fixing a hybrid-aligned liquid crystal compound in which the alignment direction in the thickness direction continuously changes from one surface side to the other surface side. It is preferable that the liquid crystal layer for alignment is a layer formed by fixing a hybrid-aligned polymerizable liquid crystal compound.

As a function of the liquid crystal layer for alignment, the tilt angle and the tilt direction of a liquid crystal compound at the interface between a light absorption anisotropic layer provided on the liquid crystal layer for alignment and another liquid crystal layer for alignment can be controlled by using the tilt angle of a liquid crystal compound at the air layer-side interface of the liquid crystal layer for alignment.

In a case where a liquid crystal layer for alignment is provided on the light absorption anisotropic film according to the embodiment of the present invention, it is preferable that the liquid crystal compound in the liquid crystal layer for alignment and the liquid crystal compound in the light absorption anisotropic layer provided on the liquid crystal layer for alignment and other liquid crystal layers are the same as or similar to each other. In particular, it is preferable that the liquid crystal compound in the light absorption anisotropic layer is a polymer of a polymerizable liquid crystal compound and that the polymerizable liquid crystal compound used in the light absorption anisotropic layer and the polymerizable liquid crystal compound used in the liquid crystal layer for alignment are the same as each other.

In this manner, the tilt angle and the tilt direction of the light absorption anisotropic layer and other liquid crystal layers can be controlled more precisely.

The thickness of the liquid crystal layer for alignment is not limited, but is preferably in a range of 0.1 to 2.0 μm from the viewpoint that a satisfactory alignment state can be obtained.

It is preferable that the alignment film includes, in addition to the liquid crystal layer for alignment, an alignment layer for aligning the liquid crystal compound contained in the liquid crystal layer for alignment in the in-plane direction on the support side of the liquid crystal layer for alignment.

That is, it is preferable that the light absorption anisotropic film according to the embodiment of the present invention includes an alignment layer on a support, a liquid crystal layer for alignment on the surface of the alignment layer, and a light absorption anisotropic layer on the surface of the liquid crystal layer for alignment as illustrated in FIG. 2. Further, the light absorption anisotropic film according to the embodiment of the present invention may have any layer between the support and the alignment layer, as necessary.

The alignment layer is not limited, and various known alignment layers can be used as long as the liquid crystal compound contained in the liquid crystal layer for alignment can be aligned in an in-plane direction and preferably uniaxially aligned. Examples of such alignment layers include a layer in which a resin film consisting of a resin such as polyvinyl alcohol or polyimide is subjected to a rubbing treatment, and a layer consisting of a photo-alignment material such as polyvinyl cinnamate or an azobenzene-based compound which has been exposed to UV rays by inclining the incidence angle.

Among these, polyvinyl alcohol subjected to a rubbing treatment and a polyimide film subjected to a rubbing treatment are suitably used as the alignment layer.

Further, in a case where the alignment layer is capable of aligning the liquid crystal compound of the light absorption anisotropic layer not only in the in-plane direction but also in the thickness direction, a light absorption anisotropic layer may be formed on the surface of the alignment layer without providing the liquid crystal layer for alignment.

<Protective Layer>

The light absorption anisotropic film according to the embodiment of the present invention may have a protective layer for protecting the light absorption anisotropic layer. As the protective layer, various known layers (films) can be used as long as the light absorption anisotropic layer can be protected, and suitable examples thereof include a barrier layer.

The light absorption anisotropic film illustrated in FIG. 2 includes the barrier layer 1 on the surface of the light absorption anisotropic layer 2 (on a side opposite to the support).

Here, the barrier layer is also referred to as a gas-shielding layer (oxygen-shielding layer) and has a function of protecting the polarizer of the present invention from gas such as oxygen in the atmosphere, the moisture, or the compound contained in an adjacent layer.

The barrier layer can refer to, for example, the description in paragraphs [0014] to [0054] of JP2014-159124A, paragraphs [0042] to [0075] of JP2017-121721A, paragraphs [0045] to [0054] of JP2017-115076A, paragraphs [0010] to [0061.] of JP2012-213938A, and paragraphs [0021] to [0031] of JP2005-169994A.

<Refractive Index Adjusting Layer>

In the light absorption anisotropic film according to the embodiment of the present invention, since the light absorption anisotropic layer described above contains a dichroic substance, internal reflection due to the high refractive index of the light absorption anisotropic layer may be a problem.

In that case, it is preferable that a refractive index adjusting layer is present. The refractive index adjusting layer is a layer disposed in contact with the light absorption anisotropic layer and has an in-plane average refractive index of 1.55 or greater and 1.70 or less at a wavelength of 550 nm. It is preferable that the refractive index adjusting layer is a refractive index adjusting layer for performing so-called index matching.

<Other Layers>

In addition to the above-described layers, the light absorption anisotropic film according to the embodiment of the present invention may include layers (films and membranes) exhibiting various functions, such as a retardation layer, an antireflection layer, and various filters, as necessary.

Further, the light absorption anisotropic film according to the embodiment of the present invention is not limited to, for example, the configuration illustrated in FIG. 2 and can be configured to have various layers as long as the configuration has a light absorption anisotropic layer.

For example, the light absorption anisotropic film according to the embodiment of the present invention may be formed of only a light absorption anisotropic layer, may be formed of a light absorption anisotropic layer and an alignment film, may be formed of a light absorption anisotropic layer and a liquid crystal layer for alignment, or may be formed of a light absorption anisotropic layer and a barrier layer.

<Method of Forming Light Absorption Anisotropic Layer>

A method of forming the light absorption anisotropic layer is not particularly limited, and examples thereof include a method of sequentially performing a step of applying a composition for forming a light absorption anisotropic layer to form a coating film (hereinafter, also referred to as "coating film forming step") and a step of aligning the liquid crystal component and the dichroic substance contained in the coating film (hereinafter, also referred to as "aligning step").

Further, the liquid crystal component is a component that also includes a dichroic substance having liquid crystallinity in addition to the above-described liquid crystal compound, in a case where the above-described dichroic substance has liquid crystallinity.

[Coating Film Forming Step]

The coating film forming step is a step of applying a composition for forming a light absorption anisotropic layer to form a coating film. It is preferable that the surface of the liquid crystal layer for alignment described above is coated with the composition for forming a light absorption anisotropic layer.

The composition for forming a light absorption anisotropic layer can be easily applied by using the composition for forming a light absorption anisotropic layer which contains the above-described solvent or using a liquid such as a melt obtained by heating the composition for forming a light absorption anisotropic layer.

Specific examples of the method of applying the composition for forming a light absorption anisotropic layer include known methods such as a roll coating method, a gravure printing method, a spin coating method, a wire bar coating method, an extrusion coating method, a direct gravure coating method, a reverse gravure coating method, a die coating method, a spraying method, and an ink jet method.

[Aligning Step]

The aligning step is a step of aligning the liquid crystal component contained in the coating film. In this manner, a light absorption anisotropic layer is obtained.

The aligning step may include a drying treatment. Components such as a solvent can be removed from the coating film by performing the drying treatment. The drying treatment may be performed by a method of allowing the coating film to stand at room temperature for a predetermined time (for example, natural drying) or a method of heating the coating film and/or blowing air to the coating film.

Here, the liquid crystal components contained in the composition for forming a light absorption anisotropic layer may be aligned by the coating film forming step or the drying treatment described above. For example, in an embodiment in which the composition for forming a light absorption anisotropic layer is prepared as a coating solution containing a solvent, a coating film having light absorption anisotropy (that is, a light absorption anisotropic layer) is obtained by drying the coating film and removing the solvent from the coating film.

In a case where the drying treatment is performed at a temperature higher than or equal to the transition temperature of the liquid crystal component contained in the coating film to the liquid crystal phase, the heat treatment described below may not be performed.

The transition temperature of the liquid crystal component contained in the coating film to the liquid crystal phase is preferably in a range of 10° C. to 250° C. and more preferably in a range of 25° C. to 190° C. from the viewpoint of the manufacturing suitability or the like.

It is preferable that the transition temperature is 10° C. or higher from the viewpoint that a cooling treatment or the like for lowering the temperature to a temperature range in which a liquid crystal phase is exhibited is not necessary. Further, it is preferable that the transition temperature is 250° C. or lower from the viewpoint that a high temperature is not required even in a case of setting an isotropic liquid state at a temperature higher than the temperature range in which a liquid crystal phase is temporarily exhibited, and waste of thermal energy and deformation and deterioration of a substrate can be reduced.

It is preferable that the aligning step includes a heat treatment. In this manner, since the liquid crystal component contained in the coating film can be aligned, the coating film after being subjected to the heat treatment can be suitably used as the light absorption anisotropic layer.

From the viewpoint of the manufacturing suitability, the heat treatment is performed at a temperature of preferably 10° C. to 250° C. and more preferably 25° C. to 190° C. Further, the heating time is preferably in a range of 1 to 300 seconds and more preferably in a range of 1 to 60 seconds.

The aligning step may include a cooling treatment performed after the heat treatment. The cooling treatment is a treatment of cooling the coating film after being heated to room temperature (20° C. to 25° C.). In this manner, the alignment of the liquid crystal components contained in the coating film can be fixed. The cooling means is not particularly limited and can be performed according to a known method.

The light absorption anisotropic layer can be obtained by performing the above-described steps.

Further, in the description above, examples of the aligning step, that is, a method of aligning the liquid crystal components contained in the coating film include a drying treatment and a heat treatment, but the aligning step is not limited thereto, and known alignment treatments can be used.

[Other Steps]

The method of forming the light absorption anisotropic layer may include a step of curing the light absorption anisotropic layer after the aligning step (hereinafter, also referred to as "curing step").

The curing step is performed by heating the light absorption anisotropic layer and/or irradiating the layer with light (exposing the layer to light), for example, in a case where the light absorption anisotropic layer contains a crosslinkable group. (polymerizable group). Between these, it is preferable that the curing step is performed by irradiating the layer with light.

Various kinds of light (electromagnetic wave) such as infrared rays, visible light, and ultraviolet rays can be used as the light for curing, but ultraviolet rays are preferable. The curing may be carried out by using a light source that emits light having a specific wavelength (wavelength range) or irradiating the layer with transmitted light through a filter that transmits only light having a specific wavelength (wavelength range) as the above-described light.

Further, the curing may be carried out by irradiating the layer with ultraviolet rays or the like while heating the layer.

In a case where the layer is irradiated with light while being heated, the heating temperature during the irradiation with light depends on the transition temperature of the liquid crystal components contained in the liquid crystal film to a liquid crystal phase, but is preferably in a range of 25° to 140° C.

Further, the irradiation with light may be performed in a nitrogen atmosphere. In a case where the curing of the liquid crystal film proceeds by radical polymerization, from the viewpoint of reducing inhibition of polymerization by oxygen, it is preferable that the film is irradiated with light in a nitrogen atmosphere.

The thickness of the light absorption anisotropic layer is not particularly limited, but is preferably in a range of 100 to 8000 nm and more preferably in a range of 300 to 5000 nm from the viewpoint of reducing the size and the weight.

<Patterning of Light Absorption Anisotropic Layer>

The light absorption anisotropic layer of the light absorption anisotropic film according to the embodiment of the present invention may be a light absorption anisotropic layer which has a region A and a region B in the plane and has different transmittance central axes in each region. In a case where light emitting pixels are controlled by patterning each liquid crystal pixel, the center of the visual field in a narrow visual field can be switched.

Further, the light absorption anisotropic layer used in the present invention may be a light absorption anisotropic layer which has a region C and a region D in the plane and has different transmittances at an angle inclined by 30° with respect to the normal direction from the transmittance central axis in the plane provided with the transmittance central axis and the normal line of the film surface in the region C and the region D. In this case, it is preferable that the light absorption anisotropic layer is a light absorption anisotropic layer in which the transmittance at an angle inclined by 30° with respect to the normal direction from the transmittance central axis of the region C is 50% or less and the transmittance at an angle inclined by 30° with respect to the normal direction from the transmittance central axis of the region D is 80% or greater.

The viewing angle dependence in some regions can be strengthened or weakened by performing the patterning. In this manner, highly confidential information can also be displayed only in the region where the viewing angle dependence is strengthened. Further, design with excellent designability can be carried out by controlling the viewing angle dependence as a display device for each display position. Further, a narrow viewing angle and a wide viewing angle can be switched by patterning each liquid crystal pixel to control light emitting pixels.

In the description below, the light absorption anisotropic layer having two or more different regions in a plane as described above will also be referred to as "patterned light absorption anisotropic layer" for convenience.

[Pattern Forming Method]

The method of forming the patterned light absorption anisotropic layer is not limited, and various known methods as described in, for example, WO2019/176918A can be used. Examples thereof include a method of forming a pattern by changing the irradiation angle of ultraviolet light to be applied to a photo-alignment film, a method of controlling the thickness of a patterned light absorption anisotropic layer in the plane, a method of unevenly distributing a dichroic substance compound in a patterned light absorption anisotropic layer, and a method of post-processing an optically uniform patterned light absorption anisotropic layer.

Examples of the method of controlling the thickness of the patterned light absorption anisotropic layer in a plane include a method of using lithography, a method of using imprinting, and a method of forming a patterned light absorption anisotropic layer on a base material having an uneven structure.

Examples of the method of unevenly distributing a dichroic substance compound in the patterned light absorption anisotropic layer include a method of extracting a dichroic substance by solvent immersion (bleaching).

Further, examples of the method of post-processing an optically uniform patterned light absorption anisotropic layer include a method of cutting a part of a flat light absorption anisotropic layer by laser processing or the like.

The viewing angle control system according to the embodiment of the present invention includes the above-described light absorption anisotropic film according to the embodiment of the present invention and a polarizer.

<Polarizer>

The polarizer used in the viewing angle control system according to the present invention is not particularly limited as long as it is a member having a function of converting light into specific linearly polarized light, and a known polarizer can be used.

As the polarizer, an iodine-based polarizer, a dye-based polarizer formed of a dichroic substance, a polyene-based polarizer, or the like is used.

Examples of the iodine-based polarizer and the dye-based polarizer include a coating type polarizer and a stretching type polarizer, and both polarizers can be applied. A polarizer in which a dichroic organic coloring agent is aligned by using alignment of the liquid crystal compound is preferable as the coating type polarizer. Further, a polarizer prepared by adsorbing iodine or a dichroic substance on polyvinyl alcohol and stretching the polyvinyl alcohol is preferable as the stretching type polarizer.

Further, examples of the method of obtaining a polarizer by stretching and dyeing a laminated film in which a polyvinyl alcohol layer is formed on a base material include methods described in JP5048120B, JP5143918B, JP4691205B, JP4751481B, and JP4751486B, and known techniques relating to these polarizers can also be preferably used.

Among these, from the viewpoints of the availability and the excellent degree of polarization, a polarizer containing a polyvinyl alcohol-based resin (a polymer having —$CH_2$—CHOH— as a repeating unit, particularly at least one selected from the group consisting of polyvinyl alcohol and ethylene-vinyl alcohol copolymers) is preferable.

In the present invention, the thickness of the polarizer is not particularly limited, but is preferably in a range of 3 μm to 60 μm, more preferably in a range of 5 μm to 20 μm, and still more preferably in a range of 5 μm to 10 μm.

The light absorption anisotropic film and the polarizer layer in the viewing angle control system according to the embodiment of the present invention may be laminated via a bonding agent such as a pressure sensitive adhesive or an adhesive, or the polarizer may be directly coated with the alignment film and the light absorption anisotropic film so that the films are laminated on the polarizer.

<Pressure Sensitive Adhesive Layer>

It is preferable that the pressure sensitive adhesive layer in the present invention is a transparent and optically isotropic pressure sensitive adhesive similar to that used in a typical liquid crystal display device, and a pressure sensitive type adhesive is typically used.

The pressure sensitive adhesive layer of the present invention may be blended with appropriate additives such as a crosslinking agent (such as an isocyanate-based crosslinking agent or an epoxy-based crosslinking agent), a viscosity imparting agent (such as a rosin derivative resin, a polyterpene resin, a petroleum resin, or an oil-soluble phenol resin), a plasticizer, a filler, an antiaging agent, a surfactant, an ultraviolet absorbing agent, a light stabilizer, and an antioxidant in addition to a parent material (pressure sensitive adhesive), conductive particles, and thermally expandable particles used as necessary.

The thickness of the pressure sensitive adhesive layer is typically in a range of 20 to 500 m and preferably in a range of 20 to 250 µm. The required adhesive strength or rework suitability may not be obtained in a case where the thickness thereof is less than 20 µm, and the pressure sensitive adhesive may protrude or bleed out from the peripheral end portion of the image display device in a case where the thickness thereof is greater than 500 µm.

<Adhesive Layer>

The adhesive of the present invention exhibits adhesiveness due to drying or a reaction after bonding.

A polyvinyl alcohol-based adhesive (PVA-based adhesive) exhibits adhesiveness due to drying and is capable of bonding materials to each other.

Specific examples of the curable adhesive that exhibits adhesiveness due to a reaction include an active energy ray-curable adhesive such as a (meth) acrylate-based adhesive and a cationic polymerization curable adhesive.

Examples of the curable component in the (meth)acrylate-based adhesive include a compound containing a (meth) acryloyl group and a compound containing a vinyl group. Further, as the cationic polymerization curable adhesive, a compound containing an epoxy group or an oxetanyl group can also be used. The compound containing an epoxy group is not particularly limited as long as the compound contains at least two epoxy groups in a molecule, and various generally known curable epoxy compounds can be used. Preferred examples of the epoxy compound include a compound (aromatic epoxy compound) containing at least two epoxy groups and at least one aromatic ring in a molecule and a compound (alicyclic epoxy compound) containing at least two epoxy groups in a molecule, in which at least one of the epoxy groups is formed between two adjacent carbon atoms constituting an alicyclic ring.

Among these, an ultraviolet curable adhesive that is cured by irradiation with ultraviolet rays is preferably used from the viewpoint of heat deformation resistance.

The adhesive layer and the pressure sensitive adhesive layer may be layers obtained by imparting the ultraviolet absorbing ability to the layers using a method of performing a treatment with an ultraviolet absorbing agent such as a salicylic acid ester-based compound, a benzophenol-based compound, a benzotriazole-based compound, a cyanoacrylate-based compound, or a nickel complex salt-based compound.

The pressure sensitive adhesive layer or the adhesive layer may be appropriately attached to the light absorption anisotropic film and/or the polarizer by a known method.

For example, the pressure sensitive adhesive layer or the adhesive layer may be attached to the film by a method of preparing 10% to 40% by mass of a bonding agent solution obtained by dissolving or dispersing a base polymer or a composition thereof in a solvent consisting of a single substance or a mixture of an appropriate solvent such as toluene or ethyl acetate and directly attaching the solution onto the light absorption anisotropic film and/or the polarizer by an appropriate development method such as a casting method or a coating method.

Further, as the method of attaching the pressure sensitive adhesive layer or the adhesive layer to the light absorption anisotropic film and/or the polarizer, a method of preparing a coating solution containing a parent material forming the pressure sensitive adhesive layer, and as necessary, thermally expandable particles, an additive, a solvent, and the like, directly coating the support with the coating solution, pressure-bonding the support via a release liner to prepare a pressure sensitive adhesive sheet, and pressure-bonding and transferring (transporting) the sheet from the support can also be used. Further, as the method of attaching the pressure sensitive adhesive layer or the adhesive layer to the light absorption anisotropic film and/or the polarizer, a method of coating an appropriate release liner (release paper or the like) with the above-described coating solution to form a thermally expandable pressure sensitive adhesive layer and pressure-bonding and transferring the thermally expandable pressure sensitive adhesive layer from the release liner can also be used.

The pressure sensitive adhesive layer and the adhesive layer may be provided on one or both surfaces of the light absorption anisotropic film and/or the polarizer as layers obtained by superimposing different kinds of layers with different compositions. In addition, in a case where the layers are provided on both surfaces thereof, different kinds of pressure sensitive adhesive layers with different compositions and different thicknesses can be provided on the front and rear surfaces of the light absorption anisotropic film and/or the polarizer.

Further, the light absorption anisotropic film and/or the polarizer may be subjected to a surface reforming treatment before the adhesive or the pressure sensitive adhesive is attached thereto for the purpose of improving the adhesiveness or the like. Specific examples of the treatment include a corona treatment, a plasma treatment, a primer treatment, and a saponification treatment.

The image display device according to the embodiment of the present invention is obtained by providing the viewing angle control system according to the embodiment of the present invention on at least one main surface of a display panel.

In the image display device according to the embodiment of the present invention, an angle $\varphi$ between a plane having the transmittance central axis of the light absorption anisotropic layer and the normal line of the light absorption anisotropic film and the absorption axis of the polarizer is preferably in a range of 45° to 90°, more preferably in a range of 80° to 90°, and still more preferably in a range of 88° to 90°.

As the angle $\varphi$ is closer to 90°, an illuminance contrast between a direction in which a display image displayed by the image display device is easy to see and a direction in which the image is difficult to see can be provided.

<Display Panel>

The display panel used in the image display device according to the embodiment of the present invention is not particularly limited, and examples thereof include a liquid crystal cell, an organic electroluminescence (hereinafter, abbreviated as "EL") display panel, and a plasma display panel. Among these, a liquid crystal cell or an organic EL display panel is preferable. That is, it is preferable that the image display device according to the embodiment of the present invention is a liquid crystal display device formed of a liquid crystal cell as a display panel or an organic EL display device formed of an organic EL display panel as a display panel.

The liquid crystal display device, which is an example of the image display device according to the embodiment of the present invention, is a liquid crystal display device including the above-described viewing angle control system (the light absorption anisotropic film and the polarizer) according to the embodiment of the present invention and a liquid crystal cell.

In the present invention, it is preferable to use a polarizer of the viewing angle control system according to the embodiment of the present invention as a front-side or rear-side polarizer and possible to use a polarizer of the viewing angle control system according to the embodiment of the present invention as a front-side and a rear-side polarizer, among the polarizers provided on both sides of the liquid crystal cell.

Some display panels are thin and can be molded into a curved surface. Since the light absorption anisotropic film according to the embodiment of the present invention is thin and easily bent, the light absorption anisotropic film can be suitably applied to an image display device having a curved display surface.

Further, some display panels have a pixel density of greater than 250 ppi and are capable of high-definition display. The light absorption anisotropic film according to the embodiment of the present invention can be suitably applied to such a high-definition display panel without causing moire.

Hereinafter, the liquid crystal cell constituting the liquid crystal display device will be described in detail.

<Liquid Crystal Cell>

It is preferable that the liquid crystal cell used for the liquid crystal display device is in a vertical alignment (VA) mode, an optically compensated bend (OCB) mode, an in-plane-switching (IPS) mode, or a twisted nematic (TN) mode, but the present invention is not limited thereto.

In the liquid crystal cell in a TN mode, rod-like liquid crystal compounds are substantially horizontally aligned at the time of no voltage application and further twisted aligned at 60° to 120°. The liquid crystal cell in a TN mode is most likely used as a color thin film transistor (TFT) liquid crystal display device and is described in multiple documents.

In the liquid crystal cell in a VA mode, rod-like liquid crystal compounds are substantially vertically aligned at the time of no voltage application. The concept of the liquid crystal cell in a VA mode includes (1) a liquid crystal cell in a VA mode in a narrow sense where rod-like liquid crystal compounds are aligned substantially vertically at the time of no voltage application and substantially horizontally at the time of voltage application (described in JP1990-176625A (JP-H2-176625A)), (2) a liquid crystal cell (in an MVA mode) (SID97, described in Digest of tech. Papers (proceedings) 28 (1997) 845) in which the VA mode is formed to have multi-domain in order to expand the viewing angle, (3) a liquid crystal cell in a mode (n-ASM mode) in which rod-like liquid crystal compounds are substantially vertically aligned at the time of no voltage application and twistedly multi-domain aligned at the time of voltage application (described in proceedings of Japanese Liquid Crystal Conference, pp. 58 to 59 (1998)), and (4) a liquid crystal cell in a SURVIVAL mode (presented at LCD International 98).

Further, the liquid crystal cell may be of any of a patterned vertical alignment (PVA) type, a photo-alignment (optical alignment) type, or a polymer-sustained alignment (PSA) type. Details of these modes are described in JP2006-215326A and JP2008-538819A.

In the liquid crystal cell in an IPS mode, rod-like liquid crystal compounds are aligned substantially parallel to the substrate, and the liquid crystal compounds respond planarly through application of an electric field parallel to the substrate surface. In the IPS mode, black display is carried out in a state where no electric field is applied, and absorption axes of a pair of upper and lower polarizing plates are orthogonal to each other. In regard to the IPS mode, a method of reducing leakage light during black display in an oblique direction and improve the viewing angle using an optical compensation sheet is disclosed in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), and JP1998-307291A (JP-H10-307291A).

In a case where the display cell and the viewing angle control system according to the embodiment of the present invention are required to be bonded to each other in the image display device according to the embodiment of the present invention, the bonding may be performed in a known method by the method of using a bonding agent and the like exemplified in the section of the bonding of the light absorption anisotropic film and the polarizer in the viewing angle control system described above.

EXAMPLES

Hereinafter, the present invention will be described in more detail based on the following examples. The materials, the reagents, the amounts of substances and the proportions of the substances, the operations, and the like shown in the following examples can be appropriately changed within a range not departing from the scope of the present invention. Therefore, the scope of the present invention is not limited to the following specific examples.

Example 1

A light absorption anisotropic film including a light absorption anisotropic layer in which an organic dichroic substance was obliquely aligned was prepared as described below.

<Preparation of Transparent Support 1>

The surface of a cellulose acylate film 1 (TAC base material with a thickness of 40 μm; TG40, manufactured by FUJIFILM Corporation) was saponified with an alkaline solution and coated with the following coating solution 1 for forming an alignment layer using a wire bar. The support on which the coating film had been formed was dried with hot air at 60° C. for 60 seconds and further dried with hot air at 100° C. for 120 seconds to form an alignment layer 1, thereby obtaining a TAC film with an alignment layer.

The film thickness was 0.5 μm.

The prepared TAC film with an alignment layer was used by performing a rubbing treatment on the surface of the alignment film.

| (Coating solution 1 for forming alignment layer) |
| --- |
| Modified polyvinyl alcohol shown below: 3.80 parts by mass |
| Initiator Irg2959: 0.20 parts by mass |
| Water: 70 parts by mass |
| Methanol: 30 parts by mass |

Modified polyvinyl alcohol $-(CH_2-CH)_{96.8}-(CH_2-CH)_{1.5}-(CH_2-CH)_{1.7}$
$\quad\quad |\quad\quad\quad\quad\quad |\quad\quad\quad\quad\quad |$
$\quad\quad OH\quad\quad\quad\quad OCOCH_3\quad\quad OCONHCH_2CH_2OCOC=CH_2$
$\quad\quad\quad\quad\quad\quad\quad\quad\quad\quad\quad\quad\quad\quad\quad\quad\quad\quad\quad\quad\quad\quad\quad\quad\quad\quad\quad |$
$\quad\quad\quad\quad\quad\quad\quad\quad\quad\quad\quad\quad\quad\quad\quad\quad\quad\quad\quad\quad\quad\quad\quad\quad\quad\quad\quad CH_3$ <Preparation of Liquid Crystal Layer for Alignment>

The alignment film of the prepared TAC film with an alignment layer was coated with the following composition T1 for forming a liquid crystal layer for alignment with the following composition using a wire bar, thereby preparing a coating layer T1.

Next, the coating layer T1 was heated at 120° C. for 30 seconds, and the coating layer T1 was cooled to room temperature (23° C.). Next, the coating layer was further heated at 80° C. for 60 seconds and cooled to room temperature again.

Thereafter, the coating layer was irradiated with an LED lamp (central wavelength of 365 nm) for 1 second under an irradiation condition of an illuminance of 200 mW/cm$^2$, thereby preparing a liquid crystal layer T1 for alignment on the alignment layer 1.

The film thickness of the liquid crystal layer T1 for alignment was 0.25 μm, and the surface energy thereof was 35.0 mN/m.

| Composition of composition T1 for forming liquid crystal layer for alignment |
| --- |
| Polymer liquid crystal compound P-1 shown below: 55.20 parts by mass |
| Low-molecular-weight liquid crystal compound M-1 shown below: 40.49 parts by mass |
| Polymerization initiator (IRGACURE OXE-02, manufactured by BASF SE): 4.049 parts by mass |
| Surfactant F-1 (leveling agent) shown below: 0.2620 parts by mass |
| Cyclopentanone: 660.6 parts by mass |
| Tetrahydrofuran: 660.6 parts by mass |

Polymer liquid crystal compound P-1

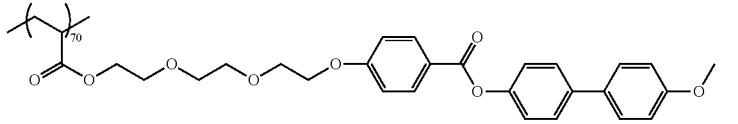

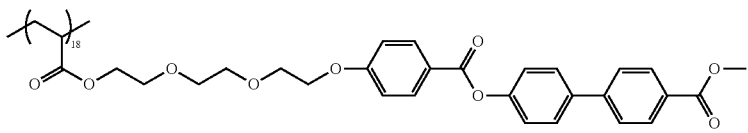

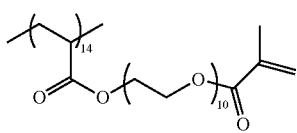

Low-molecular-weight liquid crystal compound M-1

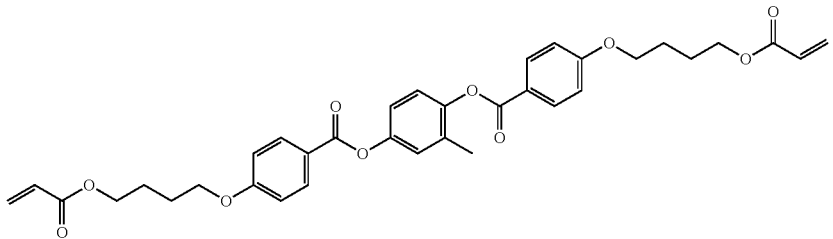 [SMILES: C=CC(=O)OCCCCOc1ccc(C(=O)Oc2ccc(OC(=O)c3ccc(OCCCCOC(=O)C=C)cc3)c(C)c2)cc1]

Surfactant F-1

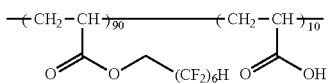

<Formation of Light Absorption Anisotropic Layer P1>

The obtained liquid crystal layer T1 for alignment was coated with the following composition P1 for forming a light absorption anisotropic layer using a wire bar, thereby forming a coating layer P1.

Next, the coating layer P1 was heated at 120° C. for 30 seconds, and the coating layer P1 was cooled to room temperature (23° C.).

Next, the coating layer was heated at 80° C. for 60 seconds and cooled to room temperature again.

Thereafter, the coating layer was irradiated with an LED lamp (central wavelength of 365 nm) for 1 second under an irradiation condition of an illuminance of 200 mW/cm², thereby preparing a light absorption anisotropic layer P1 on the alignment layer 1. The film thickness of the light absorption anisotropic layer P1 was 1.4 μm, and the surface energy thereof was 26.5 mN/m.

| Composition of composition P1 for forming light absorption anisotropic layer |
|---|
| Dichroic substance D-1 shown below: 7.356 parts by mass |
| Dichroic substance D-2 shown below: 3.308 parts by mass |
| Dichroic substance D-3 shown below: 11.02 parts by mass |
| Polymer liquid crystal compound P-1: 43.29 parts by mass |
| Low-molecular-weight liquid crystal compound M-1: 31.75 parts by mass |
| Polymerization initiator (IRGACURE OXE-02, manufactured by BASF SE): 3.175 parts by mass |
| Surfactant F-2 (leveling agent) shown below: 0.1027 parts by mass |
| Cyclopentanone: 514.4 parts by mass |
| Tetrahydrofuran: 514.4 parts by mass |

Dichroic substance D-1

Dichroic substance D-2

Dichroic substance D-3

Surfactant F-2

<Formation of Barrier Layer B1>

The light absorption anisotropic layer P1 prepared above was coated with the following composition B1 for forming a barrier layer using a wire bar and dried at 80° C. for 5 minutes, thereby forming a barrier coating layer B1.

Next, the barrier coating layer B1 was irradiated with an LED lamp (central wavelength of 365 nm) for 2 seconds under an irradiation condition of an illuminance of 150 mW/cm² in an environment of an oxygen concentration of 100 ppm and a temperature of 60° C., thereby forming a barrier layer B1 on the light absorption anisotropic layer P1. The thickness of the barrier layer B1 was 1.0 μm. The obtained layer was defined as alight absorption anisotropic film P1.

| (Composition B1 for forming barrier layer) |
|---|
| Modified polyvinyl alcohol shown below: 3.80 parts by mass |
| Initiator Irg2959: 0.20 parts by mass |
| Water: 70 parts by mass |
| Methanol: 30 parts by mass |

Modified polyvinyl alcohol $-(CH_2-CH)_{96.8}-(CH_2-CH)_{1.5}-(CH_2-CH)_{1.7}$
         |                    |                       |
         OH              OCOCH$_3$       OCONHCH$_2$CH$_2$OCOC=CH$_2$
                                                                      |
                                                                      CH$_2$ <Measurement of Alignment Angle of Light Absorption Anisotropic Layer>

The Mueller matrix at a wavelength of 550 nm was measured with the light absorption anisotropic film P1 prepared above using AxoScan OPMF-1 (manufactured by Opto Science, Inc.).

Specifically, first, an azimuthal angle at which the transmittance central axis was inclined was initially searched for using AxoScan OPMF-1.

Next, the transmittance of the light absorption anisotropic layer was derived by actually measuring the Mueller matrix at a wavelength of 550 nm while the polar angle which was an angle with respect to the normal direction of the light absorption anisotropic layer was changed for every 1° from −70° to 70° in a plane having the normal direction of the light absorption anisotropic layer along the azimuthal angle, that is, the transmittance central axis and orthogonal to the main surface of the light absorption anisotropic layer. Based on the result, the direction in which the transmittance was the highest is defined as the transmittance central axis.

Further, the transmittance central axis denotes the direction in which the absorption axis (major axis direction of a molecule) of the dichroic substance contained in the light absorption anisotropic layer is inclined.

Further, as illustrated in FIG. 6, a section 43 having a thickness of 2 μm was collected by a microtome in parallel with the plane having the transmittance central axis and the normal line 42 of the film.

Figure 7:
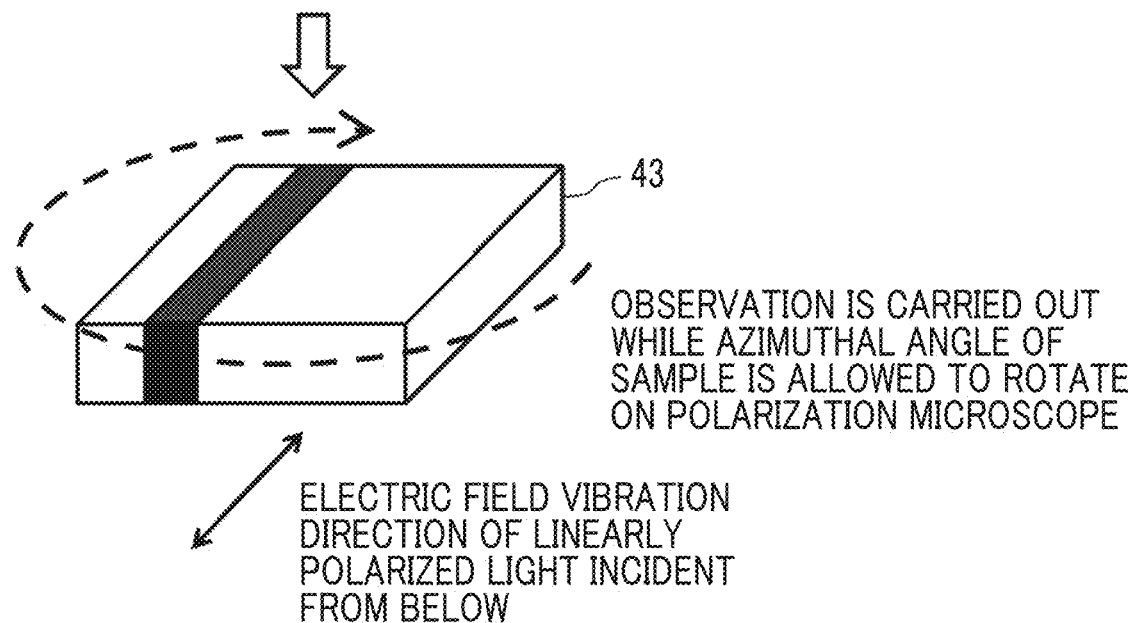
FIG. 7 is a schematic view illustrating a case where the section for confirming the light absorption axis direction of the light absorption anisotropic layer in examples is observed with a polarization microscope.

Further, as illustrated in FIG. 7, the azimuthal angle of the section 43 (the angle at which the section 43 was allowed to rotate) in which the cross section of the light absorption anisotropic layer was most extinct with respect to incident linearly polarized light on a rotating table of a polarization microscope was acquired. In this case, an analyzer of the polarization microscope was not used.

The angle θA between the alignment direction of the light absorption axis of the organic dichroic substance in the vicinity of the interface of the light absorption anisotropic layer on the support side and the normal line of the light absorption anisotropic layer, obtained by the observation, was 30°. Further, the angle θB between the alignment direction of the light absorption axis of the organic dichroic substance in the vicinity of the interface of the light absorption anisotropic layer on the air side and the normal line of the light absorption anisotropic layer was 17°.

The angle θA and the angle θB were measured by cutting out three sections (n=3), and the average values thereof were defined as the angle θA and the angle θB in the light absorption anisotropic layer. The same applies to other examples and comparative examples in this regard.

Further, the angle θA and the angle θB were measured at positions inside both interfaces by 0.2 μm as described above with reference to FIG. 5.

Further, even in the following examples, the angle θA and the angle θB of the light absorption anisotropic layer were measured in the same manner as in this example.

<Preparation of Laminate A1>

A polarizing plate 1 in which the thickness of the polarizer was 8 μm and one surface of the polarizer was exposed was prepared by the same method as that for a polarizing plate 02 with a one-surface protective film described in WO2015/166991A.

Figure 4:
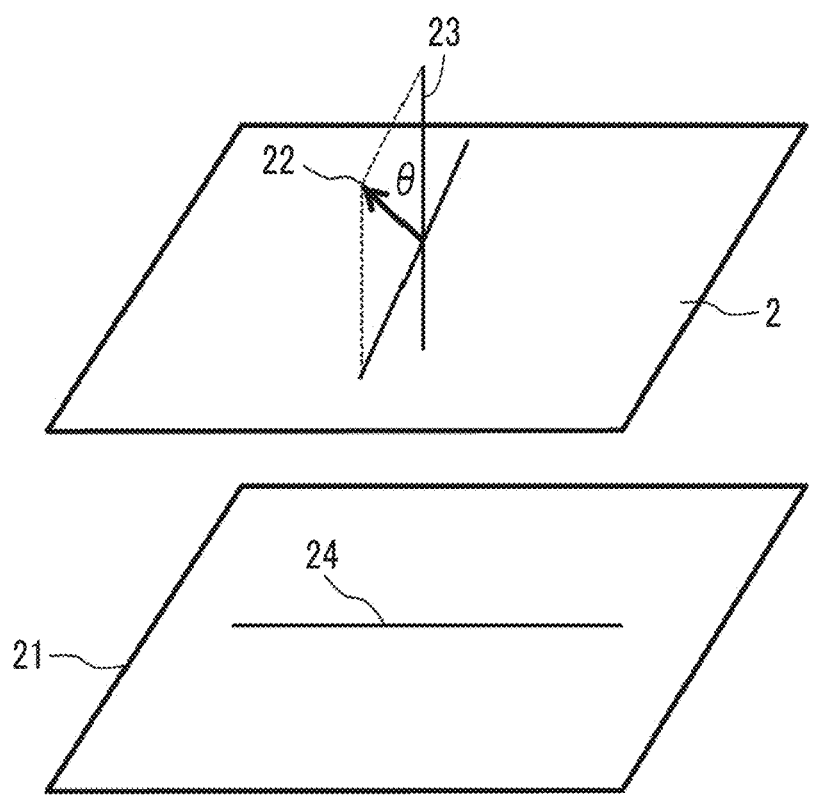
FIG. 4 is a view illustrating a positional relationship between a direction of a transmittance central axis of a light absorption anisotropic layer and an absorption axis of a polarizer in an image display device of the present invention.

The surface of the polarizing plate 1 in which the polarizer was exposed and the surface of the light absorption anisotropic film 1 prepared above were subjected to a corona treatment, and both surfaces were bonded to each other using the following PVA adhesive 1, thereby preparing a laminate A1. In this case, the angle between the plane having the transmittance central axis 22 (polar angle θ) of the light absorption anisotropic layer and the normal line 23 of the light absorption anisotropic layer 2 (light absorption anisotropic film) and the absorption axis 24 of the polarizer 21 was 90° as illustrated in FIG. 4.

(Preparation of PVA Adhesive 1)

20 parts of methylol melamine with respect to 100 parts of a polyvinyl alcohol-based resin containing an acetoacetyl group (average degree of polymerization: 1200, degree of saponification: 98.5% by mole, degree of acetoacetylation: 5% by mole) was dissolved in pure water under a temperature condition of 30° C. to prepare an aqueous solution in which the concentration of solid contents was adjusted to 3.7% by mass.

<Preparation of Image Display Device B1>

A Wi-Fi model iPad Air (registered trademark, the same applies hereinafter, manufactured by APPLE, Inc.) with a capacity of 16 GB, which is an IPS mode liquid crystal display device, was disassembled to take out the liquid crystal cell. The laminate A1 prepared above was bonded to the surface formed by peeling the viewing-side polarizing plate off from the liquid crystal cell such that the polarizing plate 1 side was the liquid crystal cell side, using the following pressure sensitive adhesive sheet 1. Here, the bonding was made such that the direction of the absorption axis of the polarizing plate 1 was the longitudinal direction of the liquid crystal screen. The device was reassembled after the bonding to the liquid crystal cell, thereby preparing an image display device B1.

(Preparation of Pressure Sensitive Adhesive Sheet 1)

Next, an acrylate-based polymer was prepared according to the following procedures.

95 parts by weight of butyl acrylate and 5 parts by weight of acrylic acid were polymerized by a solution polymerization method in a reaction container equipped with a cooling pipe, a nitrogen introduction pipe, a thermometer, and a stirrer, thereby obtaining an acrylate-based polymer A1 with an average molecular weight of 2000000 and a molecular weight distribution (Mw/Mn) of 3.0.

Next, the obtained acrylate-based polymer A1 (100 parts by mass), CORONATE L (75 mass % ethyl acetate solution of trimethylolpropane adduct of tolylene isocyanate, number of isocyanate groups in one molecule: 3, manufactured by Nippon Polyurethane Industry Co., Ltd.) (1.0 parts by mass), and a silane coupling agent KBM-403 (manufactured by Shin-Etsu Chemical Co., Ltd.) (0.2 parts by mass) were mixed with each other, and ethyl acetate was finally added to the mixture such that the concentration of total solid contents reached 10% by mass, thereby preparing a composition for forming a pressure sensitive adhesive. A separate film subjected to a surface treatment with a silicone-based release agent was coated with the composition using a die coater and dried in an environment of 90° C. for 1 minute, thereby obtaining an acrylate-based pressure sensitive adhesive sheet. The film thickness was 25 μm, and the storage elastic modulus was 0.1 MPa.

Example 2

A light absorption anisotropic film P2, a laminate A2, and an image display device B2 were prepared in the same manner as in Example 1 except that the thickness of the liquid crystal layer for alignment was set to 0.33 μm.

The surface energy of the liquid crystal layer for alignment was 36.1 mN/m, the angle θA of the light absorption anisotropic layer of the light absorption anisotropic film was 24°, and the angle θB thereof was 18°.

Example 3

A light absorption anisotropic film P3, a laminate A3, and an image display device B3 were prepared in the same manner as in Example 1 except that the thickness of the liquid crystal layer for alignment was set to 0.46 μm.

The surface energy of the liquid crystal layer for alignment was 37.5 mN/m, the angle θA of the light absorption anisotropic layer of the light absorption anisotropic film was 19°, and the angle θB thereof was 18°.

Example 4

A light absorption anisotropic film P4, a laminate A4, and an image display device B4 were prepared in the same manner as in Example 1 except that the following composition P2 for forming a light absorption anisotropic layer was used as the composition for forming a light absorption anisotropic layer and the film thickness of the light absorption anisotropic layer was set to 4.0 μm in the formation of the light absorption anisotropic layer.

Here, the low-molecular-weight liquid crystal compounds M-2 and M-3 exhibiting a smectic phase were confirmed in advance by observing the liquid crystal phase while changing the temperature using a hot stage for a microscope (manufactured by METTLER TOLEDO) and a polarization microscope.

The surface energy of the liquid crystal layer for alignment was 35.0 mN/m, the angle θA of the light absorption anisotropic layer of the light absorption anisotropic film was 35°, and the angle θB thereof was 27°.

| Composition of composition P2 for forming light absorption anisotropic layer |
| --- |
| Dichroic substance D-1: 2.872 parts by mass |
| Dichroic substance D-2: 1.026 parts by mass |
| Dichroic substance D-3: 4.513 parts by mass |
| Low-molecular-weight liquid crystal compound M-2 shown below: 67.90 parts by mass |
| Low-molecular-weight liquid crystal compound M-3 shown below: 22.56 parts by mass |
| Polymerization initiator (IRGACURE OXE-02, manufactured by BASF SE): 0.8205 parts by mass |
| Surfactant F-2 (leveling agent): 0.1000 parts by mass |
| Cyclopentanone: 1846.2 parts by mass |
| Benzyl alcohol: 102.6 parts by mass |

Low-molecular-weight liquid crystal compound M-2

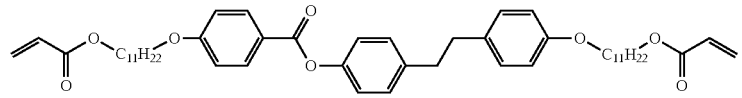

Low-molecular-weight liquid crystal compound M-3

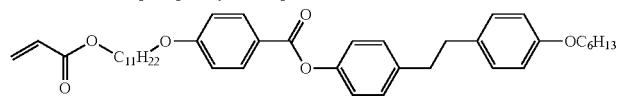

Example 5

A light absorption anisotropic film P5, a laminate A5, and an image display device B5 were prepared in the same manner as in Example 1 except that the following composition P3 for forming a light absorption anisotropic layer was used as the composition for forming a light absorption anisotropic layer and the film thickness of the light absorption anisotropic layer was set to 4.0 μm in the formation of the light absorption anisotropic layer.

Here, the low-molecular-weight liquid crystal compounds M-4 and M-5 exhibiting a smectic phase were confirmed in advance by observing the liquid crystal phase while changing the temperature using a hot stage for a microscope (manufactured by METTLER TOLEDO) and a polarization microscope.

The surface energy of the liquid crystal layer for alignment was 35.5 mN/m, the angle θA of the light absorption anisotropic layer of the light absorption anisotropic film was 34°, and the angle θB thereof was 26°.

Example 6

A light absorption anisotropic film P6, a laminate A6, and an image display device B6 were prepared in the same manner as in Example 1 except that the following composition P4 for forming a light absorption anisotropic layer was used as the composition for forming a light absorption anisotropic layer and the film thickness of the light absorption anisotropic layer was set to 1.7 μm in the formation of the light absorption anisotropic layer.

The surface energy of the liquid crystal layer for alignment was 34.9 mN/m, the angle θA of the light absorption anisotropic layer of the light absorption anisotropic film was 30°, and the angle θB thereof was 17°.

| Composition of composition P4 for forming light absorption anisotropic layer |
| --- |
| Dichroic substance D-1: 5.056 parts by mass |
| Dichroic substance D-2: 2.274 parts by mass |

| Composition of composition P3 for forming light absorption anisotropic layer |
| --- |
| Dichroic substance D-1: 2.872 parts by mass |
| Dichroic substance D-2: 1.026 parts by mass |
| Dichroic substance D-3: 4.513 parts by mass |
| Low-molecular-weight liquid crystal compound M-4 shown below: 67.90 parts by mass |
| Low-molecular-weight liquid crystal compound M-5 shown below: 22.56 parts by mass |
| Polymerization initiator (IRGACURE OXE-02, manufactured by BASF SE): 0.8205 parts by mass |
| Surfactant F-2 (leveling agent): 0.1000 parts by mass |
| Cyclopentanone: 1846.2 parts by mass |
| Benzyl alcohol: 102.6 parts by mass |

Low-molecular-weight liquid crystal compound M-4

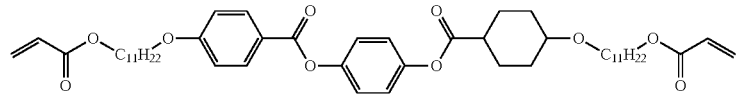

Low-molecular-weight liquid crystal compound M-5

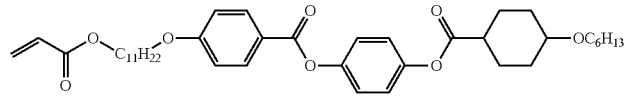

| Composition of composition P4 for forming light absorption anisotropic layer |
| --- |
| Dichroic substance D-3: 7.578 parts by mass |
| Polymer liquid crystal compound P-1: 43.29 parts by mass |
| Low-molecular-weight liquid crystal compound M-1: 31.75 parts by mass |
| Polymerization initiator (IRGACURE OXE-02, manufactured by BASF SE): 3.175 parts by mass |
| Surfactant F-2 (leveling agent): 0.1027 parts by mass |
| Cyclopentanone: 490.5 parts by mass |
| Tetrahydrofuran: 490.5 parts by mass |

Example 7

A light absorption anisotropic film P7, a laminate A7, and an image display device B7 were prepared in the same manner as in Example 1 except that the following composition P5 for forming a light absorption anisotropic layer was used as the composition for forming a light absorption anisotropic layer and the film thickness of the light absorption anisotropic layer was set to 4.6 µm in the formation of the light absorption anisotropic layer.

The surface energy of the liquid crystal layer for alignment was 35.1 mN/m, the angle θA of the light absorption anisotropic layer of the light absorption anisotropic film was 31°, and the angle θB thereof was 17°.

| Composition of composition P5 for forming light absorption anisotropic layer |
| --- |
| Dichroic substance D-1: 1.720 parts by mass |
| Dichroic substance D-2: 0.7736 parts by mass |
| Dichroic substance D-3: 2.578 parts by mass |
| Polymer liquid crystal compound P-1: 43.29 parts by mass |
| Low-molecular-weight liquid crystal compound M-1: 31.75 parts by mass |
| Polymerization initiator (IRGACURE OXE-02, manufactured by BASF SE): 3.175 parts by mass |
| Surfactant F-2 (leveling agent): 0.1027 parts by mass |
| Cyclopentanone: 436.5 parts by mass |
| Tetrahydrofuran: 436.5 parts by mass |

Example 8

A light absorption anisotropic film P8, a laminate A8, and an image display device B8 were prepared in the same manner as in Example 1 except that the following composition P6 for forming a light absorption anisotropic layer was used as the composition for forming a light absorption anisotropic layer and the film thickness of the light absorption anisotropic layer was set to 4.6 µm in the formation of the light absorption anisotropic layer.

The surface energy of the liquid crystal layer for alignment was 35.0 mN/m, the angle θA of the light absorption anisotropic layer of the light absorption anisotropic film was 31°, and the angle θB thereof was 18°.

| Composition of composition P6 for forming light absorption anisotropic layer |
| --- |
| Dichroic substance D-1: 1.094 parts by mass |
| Dichroic substance D-2: 0.4917 parts by mass |
| Dichroic substance D-3: 1.639 parts by mass |
| Polymer liquid crystal compound P-1: 43.29 parts by mass |
| Low-molecular-weight liquid crystal compound M-1: 31.75 parts by mass |
| Polymerization initiator (IRGACURE OXE-02, manufactured by BASF SE): 3.175 parts by mass |
| Surfactant F-2 (leveling agent): 0.1027 parts by mass |
| Cyclopentanone: 432.2 parts by mass |
| Tetrahydrofuran: 432.2 parts by mass |

Comparative Example 1

A light absorption anisotropic film P10, a laminate A10, and an image display device B10 were prepared in the same manner as in Example 1 except that the liquid crystal layer for alignment was not provided, a PVA alignment layer subjected to a rubbing treatment was directly coated with a composition for forming a light absorption anisotropic layer to provide a light absorption anisotropic layer, and the film thickness of the light absorption anisotropic layer was set to 3.0 µm.

The angle θA of the light absorption anisotropic layer of the light absorption anisotropic film was 80°, and the angle θB thereof was 50°.

Comparative Example 2

A light absorption anisotropic film P11, a laminate A11, and an image display device B11 were prepared in the same manner as in Example 1 except that the thickness of the liquid crystal layer for alignment was set to 0.10 µm and the thickness of the light absorption anisotropic layer was set to 1.7 µm.

The surface energy of the liquid crystal layer for alignment was 34.0 mN/m, the angle θA of the light absorption anisotropic layer of the light absorption anisotropic film was 45°, and the angle θB thereof was 28°.

[Evaluation of Performance]

(1) Evaluation of Maximum Transmittance

The Mueller matrix of the light absorption anisotropic film at a wavelength of 550 nm was measured while the polar angle was changed for every 1° from −70° to 70° with the prepared light absorption anisotropic film using AxoScan OPMF-1 (manufactured by Opto Science, Inc.). Based on the measurement results, a maximum transmittance Tmax at the angle θ at which the transmittance was maximized was measured.

The image display devices prepared in each example and each comparative example was observed at the angle θ acquired above, and the evaluation was performed according to the following standards.

AAA: The image was bright and extremely easy to visually recognize (transmittance of 0.8 or greater)

AA: The image was bright and easy to visually recognize (transmittance of 0.7 or greater and less than 0.8)

A: The image was slightly bright and easy to visually recognize (transmittance of 0.6 or greater and less than 0.7)

B: The image was slightly dark and difficult to visually recognize (transmittance of 0.5 or greater and less than 0.6)

C: The image was dark and difficult to visually recognize (transmittance of 0.4 or greater and less than 0.5)

D: The image was dark and extremely difficult to visually recognize (transmittance of less than 0.4)

(2) Evaluation of Reflected Glare of Image on Window Glass

A state of each of the image display devices B1 to B8 prepared by the above-described procedures, in which the screen of the display was set to be perpendicular to the ground, was fixed. Further, a glass plate having a thickness of 2 mm was installed at an angle perpendicular to the screen of the display and the ground, on a side opposite to the direction in which the transmittance central axis of the light absorption anisotropic layer faced. Further, the room was set to a dark room, a sample image was displayed on the display, and the reflected glare of the image on the glass and the brightness of the image as viewed in the transmittance central axis direction were visually sensory evaluated in the dark room.

AAA: The reflected glare on the glass was not visually recognized

AA: The reflected glare on the glass was hardly visually recognized

A: The reflected glare on the glass was difficult to visually recognize

B: The reflected glare on the glass was slightly visually recognized

C: The reflected glare on the glass was visually recognized.

D: The reflected glare on the glass was strongly visually recognized.

Table 1 shows the results of each example and each comparative example.

and the difference between the angle θA and the angle θB was greater than 15°, the visibility of the image was poor, and the reflected glare of the image on window glass was increased.

EXPLANATION OF REFERENCES

100: liquid crystal display device
101: light absorption anisotropic film
102: viewing-side polarizer
103: liquid crystal cell
104: backlight-side polarizer
105: backlight
1: barrier layer
2: light absorption anisotropic layer
3: liquid crystal layer for alignment
4: alignment layer
5: TAC film
11: liquid crystal compound
13: dichroic substance D-1

TABLE 1

| | Liquid crystal layer for alignment | | Light absorption anisotropic layer | | | | | | Evaluation | |
|---|---|---|---|---|---|---|---|---|---|---|
| | | | | Content | | | | | Visibility of | Suppression |
| | Thickness [μm] | Surface energy [mN/m] | Composition | of coloring agent | Film thickness [μm] | θA | θB | \|θA − θB\| | image from observer (maximum transmittance) | of reflected glare on window glass |
| Example 1 | 0.25 | 35.0 | P1 | 21.7% | 1.4 | 30° | 17° | 13° | A | A |
| Example 2 | 0.33 | 36.1 | P1 | 21.7% | 1.4 | 24° | 18° | 6° | AA | AA |
| Example 3 | 0.46 | 37.5 | P1 | 21.7% | 1.4 | 19° | 18° | 1° | AAA | AAA |
| Example 4 | 0.25 | 35.0 | P2 | 21.7% | 4.0 | 35° | 27° | 8° | A | A |
| Example 5 | 0.25 | 35.0 | P3 | 21.7% | 4.0 | 34° | 26° | 8° | A | A |
| Example 6 | 0.25 | 34.9 | P4 | 16.0% | 1.7 | 30° | 17° | 13° | A | A |
| Example 7 | 0.25 | 35.1 | P5 | 6.1% | 4.6 | 31° | 17° | 14° | B | B |
| Example 8 | 0.25 | 35.0 | P6 | 4.0% | 4.6 | 31° | 18° | 13° | C | C |
| Comparative Example 1 | — | — | P1 | 21.7% | 3.0 | 80° | 50° | 30° | D | D |
| Comparative Example 2 | 0.10 | 34.0 | P1 | 21.7% | 1.7 | 45° | 28 | 17° | D | D |

As listed in the table above, the visibility (maximum transmittance) of the screen from the observer was increased, and the reflected glare on the window glass was also reduced at the same time as the difference between the angle θA between the alignment direction of the light absorption axis of the organic dichroic substance and the normal line of the light absorption anisotropic layer at the interface of the light absorption anisotropic layer on the support side and the angle θB between the alignment direction of the light absorption axis of the dichroic substance and the normal line of the light absorption anisotropic layer at the interface of the light absorption anisotropic layer on the air side was decreased. In particular, as shown in Example 3, the visibility of the screen from the observer and the reflected glare on window glass were at extremely satisfactory levels in a region where the difference between the angle θA and the angle θB was 2° or less.

Further, as shown in Examples 1 to 6, 7, and 8, the visibility of the screen from the observer and the reflected glare on window glass tended to be improved particularly in a region where the content of the coloring agent in the light absorption anisotropic layer was high. The reason for this was assumed to be that a contrast was easy to provide as a result of obtaining high alignment in which the amount of the coloring agent in the film was increased.

On the contrary, in Comparative Example 1 and Comparative Example 2 in which the angle θA was 45° or greater 14: dichroic substance D-2
15: dichroic substance D-3
21: polarizer
22: transmittance central axis direction (polar angle θ)
23: normal line of light absorption anisotropic layer
24: absorption axis direction of polarizer
31: air layer-side interface of light absorption anisotropic layer
32: support-side interface of light absorption anisotropic layer
33: angle (θB)
34: angle (θA)
35: normal line of absorption anisotropic layer
42: normal direction of light absorption anisotropic film
43: section of light absorption anisotropic film

What is claimed is:
1. A light absorption anisotropic film comprising:
a light absorption anisotropic layer,
wherein the light absorption anisotropic layer contains a liquid crystal compound and an organic dichroic substance, and
in a case where an angle between an alignment direction of a light absorption axis of the organic dichroic substance on one surface of the light absorption anisotropic layer and a normal line of the light absorption anisotropic layer is defined as θA and an angle between an alignment direction of a light absorption axis of the dichroic substance on the other surface of the light absorption anisotropic layer and the normal line of the light absorption anisotropic layer is defined as θB, a difference between the angle θA and the angle θB is 15° or less, and the angle θA is 5° or greater and less than 45°.

2. The light absorption anisotropic film according to claim 1,
wherein the difference between the angle θA and the angle θB is 5° or less.

3. The light absorption anisotropic film according to claim 1,
wherein the difference between the angle θA and the angle θB is 2° or less.

4. The light absorption anisotropic film according to claim 1,
wherein a ratio of a mass of the organic dichroic substance to a total mass of a solid content in the light absorption anisotropic layer is 5% by mass or greater.

5. The light absorption anisotropic film according to claim 1,
wherein a ratio of a mass of the organic dichroic substance to a total mass of a solid content in the light absorption anisotropic layer is 15% by mass or greater.

6. The light absorption anisotropic film according to claim 1,
wherein the organic dichroic substance consists of a mixture of three or more kinds of organic dichroic substances having different absorption peak wavelengths.

7. The light absorption anisotropic film according to claim 1,
wherein the liquid crystal compound includes a polymer liquid crystal compound.

8. The light absorption anisotropic film according to claim 1,
wherein the liquid crystal compound is a polymer of a polymerizable liquid crystal compound.

9. The light absorption anisotropic film according to claim 8,
wherein the polymerizable liquid crystal compound includes a rod-like liquid crystal compound.

10. The light absorption anisotropic film according to claim 8,
wherein the polymerizable liquid crystal compound includes a liquid crystal compound exhibiting a smectic phase.

11. The light absorption anisotropic film according to claim 1, further comprising:
a liquid crystal layer for alignment adjacent to the light absorption anisotropic layer,
wherein the liquid crystal layer for alignment is a layer formed by fixing a hybrid-aligned polymerizable liquid crystal compound in which an alignment direction in a thickness direction continuously changes from one surface side to the other surface side.

12. The light absorption anisotropic film according to claim 11,
wherein the liquid crystal compound of the light absorption anisotropic layer is a polymer of a polymerizable liquid crystal compound, and
the polymerizable liquid crystal compound used in the light absorption anisotropic layer and the polymerizable liquid crystal compound used in the liquid crystal layer for alignment are same each other.

13. The light absorption anisotropic film according to claim 11,
wherein the liquid crystal layer for alignment has a thickness of 0.1 to 2.0 μm.

14. The light absorption anisotropic film according to claim 11, further comprising:
an alignment layer consisting of polyvinyl alcohol or polyimide adjacent to the liquid crystal layer for alignment on a side opposite to the light absorption anisotropic layer.

15. A viewing angle control system comprising:
a polarizer; and
the light absorption anisotropic film according to claim 1.

16. An image display device comprising:
the viewing angle control system according to claim 15 which is disposed on at least one main surface of a display panel.

17. The light absorption anisotropic film according to claim 2,
wherein the difference between the angle θA and the angle θB is 2° or less.

18. The light absorption anisotropic film according to claim 2,
wherein a ratio of a mass of the organic dichroic substance to a total mass of a solid content in the light absorption anisotropic layer is 5% by mass or greater.

19. The light absorption anisotropic film according to claim 2,
wherein a ratio of a mass of the organic dichroic substance to a total mass of a solid content in the light absorption anisotropic layer is 15% by mass or greater.

20. The light absorption anisotropic film according to claim 2,
wherein the organic dichroic substance consists of a mixture of three or more kinds of organic dichroic substances having different absorption peak wavelengths.

* * * * *